(12) United States Patent
Verma

(10) Patent No.: US 9,720,519 B2
(45) Date of Patent: Aug. 1, 2017

(54) FLYING USER INTERFACE

(71) Applicant: Pramod Kumar Verma, Baltimore, MD (US)

(72) Inventor: Pramod Kumar Verma, Baltimore, MD (US)

(73) Assignee: Pramod Kumar Verma, Baltimore, MD (US)

( * ) Notice: Subject to any disclaimer, the term of this patent is extended or adjusted under 35 U.S.C. 154(b) by 173 days.

(21) Appl. No.: 14/814,509

(22) Filed: Jul. 30, 2015

(65) Prior Publication Data

US 2016/0041628 A1 Feb. 11, 2016

(51) Int. Cl.
| | |
|---|---|
| *B64C 39/02* | (2006.01) |
| *B62D 57/00* | (2006.01) |
| *G06F 3/03* | (2006.01) |
| *G06F 3/01* | (2006.01) |
| *G05B 15/00* | (2006.01) |
| *B25J 9/06* | (2006.01) |

(52) U.S. Cl.
CPC ............ *G06F 3/0304* (2013.01); *G06F 3/017* (2013.01)

(58) Field of Classification Search
CPC ...................................................... G06F 3/017
See application file for complete search history.

(56) References Cited

U.S. PATENT DOCUMENTS

| | | | |
|---|---|---|---|
| 7,551,419 B2 | 6/2009 | Pelrine et al. | |
| 9,415,869 B1 * | 8/2016 | Chan ..................... | B64C 39/024 |
| 2005/0259150 A1 * | 11/2005 | Furumi ................... | G09F 21/06 |
| | | | 348/144 |
| 2010/0199232 A1 | 8/2010 | Mistry et al. | |
| 2011/0288964 A1 | 11/2011 | Linder et al. | |
| 2014/0236388 A1 * | 8/2014 | Wong .................... | B64C 39/024 |
| | | | 701/2 |

(Continued)

FOREIGN PATENT DOCUMENTS

| | | | |
|---|---|---|---|
| CN | 103192987 A | * | 7/2013 |
| CN | 105667779 A | * | 6/2016 |

OTHER PUBLICATIONS

Schneegass, Stefan, et al. "Midair displays: Exploring the concept of free-floating public displays." CHI'14 Extended Abstracts on Human Factors in Computing Systems (2014): 2035-2040.*

(Continued)

*Primary Examiner* — Dale Moyer

(57) ABSTRACT

This invention describes a special type of drone called "Flying User Interface" device comprised of a robotic projector-camera system, an onboard digital computer connected with Internet, sensors, and a hardware interface to stick to any surface such as wall, ceilings, etc. Computer further consists of other subsystems, devices, and sensors such as accelerometer, compass, gyroscope, flashlight, etc. Drone flies from one places to another, detects a surface, and sticks to it. After successful sticking mechanism, device stops all its rotators and projects or augments images, information, and user interfaces on the near by surfaces. User interface may contain applications, information about object being augmented and information from Internet. User can interact with user-interface using command and gestures such as hand, body, feet, voice, etc.

20 Claims, 70 Drawing Sheets

(56) References Cited

U.S. PATENT DOCUMENTS

2015/0316927 A1* 11/2015 Kim .................. G03B 15/006 701/2
2016/0033855 A1 2/2016 Wong et al.

OTHER PUBLICATIONS

Schneegass, Stefan, et al. "Midair displays: Concept and first experiences with free-floating pervasive displays." Proceedings of The International Symposium on Pervasive Displays. ACM, 2014.*
Scheible, Jürgen, et al. "Displaydrone: a flying robot based interactive display." Proceedings of the 2nd ACM International Symposium on Pervasive Displays. ACM, 2013.*
Thomas, Justin, et al. "Planning and control of aggressive maneuvers for perching on inclined and vertical surfaces." ASME 2015 International Design Engineering Technical Conferences and Computers and Information in Engineering Conference. American Society of Mechanical Engineers, 2015.*
Morris, William, and J. Xiao. "City-climber: development of a novel wall-climbing robot." J Student Res 1 (2008): 40-45.*
Cauchard, Jessica R., Kevin Y. Zhai, and James A. Landay. "Drone & me: an exploration into natural human-drone interaction." Proceedings of the 2015 ACM International Joint Conference on Pervasive and Ubiquitous Computing. ACM, 2015.*
Kljun, Matjaž, et al. "StreetGamez: A Moving Projector Platform for Projected Street Games." Proceedings of the 2015 Annual Symposium on Computer-Human Interaction in Play. ACM, 2015.*
Paul Beardsley et al. "VertiGo—A Wall-Climbing Robot including Ground-Wall Transition". (Disney Research Zurich).*
Keecker Robot http://www.keecker.com.*
Verma, Pramod. "Flying User Interface." Proceedings of the 29th Annual Symposium on User Interface Software and Technology. ACM, 2016.*
Stefan Schneegass et al. "Midair displays: exploring the concept of free-floating public displays". In CHI '14 Extended Abstracts on Human Factors in Computing Systems (CHI EA '14). DOI=http://dx.doi.org/10.1145/2559206.2581190.
Stefan Schneegass et al. "Midair Displays: Concept and First Experiences with Free-Floating Pervasive Displays". In Proceedings of The International Symposium on Pervasive Displays (PerDis '14), Sven Gehring (Ed.), , pp. 27 , 5 pages. DOI=http://dx.doi.org/10.1145/2611009.2611013.
Jurgen Scheible et al. Displaydrone: a flying robot based interactive display. In Proceedings of the 2nd ACM International Symposium on Pervasive Displays (PerDis '13). ACM, New York, NY, USA, 49-54. DOI=http://dx.doi.org/10.1145/2491568.2491580.
Thomas Justin, et al. "Planning and control of aggressive maneuvers for perching on inclined and vertical surfaces." ASME 2015 International Design Engineering Technical Conferences and Computers and Information in Engineering Conference. American Society of Mechanical Engineers, 2015.
Williams Morris et al, City-Climber: Development of a Novel Wall-Climbing Robot http://deepspace9.sci.ccny.cuny.edu/JSR/2008issue/pdfs/RP_CityClimber_William.pdf.
Jessica R. Cauchard et al. "Drone & me: an exploration into natural human-drone interaction". In Proceedings of the 2015 ACM International Joint Conference on Pervasive and Ubiquitous Computing (UbiComp '15). ACM, 361-365. DOI=http://dx.doi.org/10.1145/2750858.2805823.
Matjaz Kliun et al. "A Moving Projector Platform for Projected Street Games". In Proceedings of the 2015 Annual Symposium on Computer-Human Interaction in Play (CHI PLAY '15). ACM, 589-594. DOI=http://dx.doi.org/10.1145/2793107.2810305.

* cited by examiner

FIG. 1 (Prior work)

FIG. 2 (Prior work)

FIG. 3 (Prior work)

FIG. 4 (Prior work)

FIG. 5 (Prior work)

FIG. 6 (Prior work)

| S.N | FLYING INTERFACE EXAMPLE API | DESCRIPTION |
|---|---|---|
| 1 | FLY | Start flying |
| 2 | DETECT_SURFACES | Return nearby surfaces |
| 3 | STICK_NEARBY | Stick to the given surface |
| 4 | DETECT_OWNER | Identify Owner |
| 5 | DETECT_MOVING_OBJECTS | Return the location of moving objects |
| 6 | SET_PROJECT_ORIENTATION | Set projection pose |
| 7 | START_PROJECTION | Start projection |
| 8 | START_APPLICATION | Start application |
| 9 | DETECT_VOICE_COMMANDS | Detect voice commands |
| 10 | LOCATE_OTHER_DEVICES | Return the location of other devices |
| 11 | CONNECT_DEVICE | Connect with device device with given ID |
| 12 | SEND_DATA | Send data to other device |
| 13 | RECEIVE_DATA | Receiver data from other device |
| 14 | GET_CAMERA_IMAGE/VIDEO | Get camera data |
| 15 | REMOTE_EXECUTE_<API_NAME> | Execute remove API |
| 16 | OTHER | Any other API method |

FIG. 36

| S.N | INTERACTION METHODS |
|---|---|
| 1 | TOUCH |
| 2 | SELECT |
| 3 | ZOOM |
| 4 | DRAG |
| 5 | PINCH |
| 6 | SLIDE/ SWIPING |
| 9 | MULTI-TOUCH |
| 10 | TAPPiNG |
| 11 | PRESS |
| 12 | DOUBLE TAP |

FIG. 39

| S.N | GESTURE METHODS |
| --- | --- |
| 1 | VOICE |
| 2 | HAND(S) UP |
| 3 | HAND(S) DOWN |
| 4 | FOOT/FEET MOVEMENT |
| 5 | BODY MOVEMENTS |
| 6 | SITTING |
| 7 | WALKING |
| 8 | WAVING |
| 9 | FACIAL GESTURES |
| 10 | DANCE |
| 11 | OTHER HAND GESTURES |
| 12 | FINGER GESTURES |
| 13 | INTERACTION WITH OBJECTS |
| 14 | NONVERBAL COMMUNICATION |

FIG. 40

| S.N | USER INTERFACE ELEMENTS EXAMPLE |
|---|---|
| 1 | WINDOW |
| 2 | MENU |
| 3 | BUTTON |
| 4 | SLIDER |
| 5 | DIALOG |
| 6 | LABEL |
| 7 | TABLE |
| 8 | PICTURE |
| 9 | SHAPES |
| 10 | NAVIGATION BAR, TAB |
| 11 | MAP |
| 12 | TOOLBAR |
| 13 | RADIO |
| 14 | INPUT TEXT |
| 15 | INPUT DATA (DATE-TIME, COLOR, FILE) |
| 16 | ALERT, OVERLAY |

FIG. 41

| S.N | GESTURE RECOGNITION METHODS |
|---|---|
| 1 | 3D Model Based Methods |
| 2 | Skeleton Based Methods |
| 3 | Appearance Based Methods |
| 4 | Sensor Based Model |

FIG. 68

| S.N | COMPUTER VISION ALGORITHMS |
|---|---|
| 1 | Content-based image retrieval |
| 2 | Optical character recognition (OCR) |
| 3 | Shape Recognition Technology |
| 4 | Tracking |
| 5 | Facial recognition |
| 6 | Scene reconstruction[edit] |
| 7 | Detection/segmentation |
| 8 | Image recognition |
| 9 | Pre-processing |
| 10 | Image acquisition |
| 11 | Pose estimation |
| 12 | Identification |
| 13 | Detection |
| 14 | Convolutional neural networks |

FIG. 69

| S.N | COMPUTER VISION ALGORITHMS |
|---|---|
| 1 | Object recognition |
| 2 | Optical flow |
| 3 | Extraction |
| 4 | Tracking |
| 5 | Image registration |
| 6 | FIltering Algorithms (Example: Kalman Filter) |
| 7 | Any other related or state of the art algorithms |

FIG. 70

FLYING USER INTERFACE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Field of the Invention

Flying or Mobile User-Interface, Human-Computer Interaction, Human-Robot Interaction, Human-Machine Interaction, Computer-Supported Cooperative Work, Computer Graphics, Robotics, Computer Vision, Artificial intelligence, Personnel Agents or Robots. Object Augmentation, Augmented Reality, Projector Camera System, Gesture Interface, Natural User-Interface, and Drones (Unmanned Aerial Vehicles).

Description of the Related Art

Mobile projector camera systems have various augmented reality applications. Due to their mobility, they support various projector camera system applications of all types and nature. In the context of this invention, we will review few mobile projector camera systems as a prior art.

1. Our first example is a wearable projector camera systems such as SixthSense (US20100199232 A1) that can be used for various mobile augmented reality applications such as reading real-time newspaper, augmenting time on the wrist, etc. SixthSense projects the information on the physical spaces. User can interact with the system using natural hand gestures. System consists of a projector camera system with a mobile wearable device. One problem with these devices is they are not fully mobile and user has to wear them all the time. For example it is difficult to project path on the road during running or walking, because motion creates unstable projection image or user interface. In another example we cannot use (or wear) this system during some complex scenario such as in the shower. In another situation, these devices cannot display or augment information above the height of user without using additional hardware such as rod, etc.
2. Another related work is Displaydrone: a flying robot based interactive display. Displaydrone system is a projector-equipped drone or multicopter (flying robot) that projects information on the wall, surfaces, and objects in physical space.
3. Recently researchers also attempted to display information in the mid-air using a device called "Flying Display" which consists of two UAVs (Unmanned Aerial Vehicles) with a projector and a display screen.
4. Some mobile robots such as "Keecker" projects information on the walls navigating around the home like a robotic vacuum cleaner.
5. LUMINAR lamp system consists of a robotic arm and a projector camera system to augment projection on the table surface.

All these system have following drawbacks and limitations:

1. One of the common drawbacks is continuous noise during the projection time in the case of quadcopter based flying display systems.
2. These drone systems also consume lots of power to stay in the air in order to display projection.
3. Displaydrone and SixthSense approach have one common problem of image flickering and unstable projection due to their mobility.

SUMMARY OF THE INVENTION

To address above problem, this patent introduces a drone or Unmanned Aerial Vehicles comprised of a robotic arm based projector camera system, onboard digital computer connected with Internet and sensors, and hardware interfaces to stick to any surface such as wall, ceilings, etc. We call this special type of drone by "Flying User Interface", because it provides real-time augmented reality based user interface any surface. A smartphone or any computing device can be used as an onboard computer containing other devices such as accelerometer, gyroscope, compass, flashlight, microphone, speaker, etc.

Drone flies from one places to another, detects a surface, and stick to it. After successful sticking mechanism, device stops all its rotators and project information on surfaces. This mechanism generates stabilized projection irrespective of user's motion. It also creates a noiseless user-interface, because drone is now attached to the surface and no longer required to fly to stay in the mid-air. Drone projects images and user-interfaces on nearby surface using a projector camera system. For example, if drone is stuck to the ceiling then it projects information on floor and walls. Projector is attached to a small robotic arm that assists to project information on any direction using two or three degrees of freedom, even on the same surface where device is attached. In some embodiment, if heavy projector is used, projector can be attached to the main body or frame of device, and a robotic arm with the help of mirrors can navigate or change the direction of the projection or projected rays to nearby surfaces.

Projected user-interface may contain information about object being augmented and information from Internet. User can interact with user-interface by gestures from any part of body. For example user can interact with feet, finger, or hand, etc.

This system supports all types of applications supported by previous projector camera systems and drone display system described in the prior art. For example it can find or detect some hard surface such as paper or plastic sheets, stick to it, and fly with it with a projected user interface.

This system also has its own unique and interesting applications. For example it may stick to any nearby surface and augments user interface application to assist user to learn dancing, games, music, cooking, navigation, etc. It can be used as a display interface for the purpose of advertisement. For example we can deploy these devices in a jungle or garden where these device(s) can hook or stick to rock or tree trunk to provide navigation, especially during the night or evening time.

Device can be used with another drone or devices to solve other complex problem. For example multiple devices can be used to create a large display or panoramic view. Another example if we have two devices, along both side of a wall, system can be used to simulate a virtual window by projecting, processing and bypassing images to each other.

It can be used to project information at complex places such as in the bathroom during the shower or exploration of the dark cave with simultaneous mapping, visualization, and navigation.

BRIEF DESCRIPTION OF THE DRAWING

FIG. 36 is a table of exemplary API (Application programming Interface) methods.

FIG. 39 is a table of exemplary interaction methods.

FIG. 40 is a table of exemplary gesture methods.

FIG. 41 is a table of exemplary user interface elements.

FIG. 68 shows list of basic gesture recognition methods.

FIG. 69 shows list of basic computer vision methods.

FIG. 70 shows list of basic computer vision methods.

DETAILED DESCRIPTION OF THE INVENTION

Figure 1:
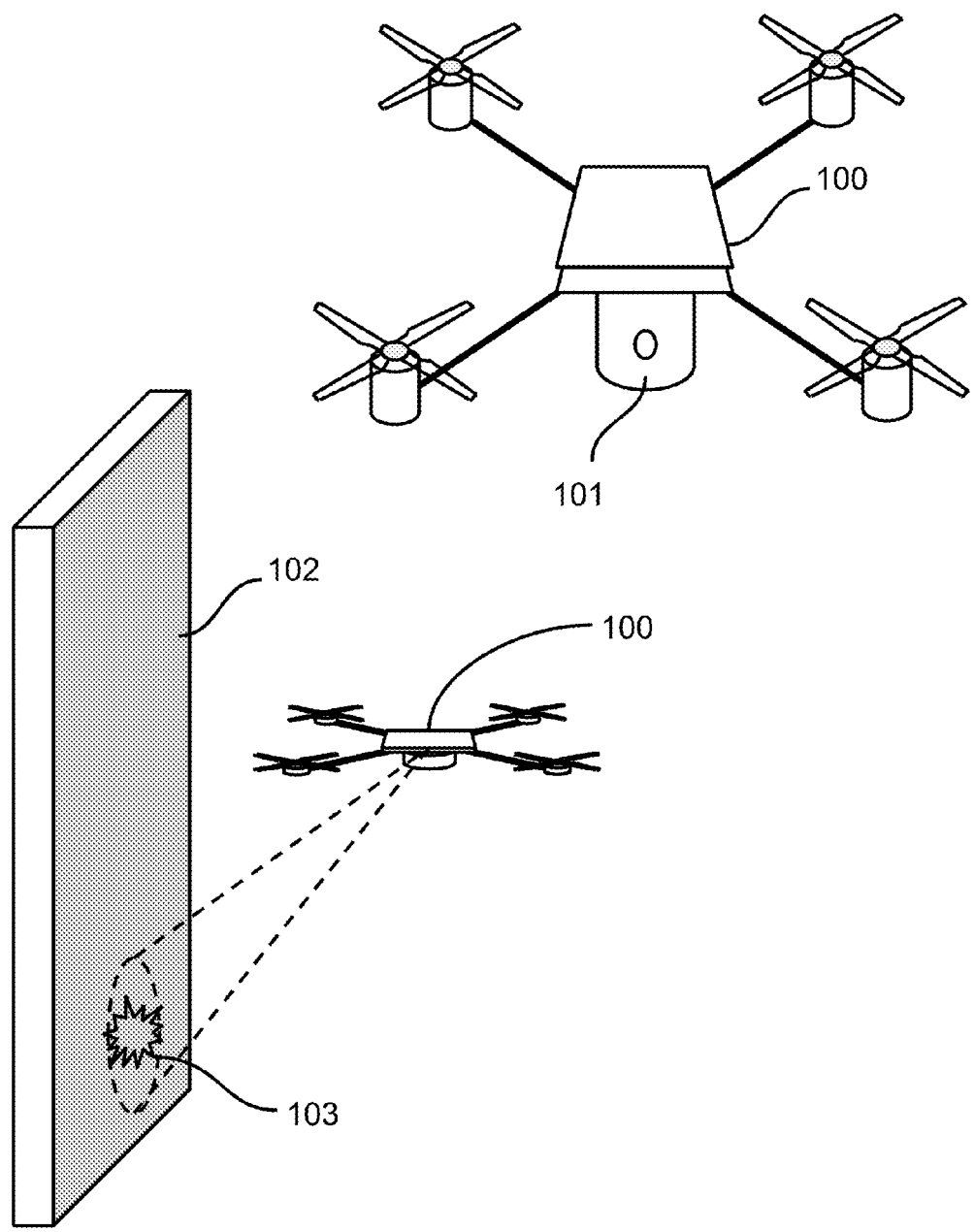
FIG. 1 is a schematic view of a prior art method of displaying projection using a quadcopter or drone system in the mid-air.
Figure 2:
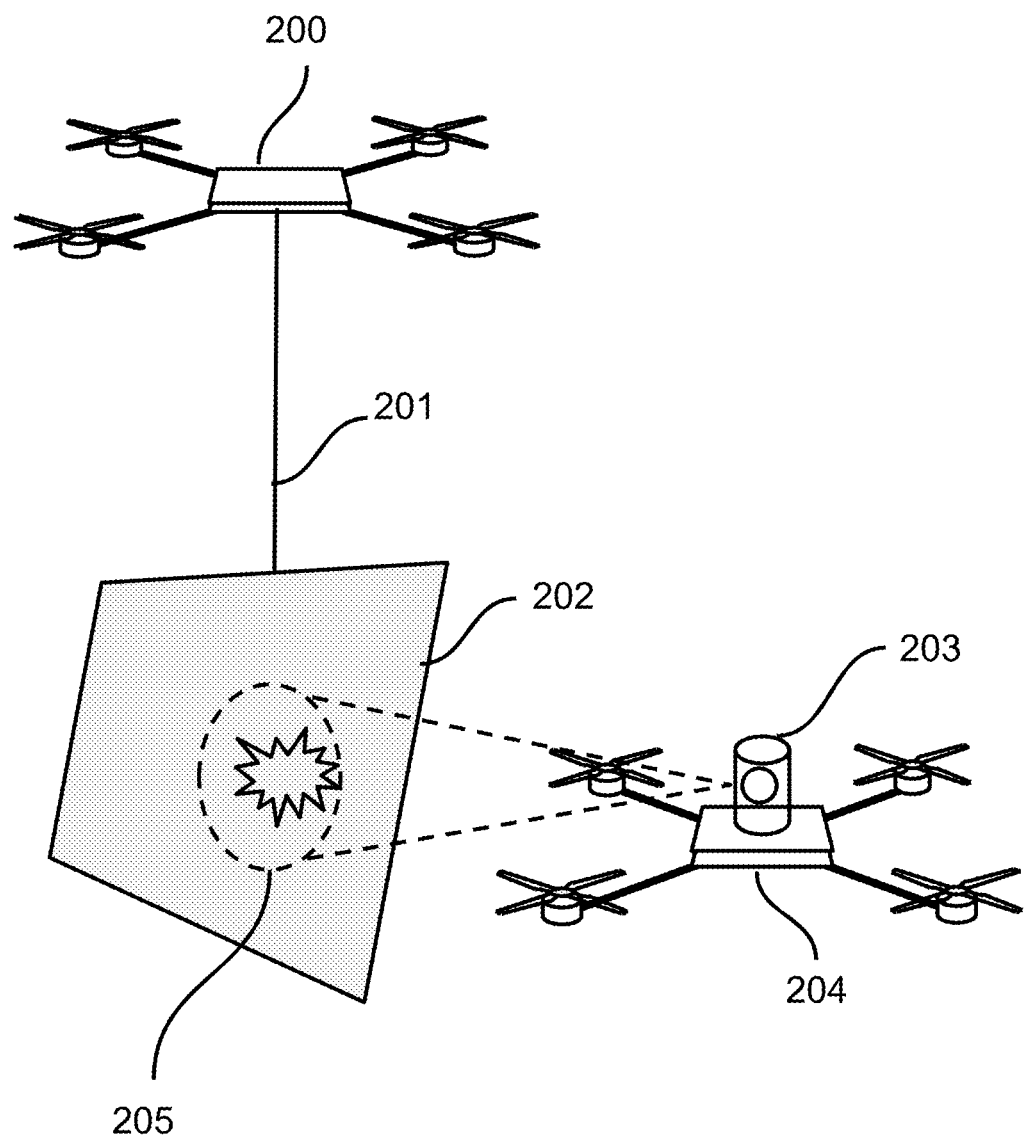
FIG. 2 is a schematic view of a prior art method of displaying projection on a flying surface using two drones in the mid-air.
Figure 3:
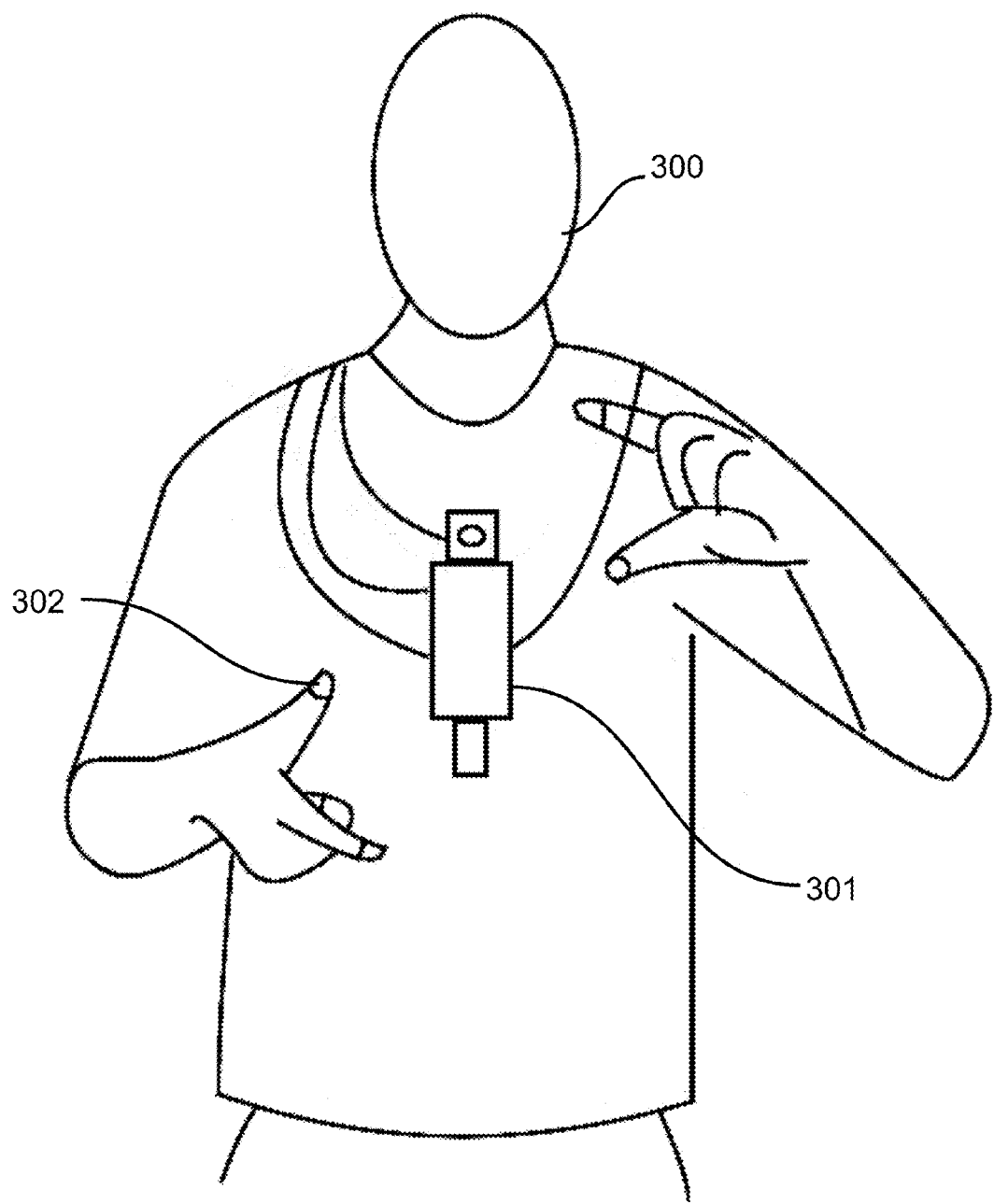
FIG. 3 is a schematic view of a prior art method of displaying projection using wearable projector camera system or wearable Gestural Interface.
Figure 4:
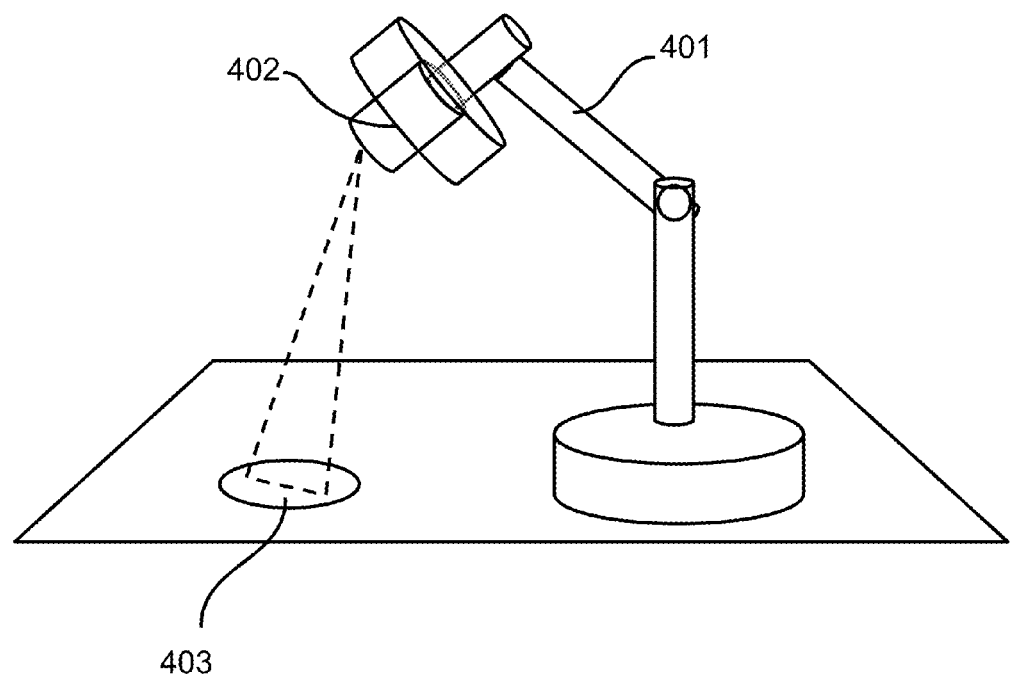
FIG. 4 is a schematic view of a prior art method of displaying projection using a robotic arm.
Figure 5:
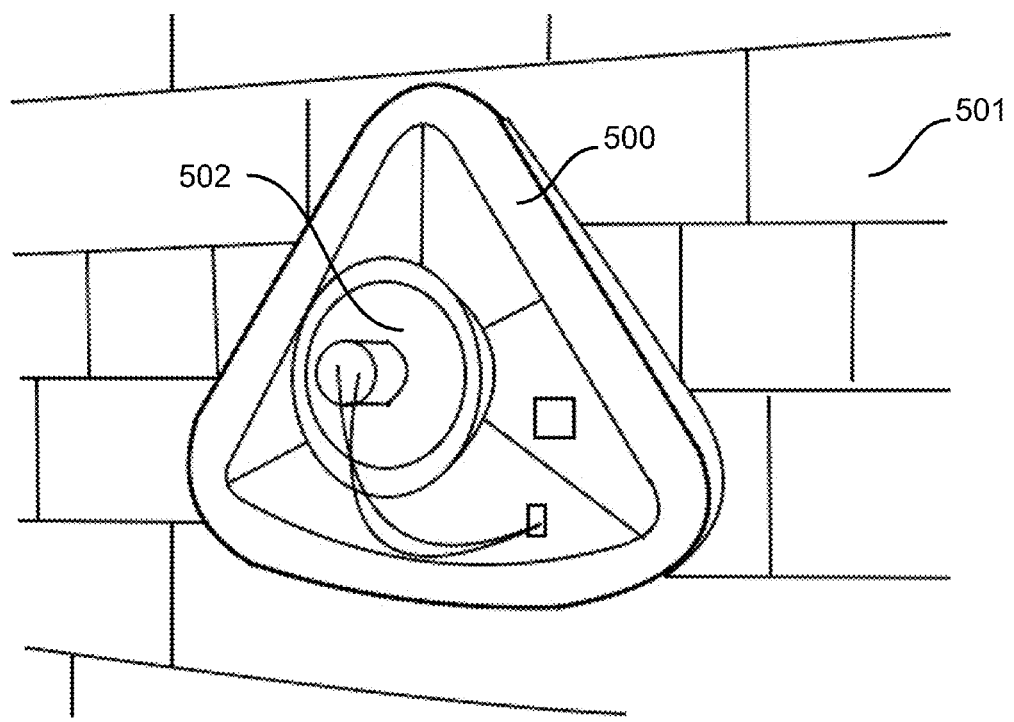
FIG. 5 is a schematic view of a prior art of wall climbing robot based on using vacuum technology.
Figure 6:
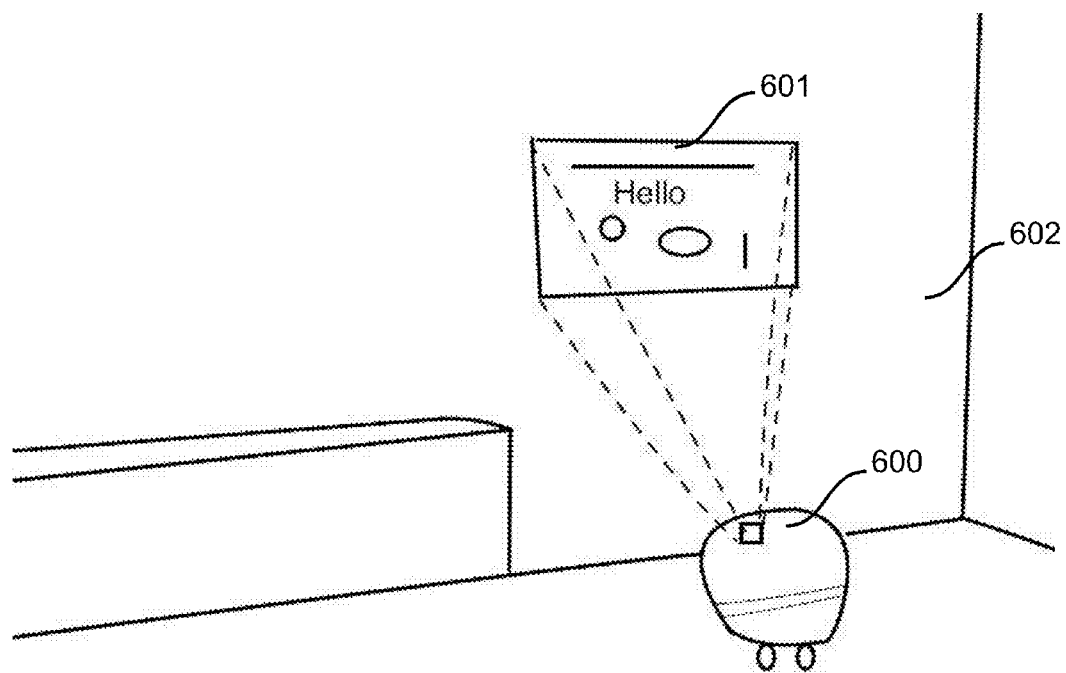
FIG. 6 is a schematic view of a prior art of mobile projector system can navigate from one location to another on the floor like a robotic vacuum cleaner.

The main unique feature of this device is its ability to fly, stick, and project user-interface to any nearby surface. Various prior works show how all these individual features or parts were implemented for various applications. One related prior work called "Displaydrone" as shown in FIG. 1 consists of a projector 101 equipped with a drone 100 to display information 103 on surface 102. Similar prior work, as shown in FIG. 2 consists of two drones and a surface. Drone 200 holds the surface in the mid-air using an attachment or rod 201 and drone 204 augments information 205 on a flying display surface 202 using a projector 203. Some prior work such as "SixthSense" consists of a wearable mobile projector camera system 301 as shown in FIG. 3. User 300 can use gesture using hands, body parts, fingers, or markers 302 to interact with the device. FIG. 4 shows how robotic arm 401 called "LUMINAR" can be used to project augmented user interface 403 on a table using projector camera system 402. FIG. 5 shows that sustainable wall climbing and sticking is possible using currently available vacuum technologies. For example in FIG. 5, a robot 500 called "CITY Climber" is climbing on wall 501 using vacuum gripping system 502. Some prior work is based on mobile robot similar to a robotic vacuum cleaner as shown in FIG. 6 where mobile robot 600 called "Keecker" projects information 601 on surface such as wall 602 using a projector.

Figure 7:
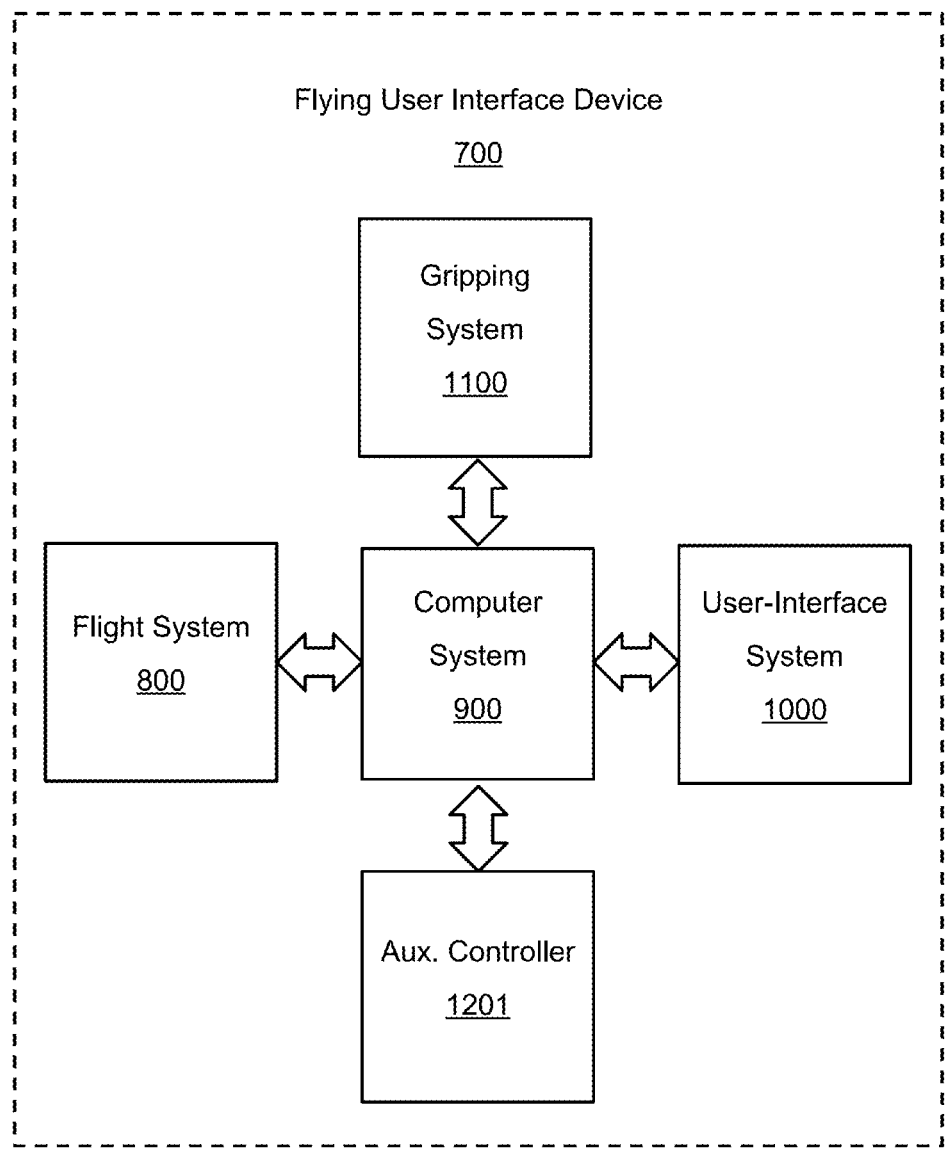
FIG. 7 is a high-level block diagram of the flying user interface device.

To engineer flying interface we need three basic abilities or functionalities in a single device 1) Device should be able to fly 2) Device should be able to stick to the nearby surface and 3) Device should be able to project information on any nearby surface. A high-level block diagram in FIG. 7 describes the five basic subsystem of flying user interface such as flight system 800, gripping system 1100, computer system 900, and user interface system 1000, and other application specific subsystem or auxiliary controller(s) 1201.

Computer system 900 further consists of computing or processing device 903, input output, sensor devices, wireless network controller or Wi-Fi 905, memory 902, display controller such as HDMI output 907, audio or speaker 904, disk 906, and other application specific sensor or devices 909. In addition computer system may connect or consists of sensors such a surface sensor to detect surface (like bugs Antenna), sonar or ultrasound sensors, Laser sensors such as Laser Detection And Ranging (LADAR), barometer, accelerometer 901, compass, GPS 908, gyroscope, microphone, and more. System may have additional devices depends on the nature of application. For example for the cooking application described in FIG. 55, system may use a thermal camera to detect the temperature of the food. Thermal camera also helps to detect human. For another example system may have a light for the exploration of the dark places or caves. Computer may have Internet or wireless network connectivity. Other subsystems such as Flight controller 801 also consists of a small computing device or processor, and may access sensors data directly if required for their functionalities. For example either computer can compute stable flight parameters such as speed of rotators for flight controller using sensor reading such as accelerometers and gyroscope or flight controller directly access these raw data from sensors and compute parameters using an onboard micro processor.

Figure 8:
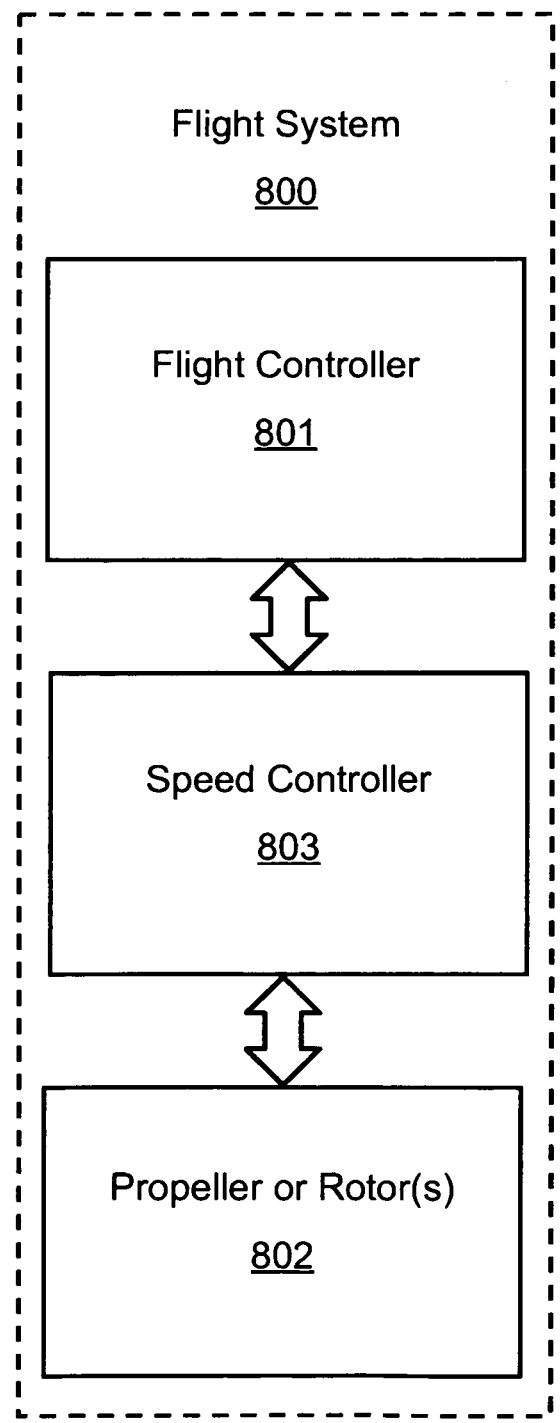
FIG. 8 is a high-level block diagram of the flight system for flying user interface device.
Figure 9:
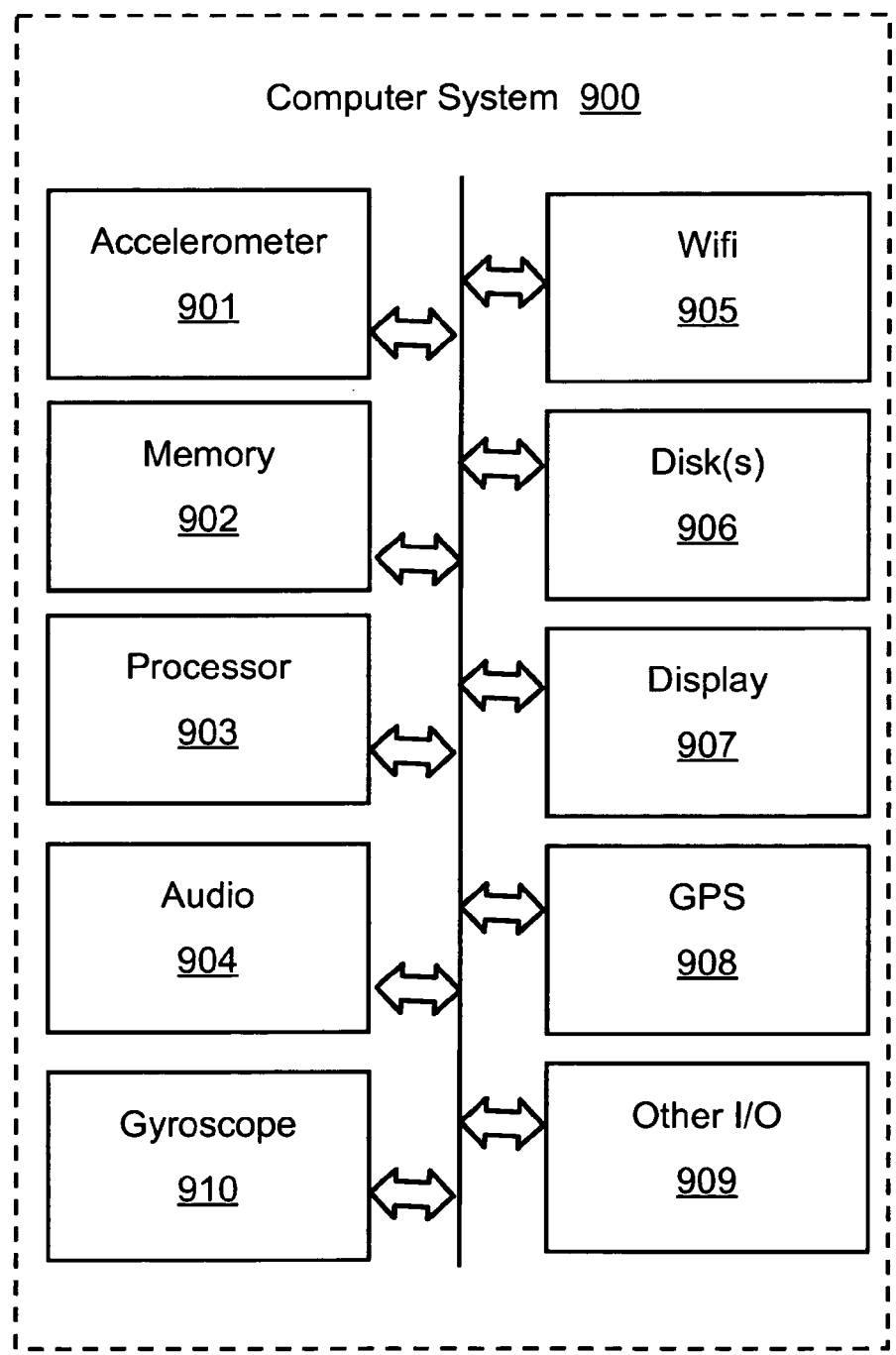
FIG. 9 is a high-level block diagram of the computer system for flying user interface device.

Flight system 800 further contains flight controller 801 that control propellers or rotators 802 as shown in FIG. 8. Flight system 800 also contains all other components required for stable and sustainable flight control such as Electronic Speed Controller (ESC) 803, or any other application or medium (air, water, space, etc.) specific flight subsystem.

Figure 11:
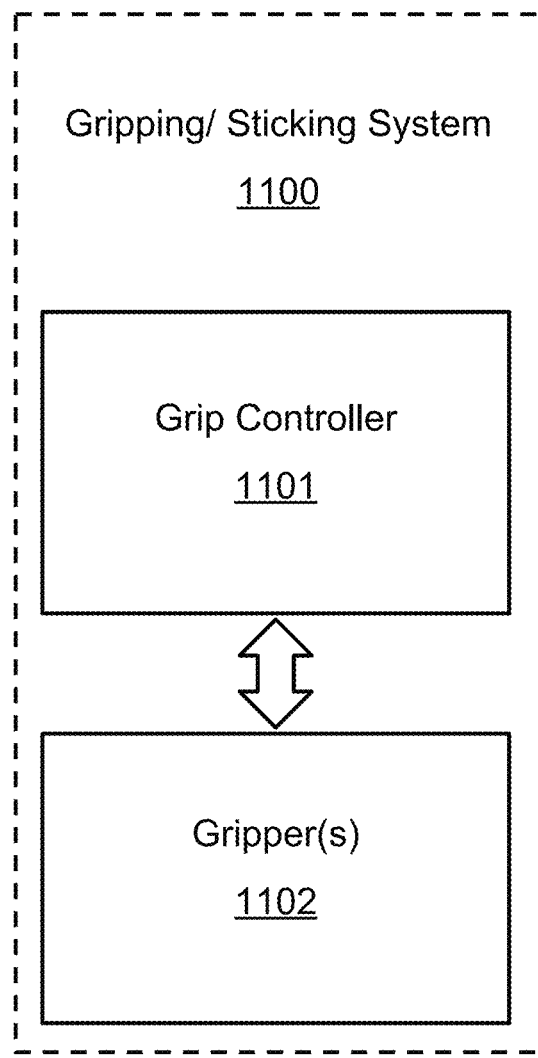
FIG. 11 is a high-level block diagram of the gripping or sticking system for flying user interface device.

Gripping system 1100 further contains grip controller 1101 that control gripper 1102 such as vacuum based gripper as shown in FIG. 11.

Figure 10:
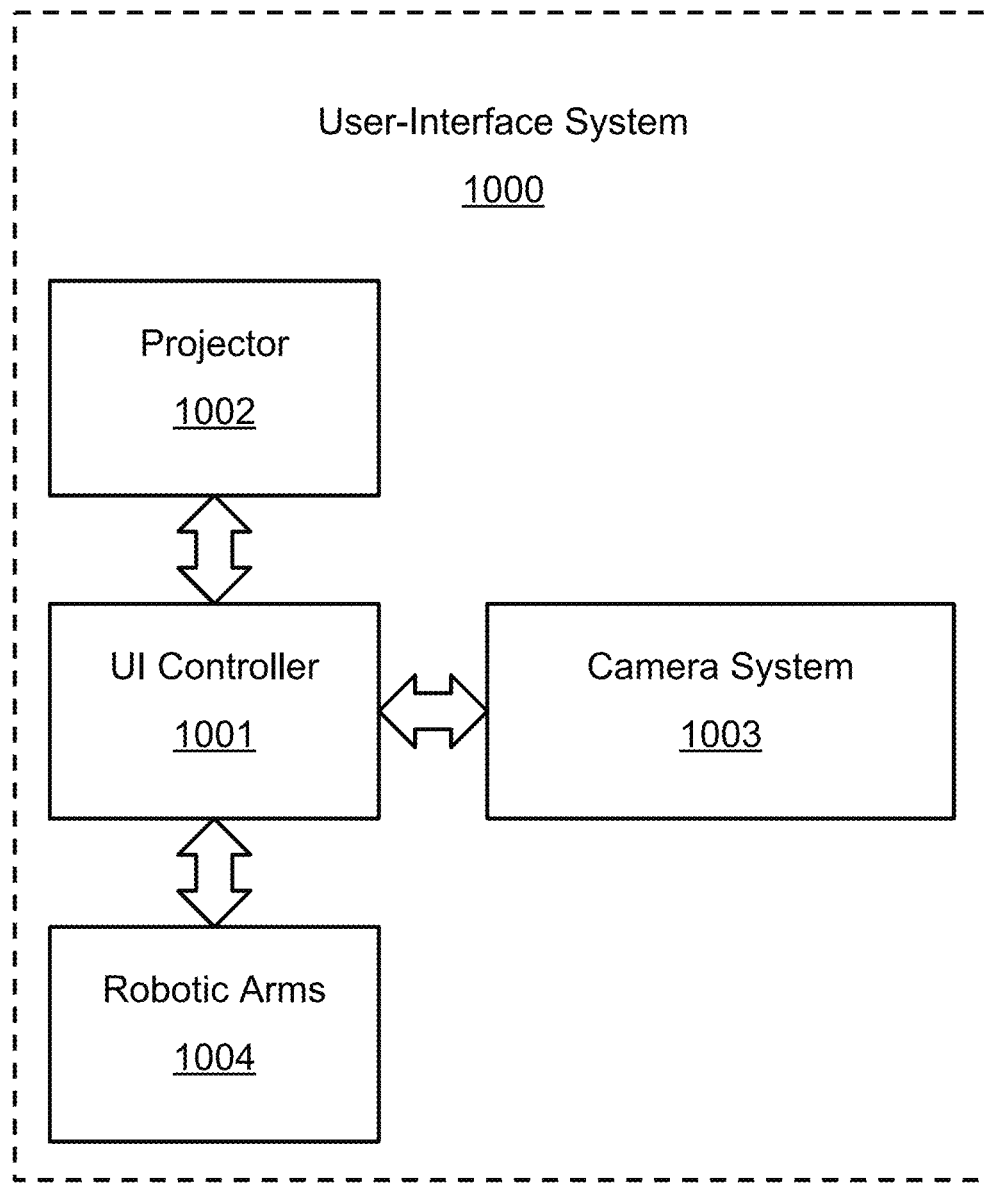
FIG. 10 is a high-level block diagram of the user interface system for flying user interface device.

User Interface system 1000 further contains UI controller 1001 which controls projector 1002, robotic arms 1004, and cameras 1003 as shown in FIG. 10.

Figure 12:
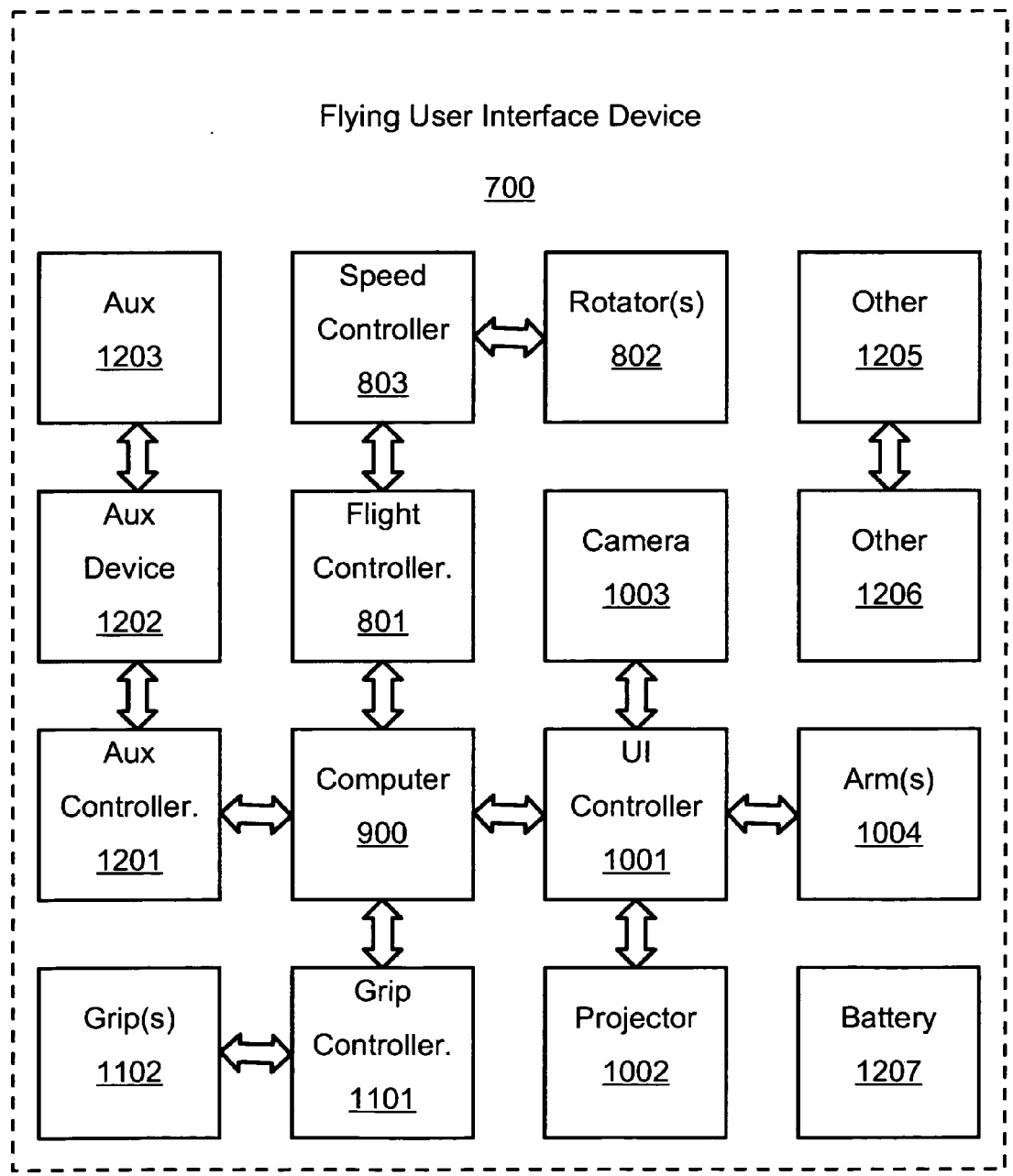
FIG. 12 is a detailed high-level block diagram of the flying user interface device.

Finally, FIG. 12 shows a detailed high-level block diagram of the flying user interface device connecting all subsystems including power 1207 an additional application specific devices and controllers 1204, 1205, 1206, 1201, 1202, 1203, more. Any available state of the art method, technology or devices can be configured to implement these subsystems to perform device function. For example we can use magnetic gripper instead of vacuum gripper in gripping subsystem or we can use holographic projector as a projection technology.

Figure 13:
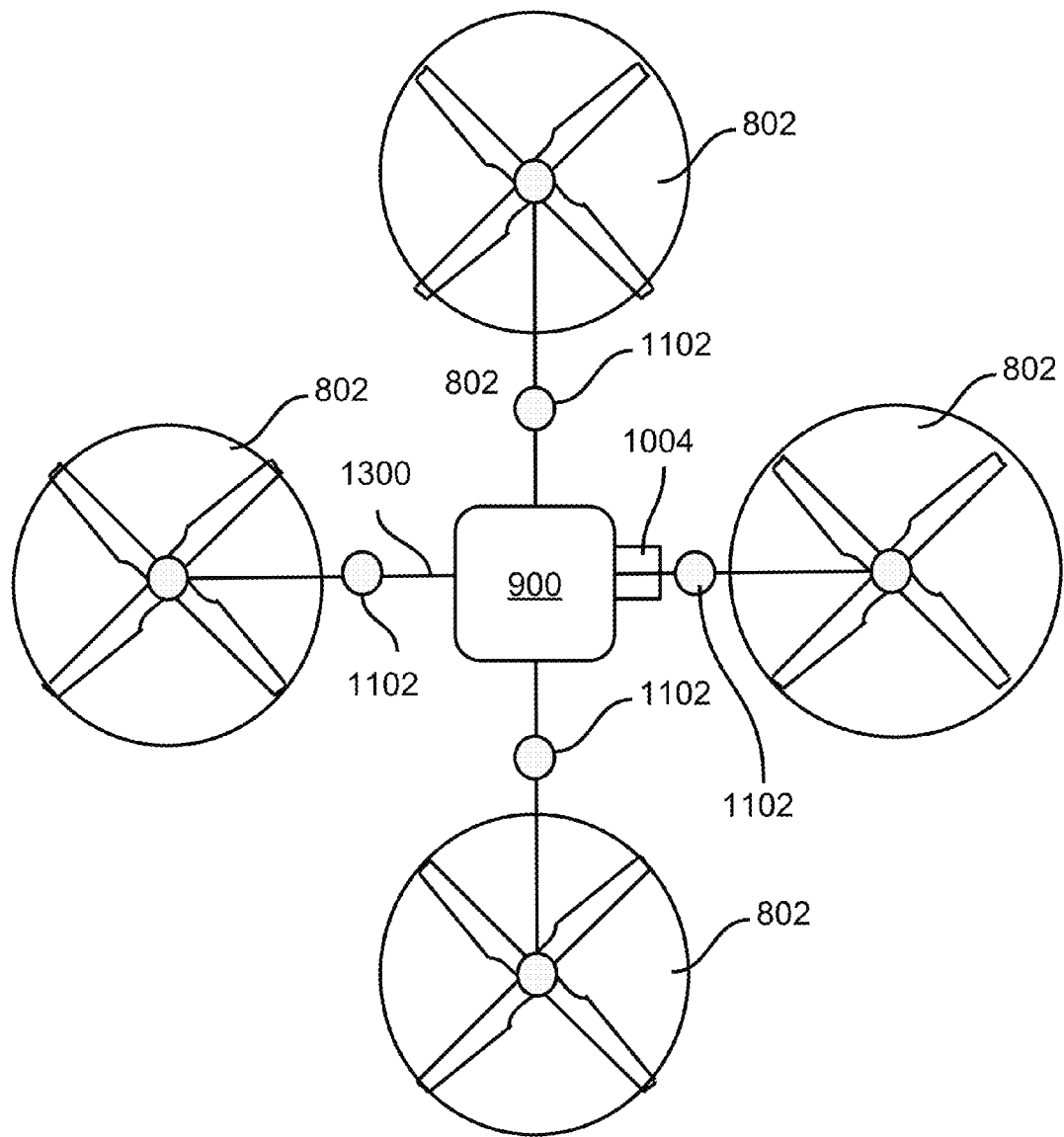
FIG. 13 shows a top view of the flying user interface device.
Figure 14:
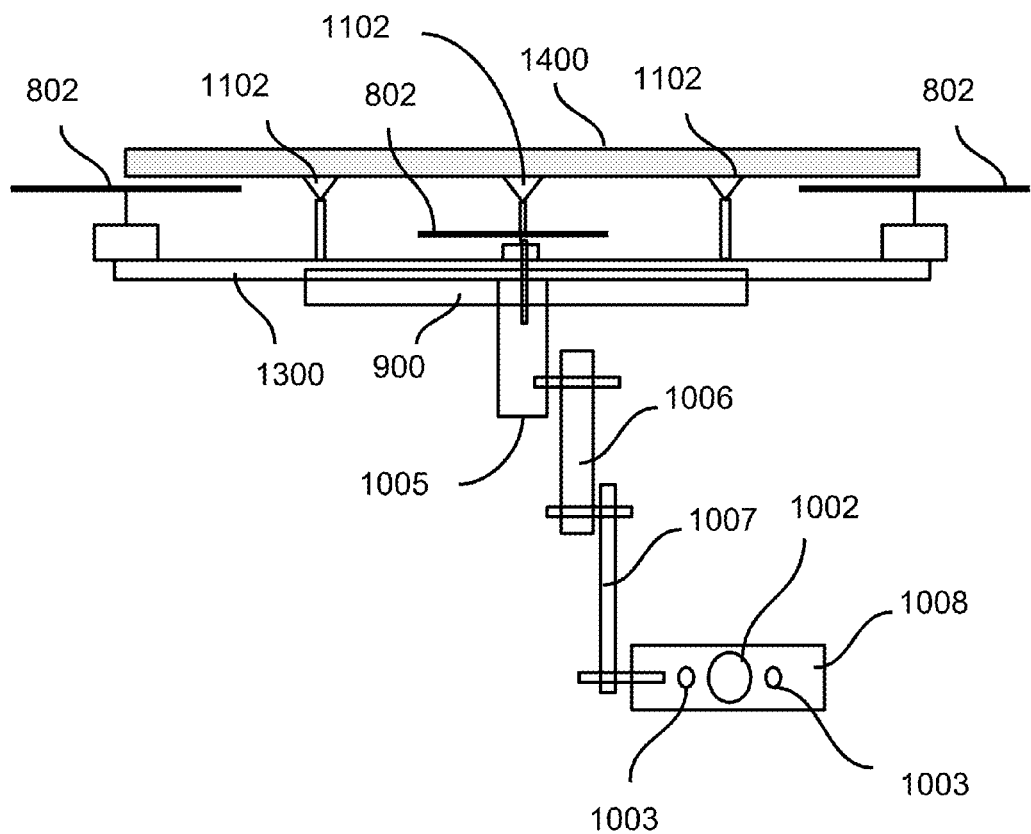
FIG. 14 shows a front view of the flying user interface device.
Figure 15:
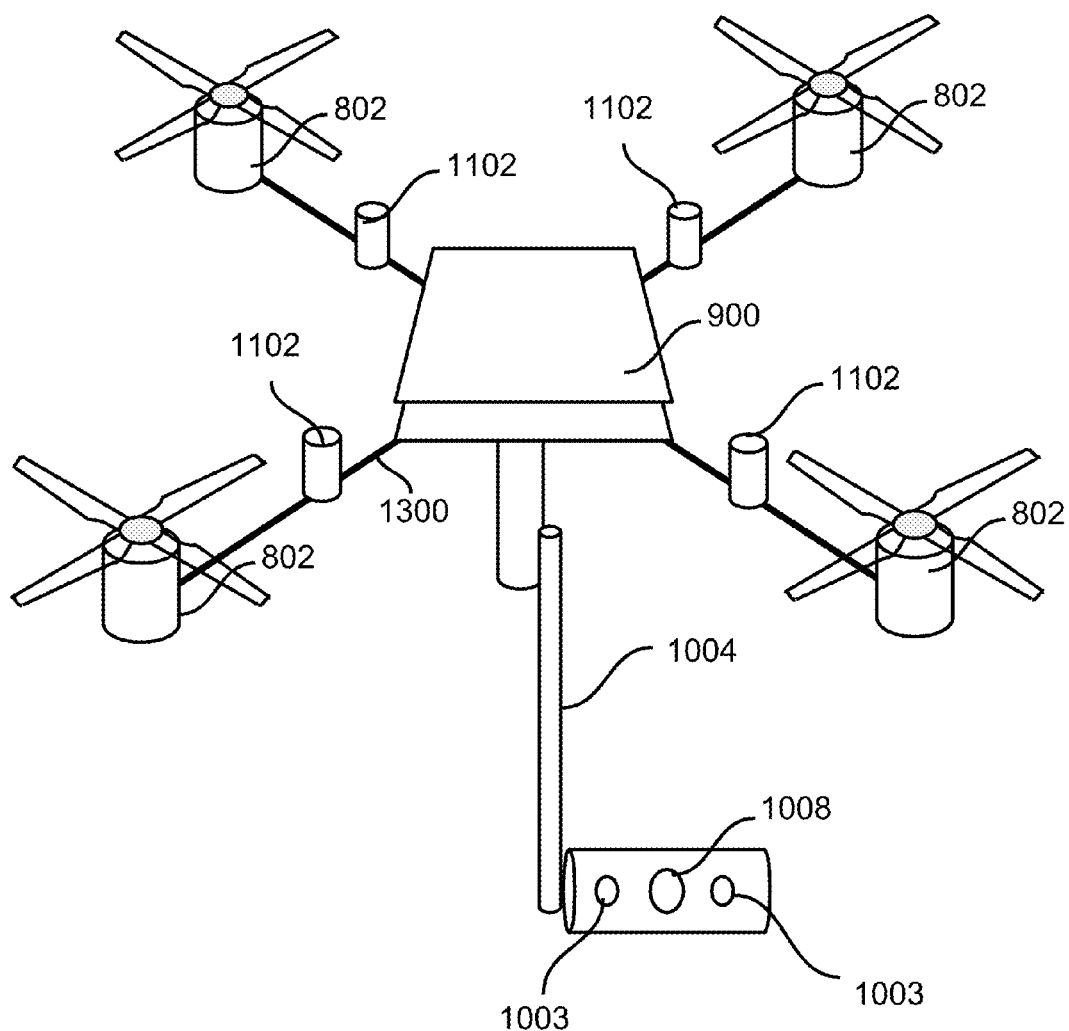
FIG. 15 shows a perspective view of the flying user interface device.

FIG. 13 shows preferred embodiment of this invention. Front and perspective views are shown in FIGS. 14 and 15 respectively.

Figure 16:
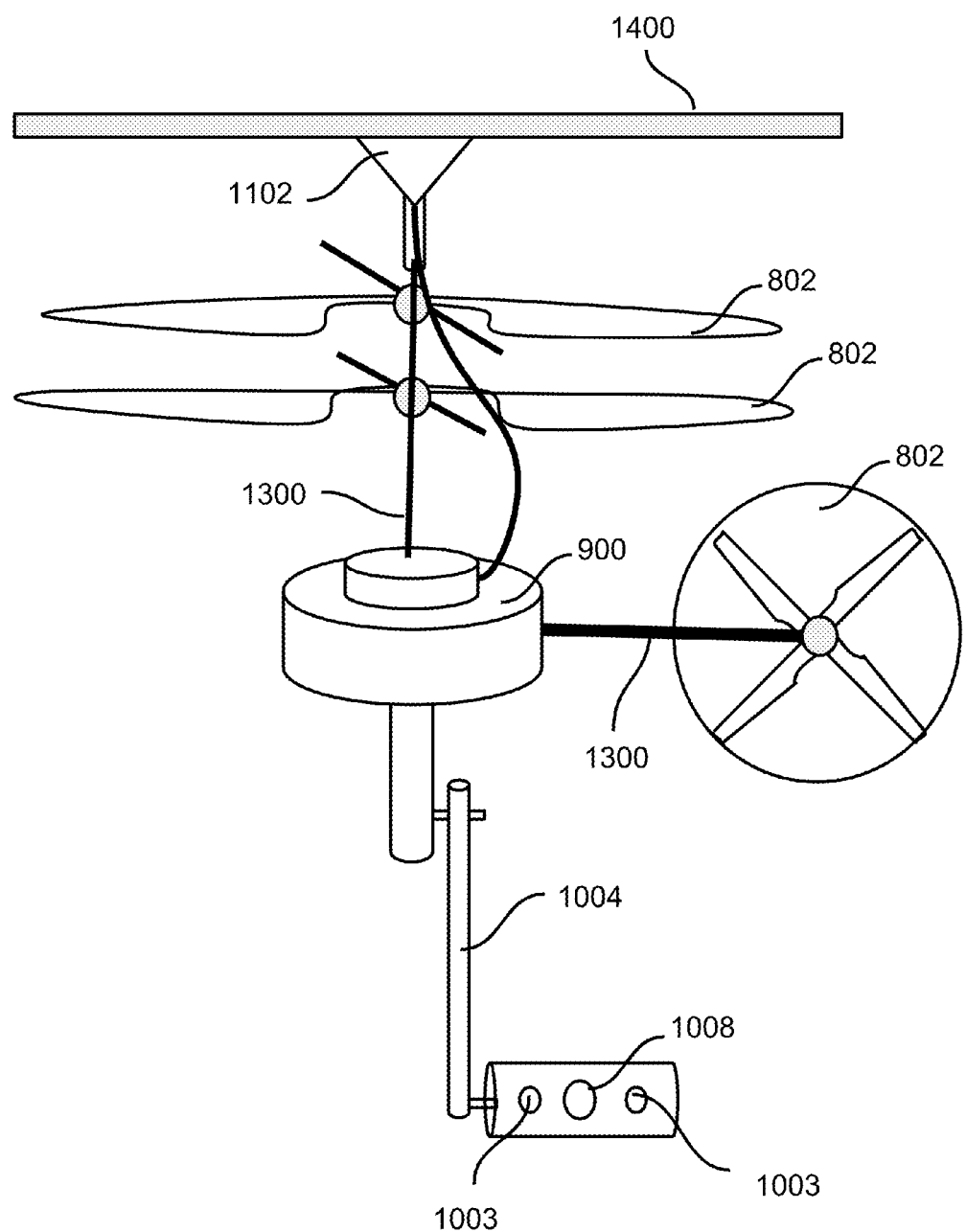
FIG. 16 shows a front view of another alternative embodiment of the flying user interface device, which uses helicopter as flying subsystem.
Figure 17:
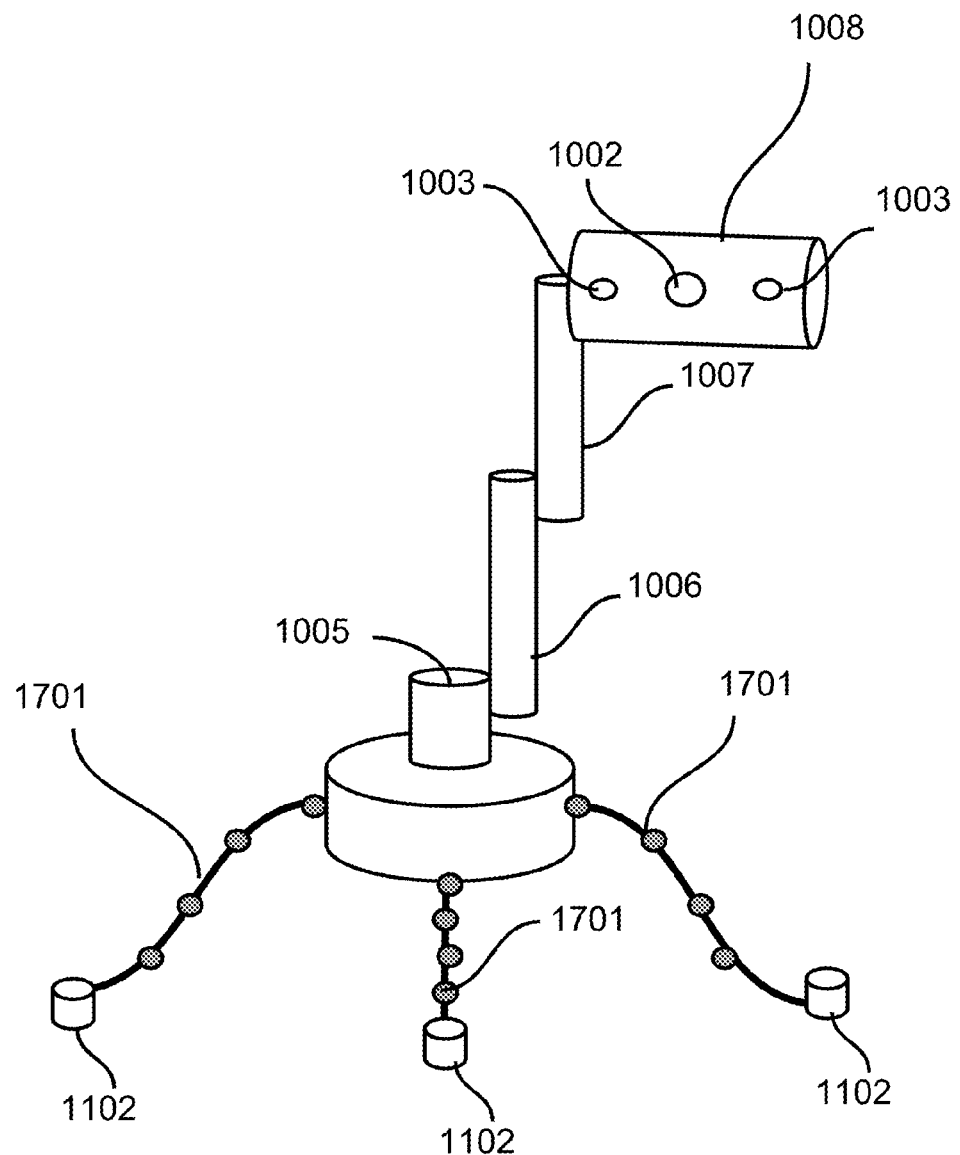
FIG. 17 shows a front view of another alternative embodiment of the flying user interface device in the liquid medium such as water which uses octopus like movable arms and propulsion, equipped with gripper and a projector camera arm attached to main body.

To design a flight mechanism, a quadcopter (also called drone in normal daily life) can be used. All components of the quadcopter are attached to a frame or body. All four rotors are attached to rod(s), 1300, which are further, attached to the center body containing a flight computer 900 and other electronics such as battery, sensors, etc. In theory we can use any type of flying system. For example we can use a mini helicopter as a flying machine as shown in FIG. 16. Device can be used even in the water as shown in FIG. 17 where one or more legs or arms 1701 used for propulsion. Legs also may contain grippers 1102.

Figure 21:
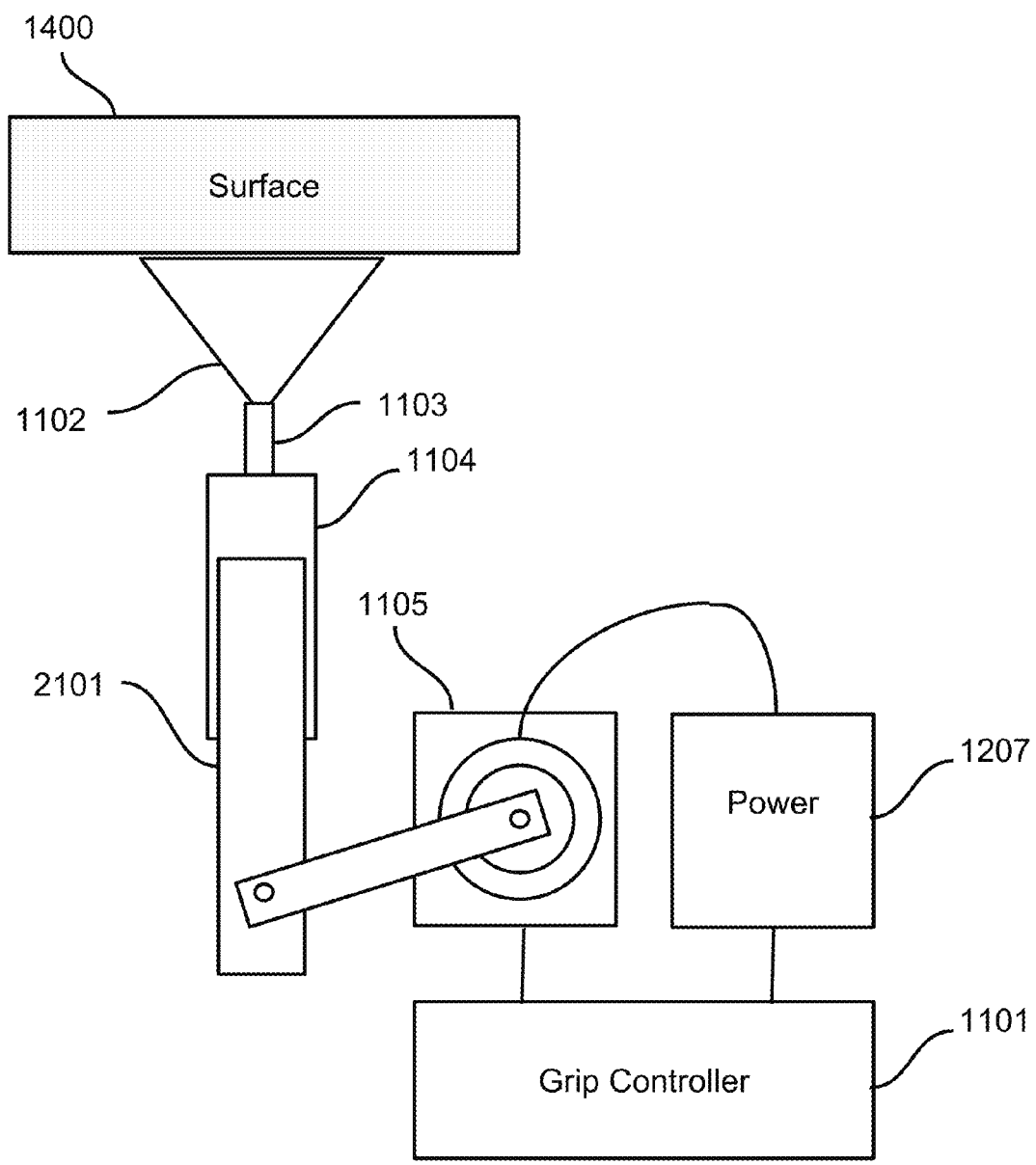
FIG. 21 shows a front view of the piston pump based vacuum system.
Figure 22:
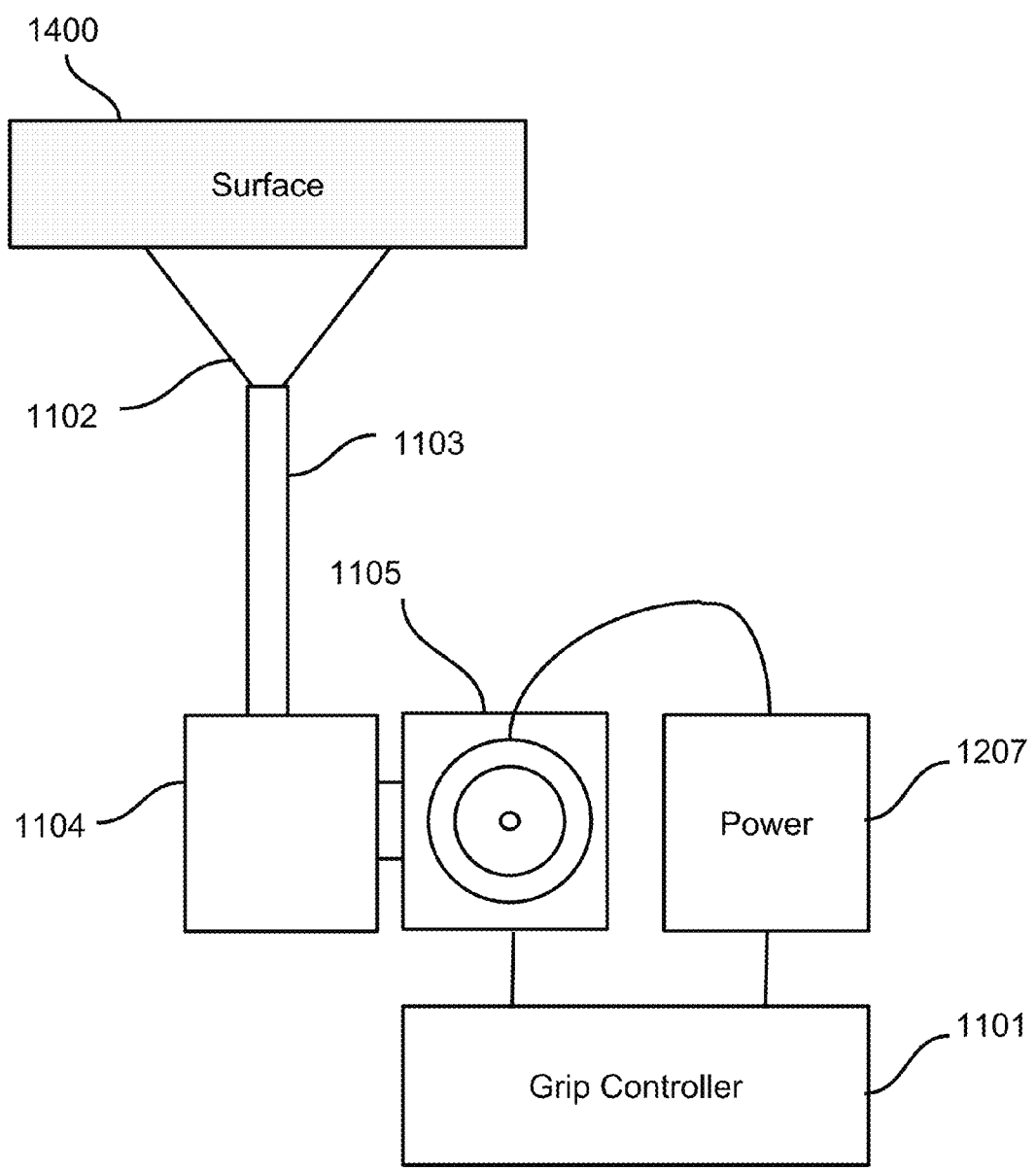
FIG. 22 shows a front view of the vacuum generator system.
Figure 23:
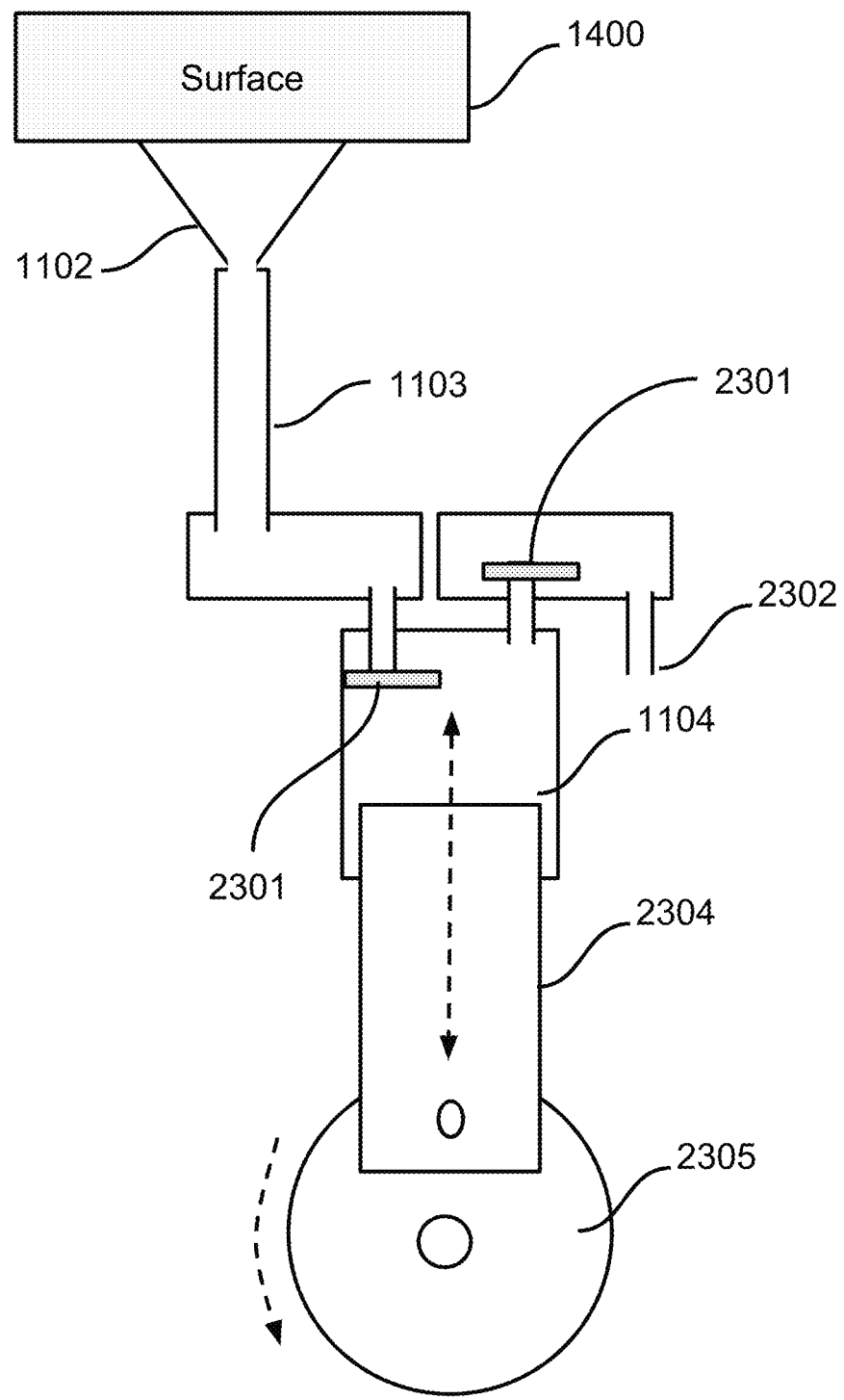
FIG. 23 shows a front view of the vacuum generator system using pistons compression technology.
Figure 24:
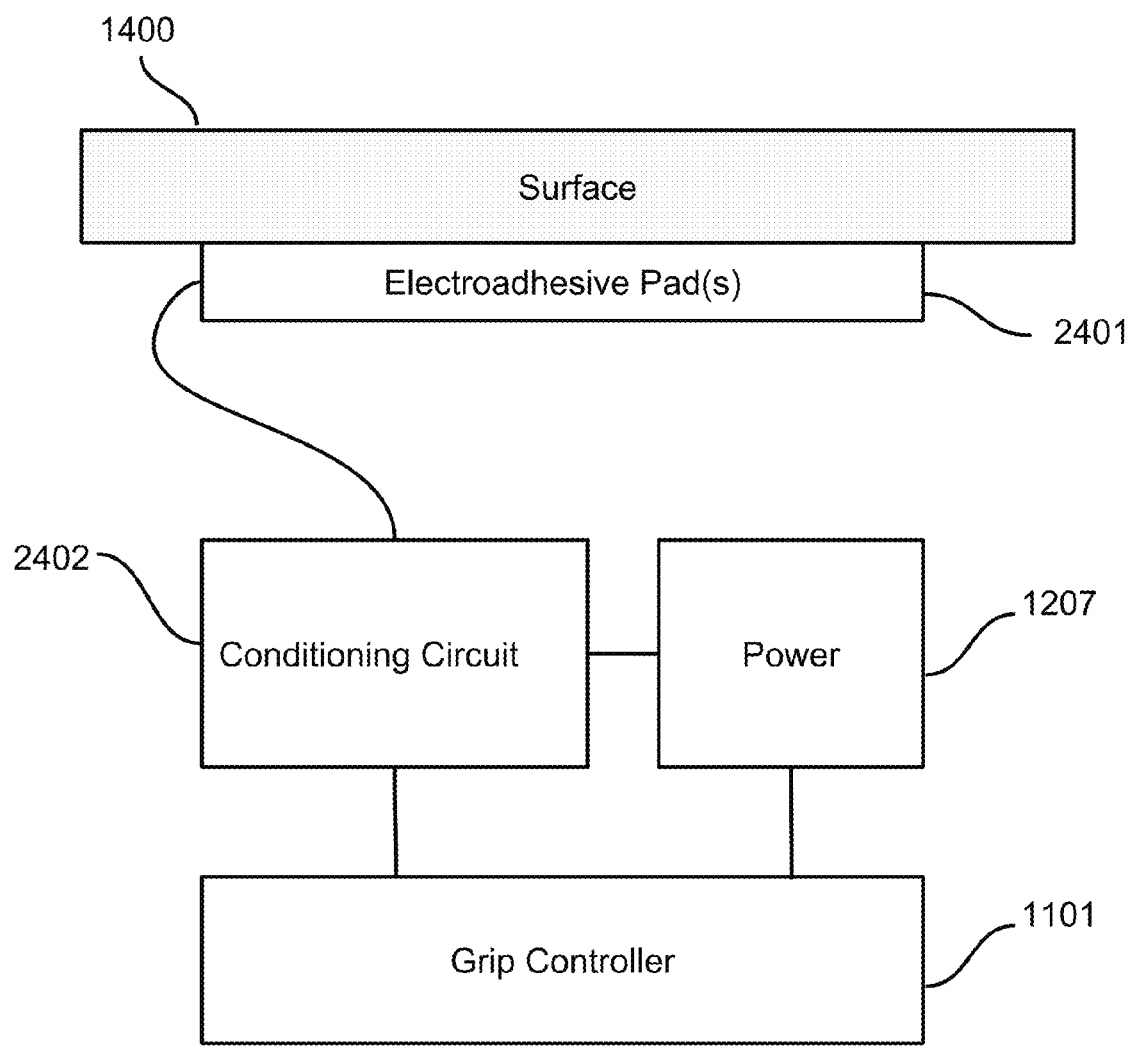
FIG. 24 shows a gripping or sticking mechanism using electroadhesion technology.
Figure 25:
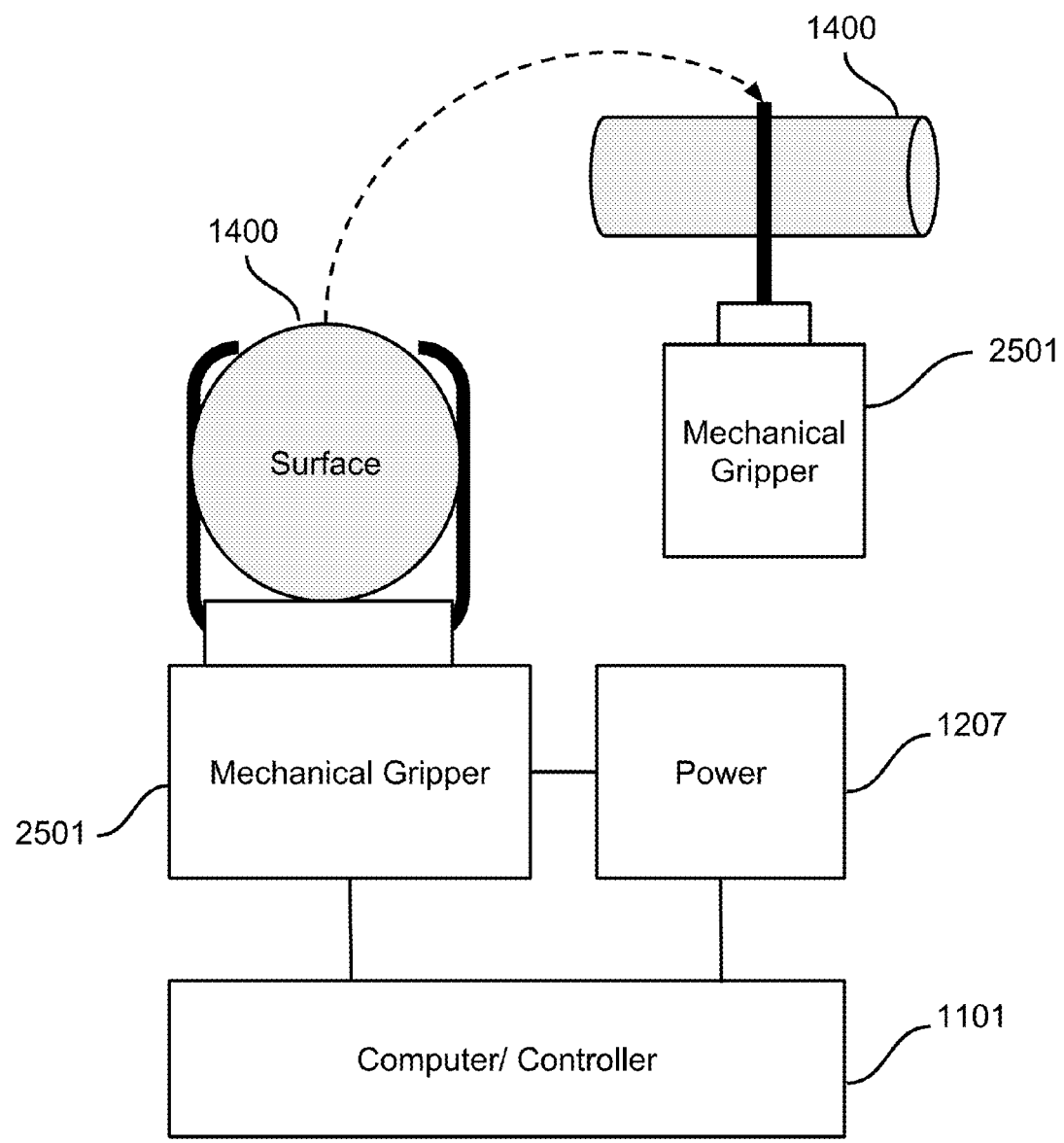
FIG. 25 shows a mechanical gripper or hook.
Figure 26:
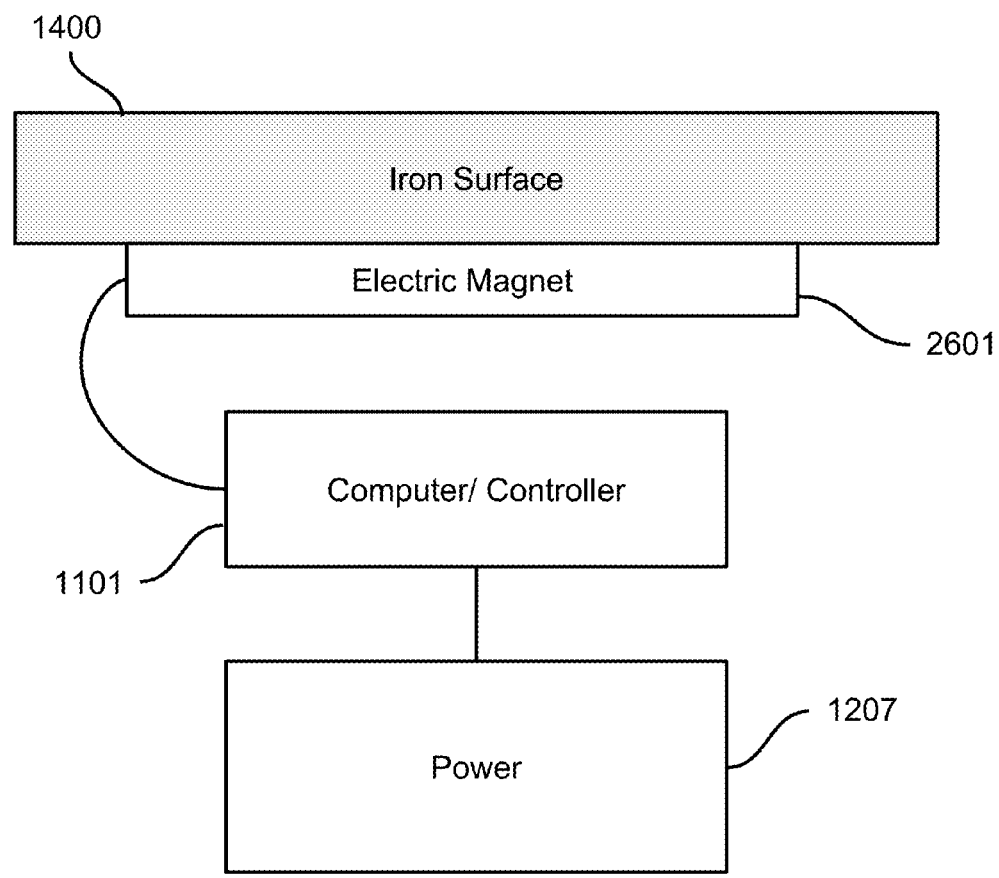
FIG. 26 shows a magnetic gripper or sticker.

To solve the problem of sticking to a surface 1400, we used basic mechanical component called vacuum gripping system shown in FIGS. 21, 22 and 23 that are generally used in the mechanical or robotics industry for picking or grabbing objects. FIG. 21 shows a simple vacuum system, which consists of a pump 2101 controlled by a vacuum generator 1105. FIG. 22 shows a compressor based vacuum generator. FIG. 23 shows internal mechanism of a piston a based vacuum generator where vacuum is generator using a piston 2304 and plates (intake or exhaust valve) 2301 attached to the openings of the vacuum chamber 1104. Note in theory, we can also use other type of gripper that depends on the nature of the surface. For example magnetic grippers 2601 can be used to stick to an iron surfaces of machines, containers, cars, truck, trains, etc. as shown in FIG. 26. In another example, electroadhesion technology can be used to sticking as shown in FIG. 24 where electroadhesive pads 2401 sticks to the surface using a conditioning circuit 2402 and a grip controller 1101. To grip rods like material, mechanical gripper 2501 can be used as shown in FIG. 25.

Figure 20A:
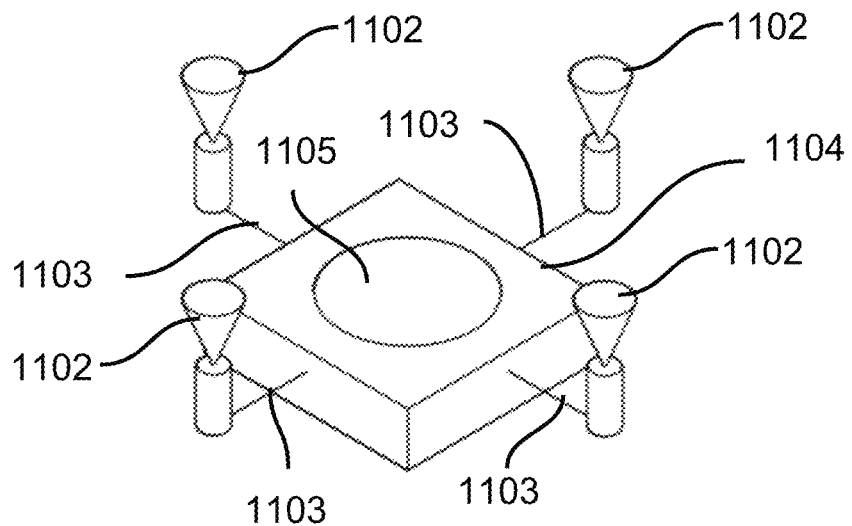
FIGS. 20A and 20B show perspective and top view of the centralized vacuum system.
Figure 20B:
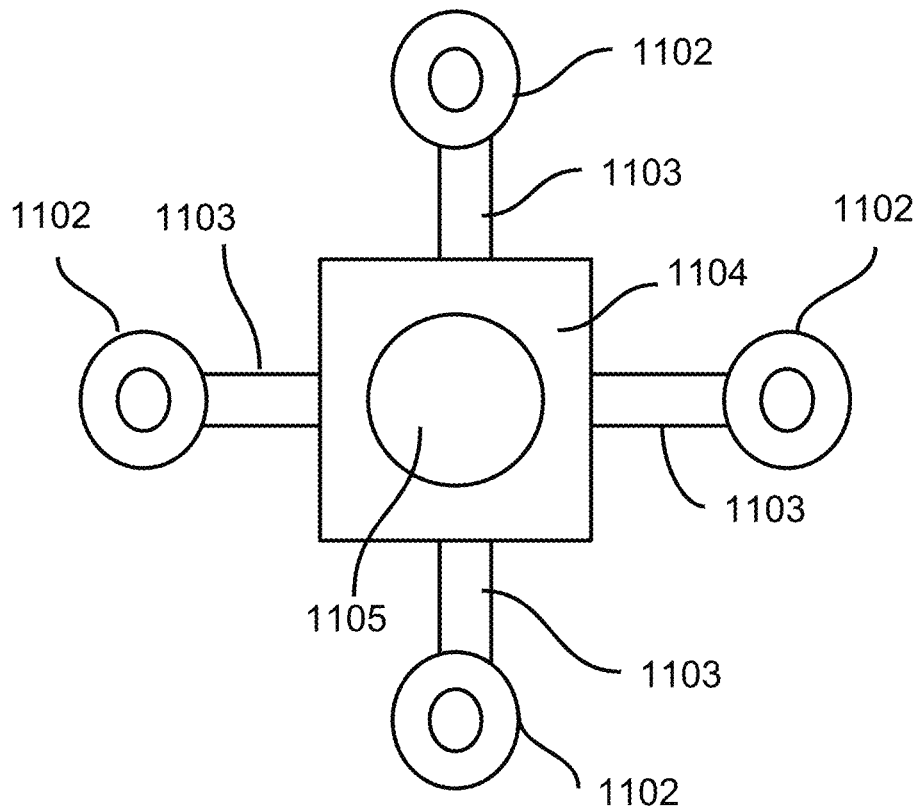

For this prototype, we are using vacuum gripping system described in FIG. 20. Vacuum gripping system has three main components; 1) Vacuum suction cups 1102, which are the interface between vacuum system and the surface. 2) Vacuum generator 1105, which generates vacuum using motor, ejectors, pumps or blowers. 3) Connectors or tubes 1103 that connect suction cups to vacuum generator via vacuum chamber 1104. In this prototype we used four grippers (vacuum suction cups), but their quantity may vary from one to many, depends on the type of surface, and ability to grip by the hardware, weight of the whole device, and height of the device from ground. Four grippers are mounted to the frame of the quadcopter. All four vacuum grippers are connected to a centralized (or decentralized) vacuum generator via tubes. When vacuum is generated, grippers suck the air, and stick to the nearby surface. We may optionally use a sonar or (Infrared) IR surface detector sensor (because two stereoscopic cameras can be used to detect surface). In an advanced prototype, we can also use switches and filters to monitor and control the vacuum system.

Figure 18:
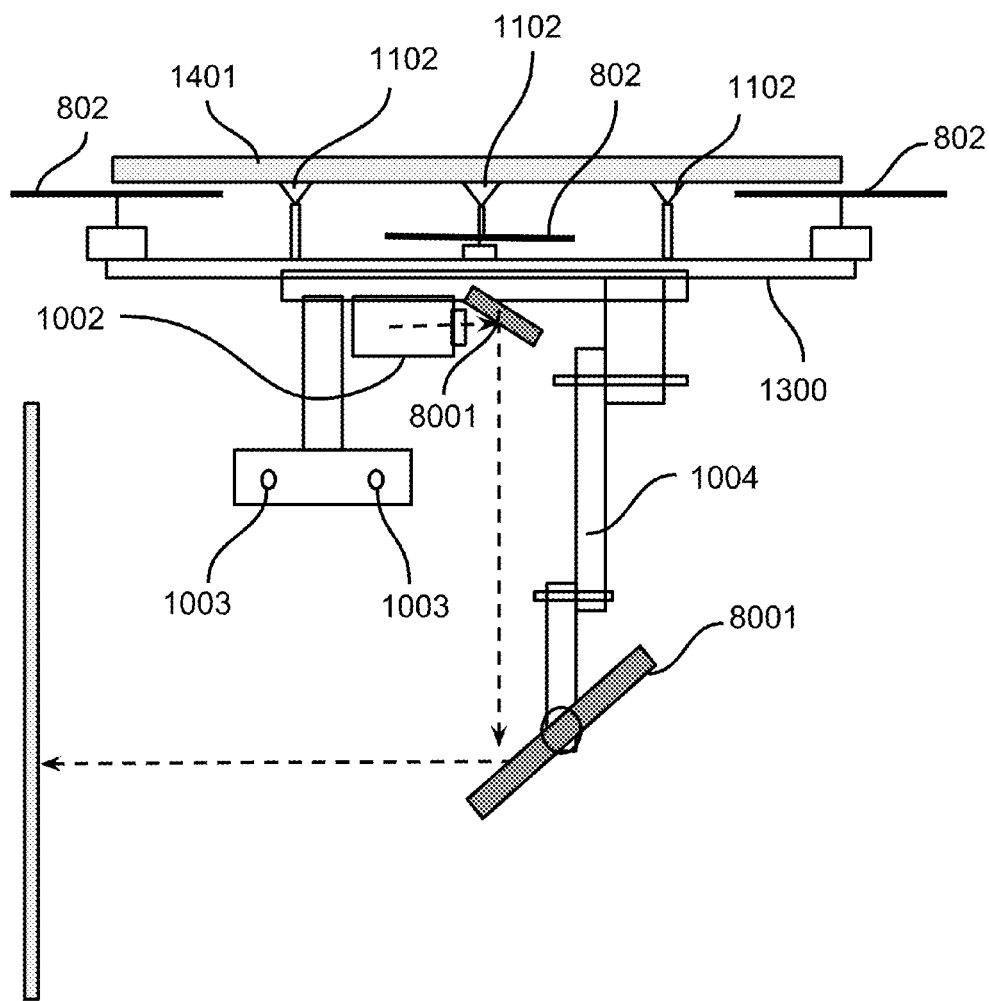
FIG. 18 shows a front view of another alternative embodiment of the flying user interface device, which uses fixed projector and robotic mirror as projection subsystem.
Figure 19:
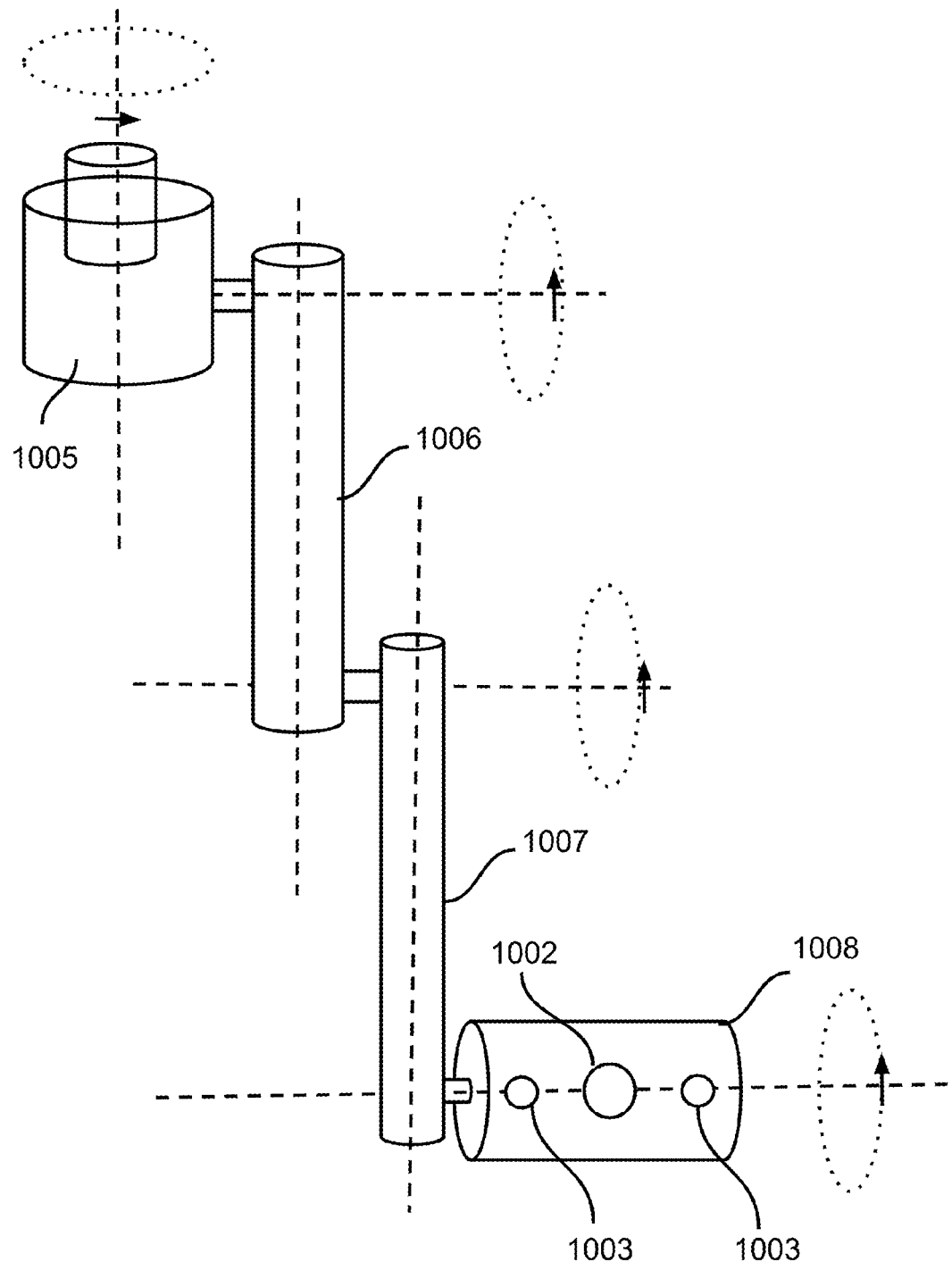
FIG. 19 shows a robotic arm with a projector and two cameras.

To solve problem of augmenting information on any surface conveniently, we designed a robotic arm containing a projector 1002 and two set of camera 1003 (stereoscopic vision) to detect depth information of the given scene as shown in FIG. 19. Robotic arm generally folds automatically during the flight, and unfolds during the operation. Base sub arm has ability to rotate 360 (where rotation axis is perpendicular to the frame of the device). Middle sub arms 1006 and 1007 also rotate 360 degree. Middle sub arm also have a motor that rotate camera and projector body 1008 in 360 degree. Combination of all rotation in all arms assists to project any information on any nearby surface with minimum flight requirement. Two cameras also help to detect surfaces including the surface where device has to be attached. Projector may also use a mirror to change direction of the projection. Direction changing procedure could be robotic. For example, In another implementation, a fixed and heavy projector 1002 attached to the main body and static or robotic mirror(s) such as 8001 can be used to change the direction and orientation of projection as shown in FIG. 18. Length of the arms and degrees of freedom may vary, depends of the design, application, and size of the device. Some applications only require one degrees of freedom whereas other two or three, or more degrees of freedom.

Figure 28:
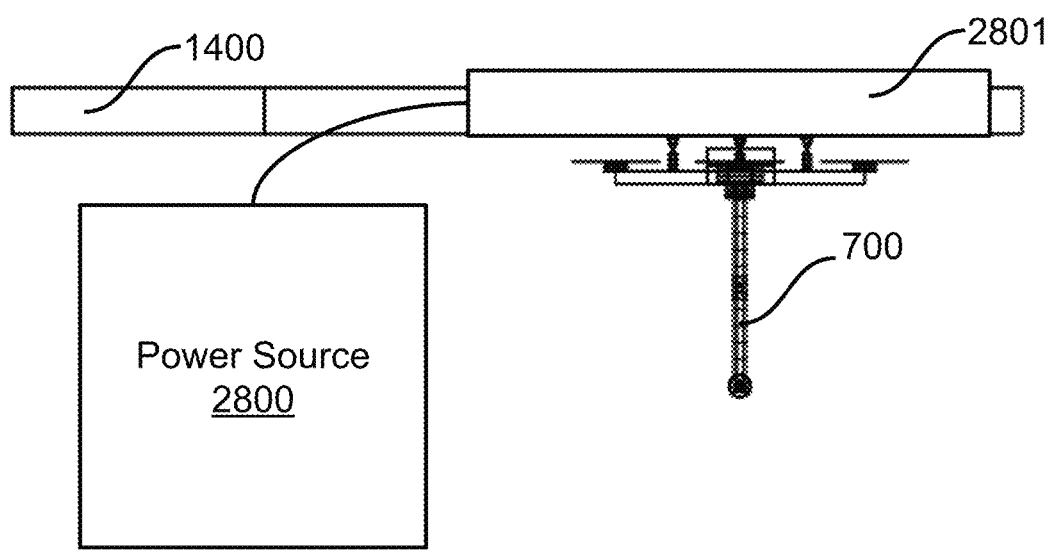
FIG. 28 shows a flying user interface device in charging state and demonstrates how device can fly to its charging location to charge autonomously.

All these main components have their own power sources or may be connected by a centralized power source 1207. One unique feature of this device is that it can autonomously find its power (recharge) source 2800 and power itself by sticking to a charging plate 2801 during the non-working hours as shown in FIG. 28. It can also detect free a fall during the failed sticking mechanism using onboard accelerometer and gyroscope.

Figure 35:
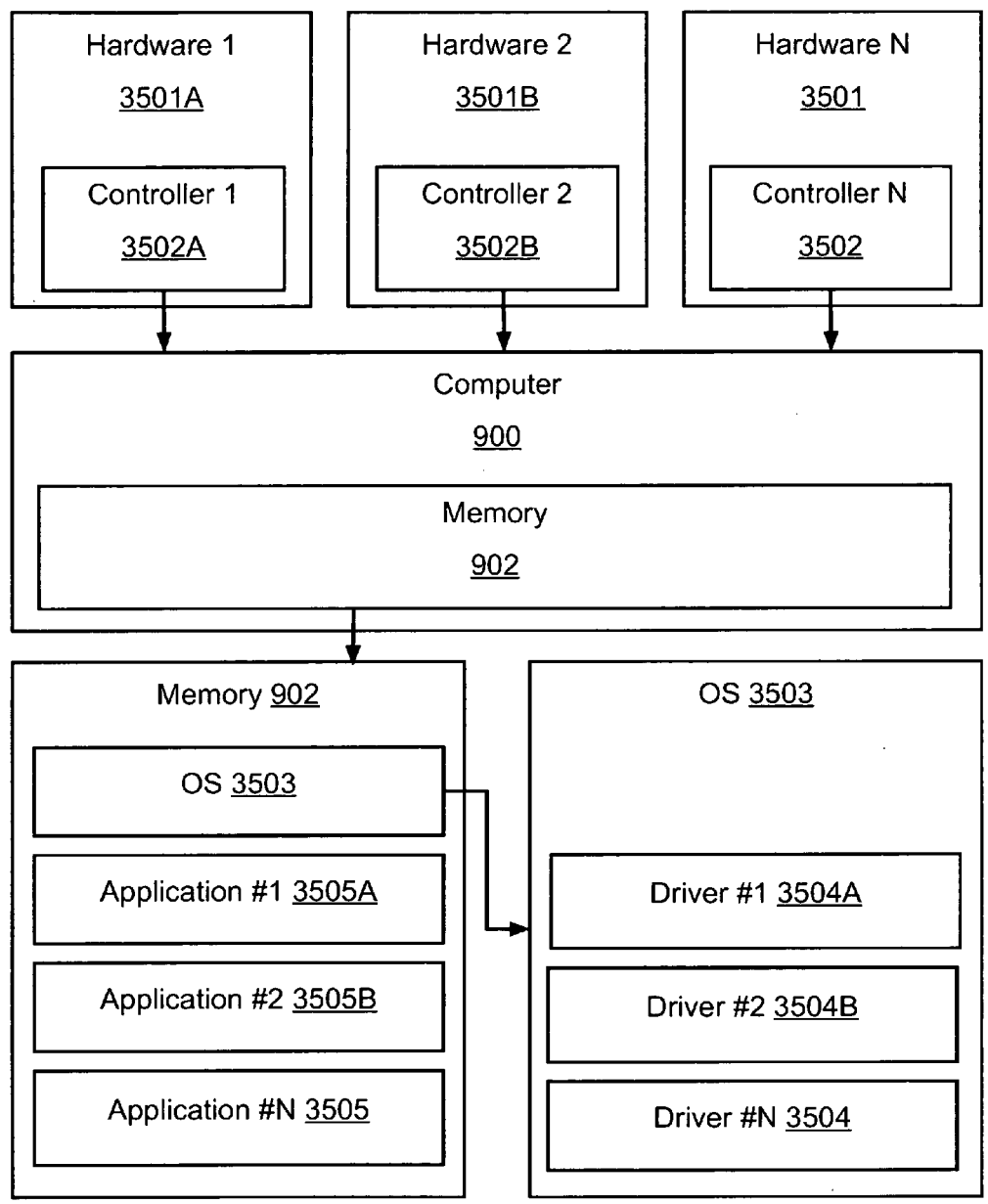
FIG. 35 is a detailed high-level block diagram of the software and hardware system of flying user interface device.

Flying User Interface device is a futuristic computing device and can be regarded as a flying computer. You can imagine this device as a computer flying from one place to another, sticking to the surfaces such as ceiling, and displaying or augmenting information on nearby surfaces such as floor. FIG. 35 shows how hardware and software are connected and various applications executed on the device. Hardware 3501 is connected to the controller 3502, which further connected to computer 700. Memory 902 contains operating system 3503, drivers 3504 for respective hardware, and applications 3505. For example OS is connected to the hardware 3501A-B using controllers 3502A-B and drivers 3504A-B. OS executes applications 3505A-B. FIG. 36 exhibits some of the basic high-level Application programming Interface (API) to develop computer program for this device. Because system contains memory and processor, any kind of software can be executed to support any type of business logic in the same way we use apps or applications on the computers and smartphones.

Figure 27:
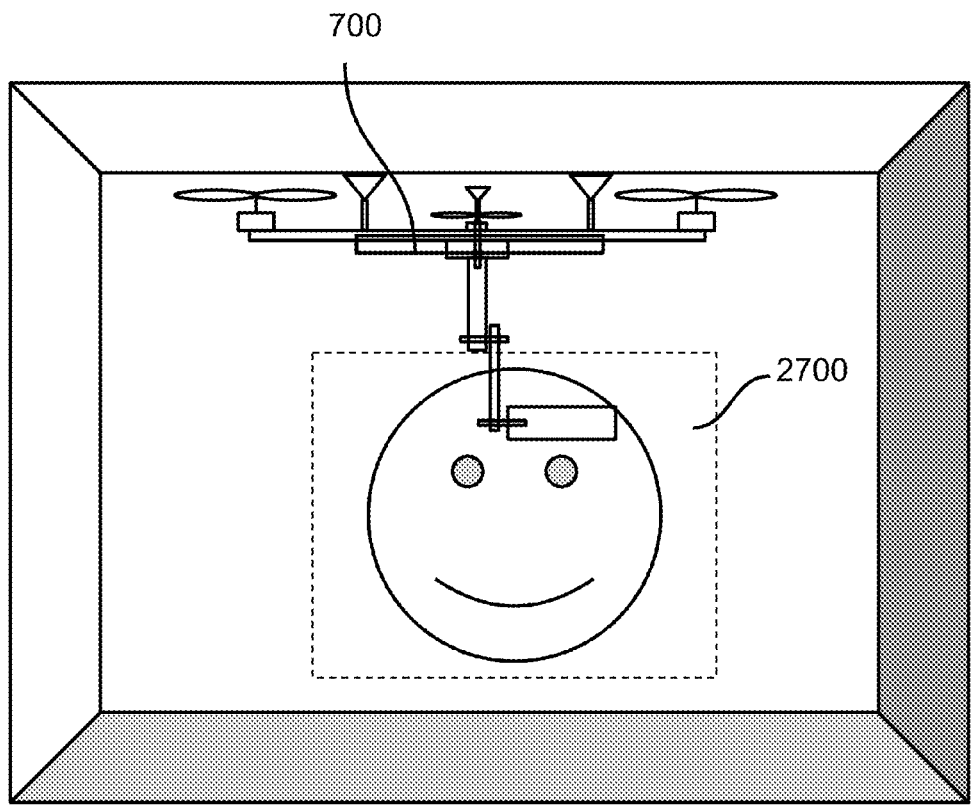
FIG. 27 shows a flying user interface device projecting a graphical user interface on a surface such as wall.
Figure 29:
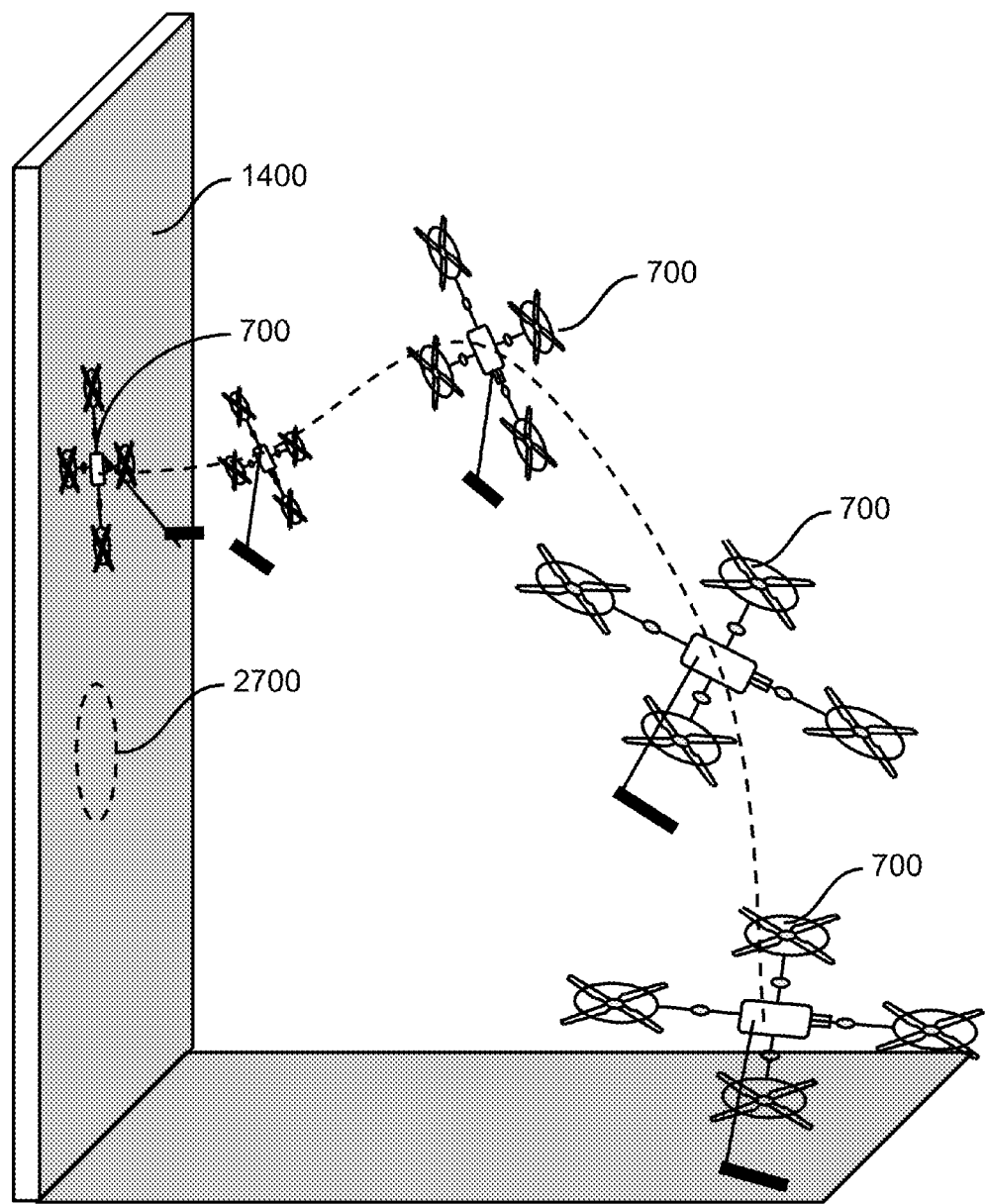
FIG. 29 shows a flying user interface device navigating from one location to another, sticking to the surface, and projecting a graphical user interface on the surface.
Figure 30:
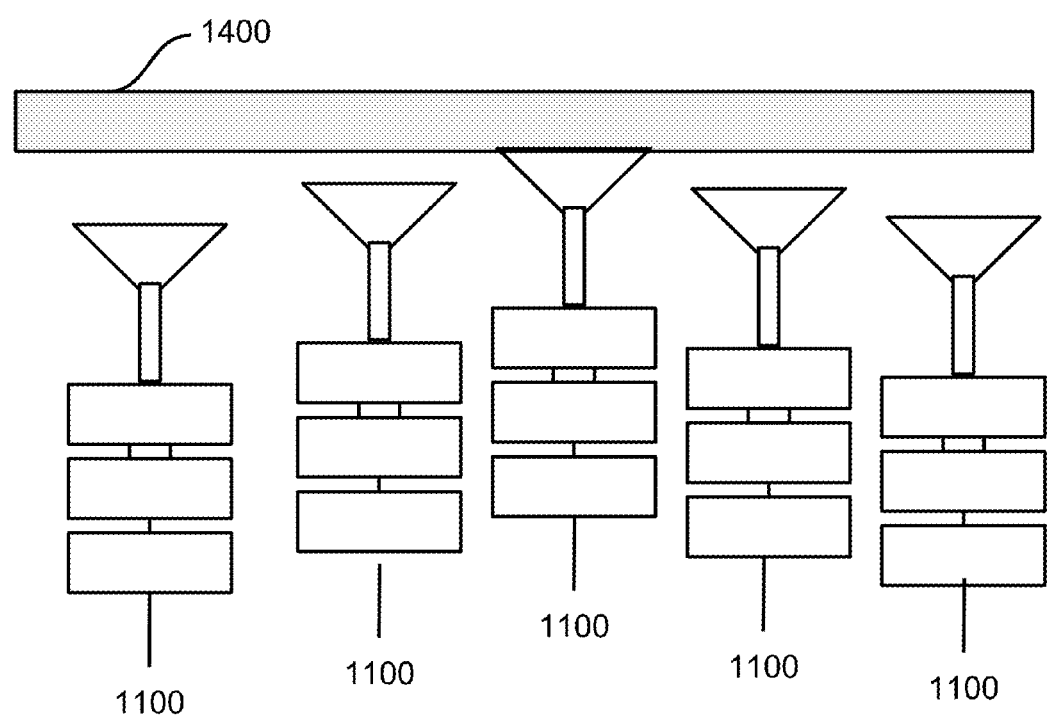
FIG. 30 shows a front view of the vacuum suction cups before and after sticking or gripping.
Figure 31:
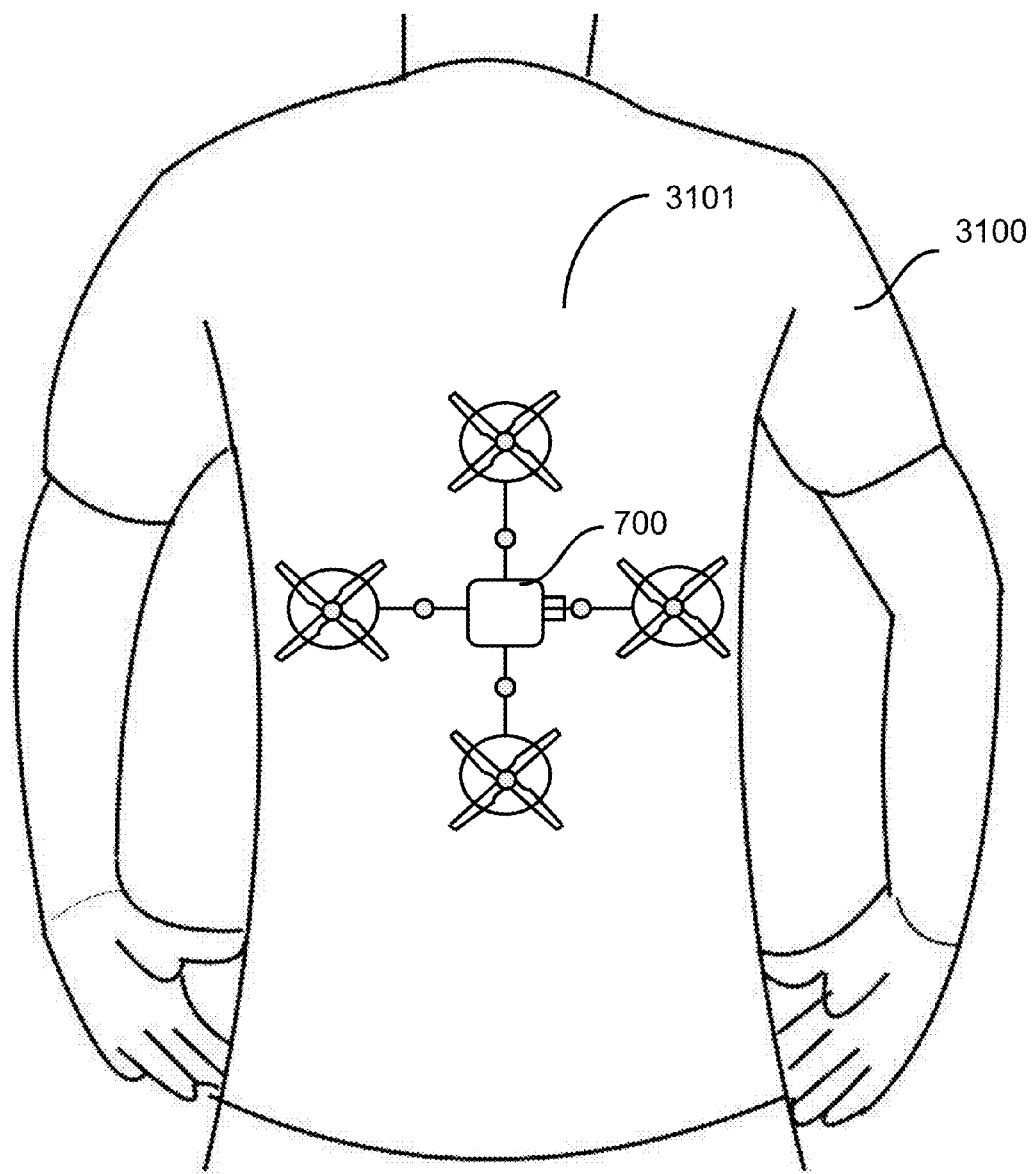
FIG. 31 shows a flying user interface device sticking to the user's backside during the walking or during the rest mode.
Figure 37:
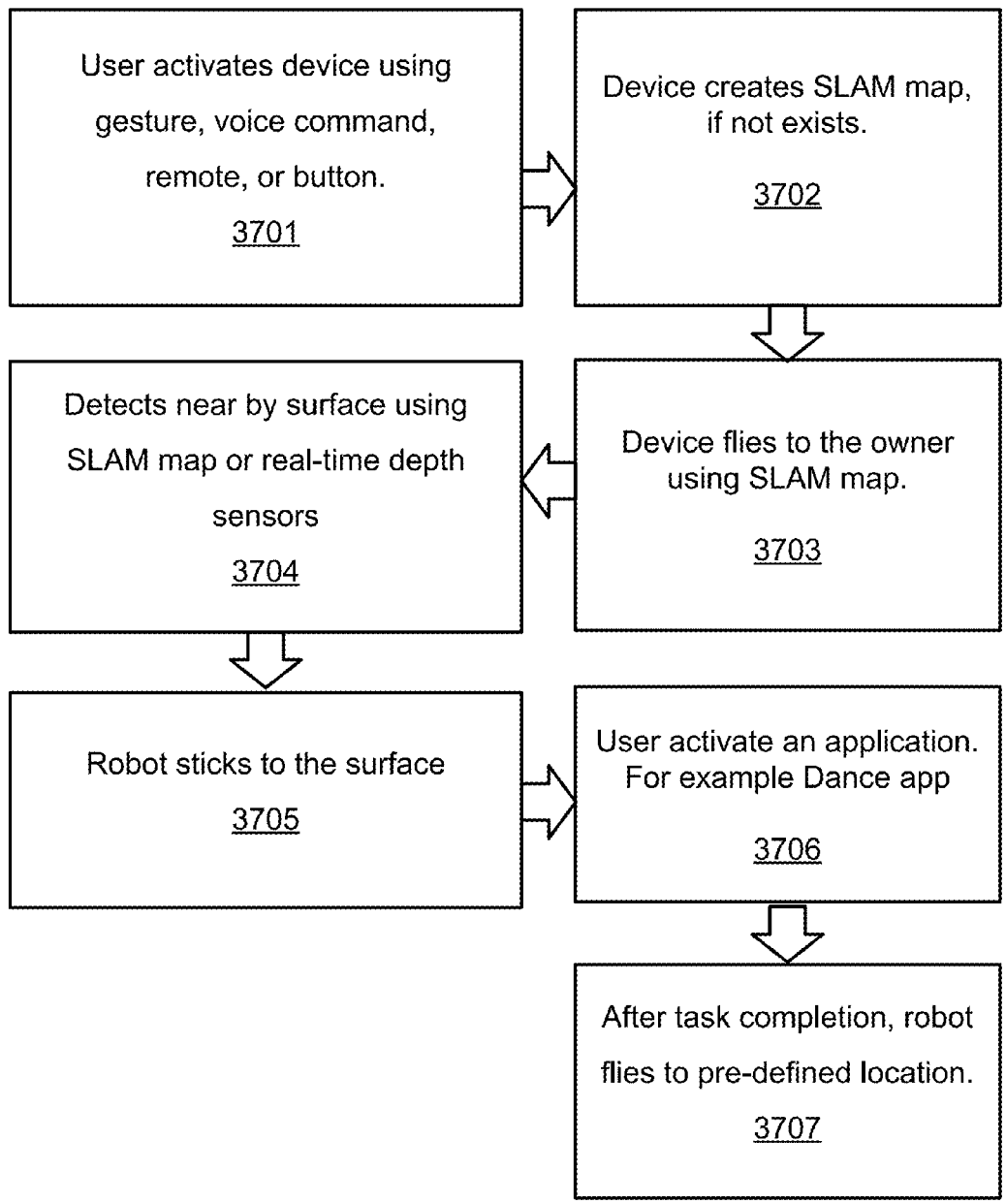
FIG. 37 is a flowchart showing the high-level functionality of an exemplary implementation of this invention.
Figure 58:
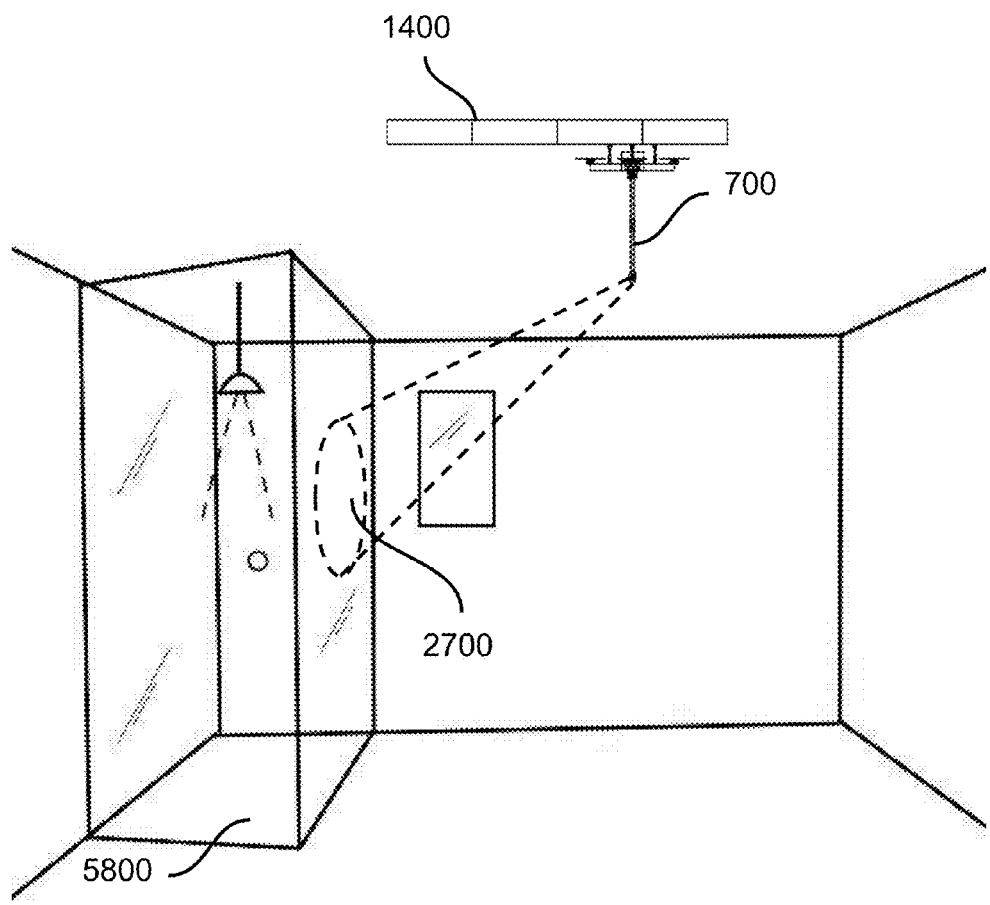
FIG. 58 shows flying user interface device projecting user interface in a shower room on a glass wall.

FIG. 29 shows a flying user interface device 700 navigating and flying from one location to another, sticking to the surface 1400, and projecting a graphical user interface 2700 on the surface. FIG. 30 shows vacuum suction mechanism in detail which involve three steps 1) preparation state, 2) sticking state, and 3) drop or separation state. FIG. 27 shows a flying user interface device 700 projecting a graphical user interface 2700 on a surface (wall). It may be used as a personal computer or mobile computing device whose interaction with human is described in a flowchart in FIG. 37. In step 3701 user activates the device. In step 3702 device creates SLAM map if required. In step 3703 device finds or identifies the owner. In step 3704 of algorithm, device detects nearby surface using sensors. In step 3705 device sticks to surface. In step 3706 user activates the application. Finally in step 3707 after task completion, device flies to the predefined location or sticks to the user. For example in FIG. 31 user is carrying a device on back. During the walk device may stick to shirt or jacket. All components are connected with a centralized computer. System may use Internet connection. System may also work offline to support some application such as watching a stored video/movie in the bathroom, but to ensure the user defined privacy and security, it will not enable few applications or features such as GPS tracking, video chat, social-networking, search applications, etc. FIG. 58 shows this situation where user can view and interact with device 700 using application projection 2700 such as news or video inside the shower room 5800 on a glass wall or transparent plastic curtain.

Figure 38:
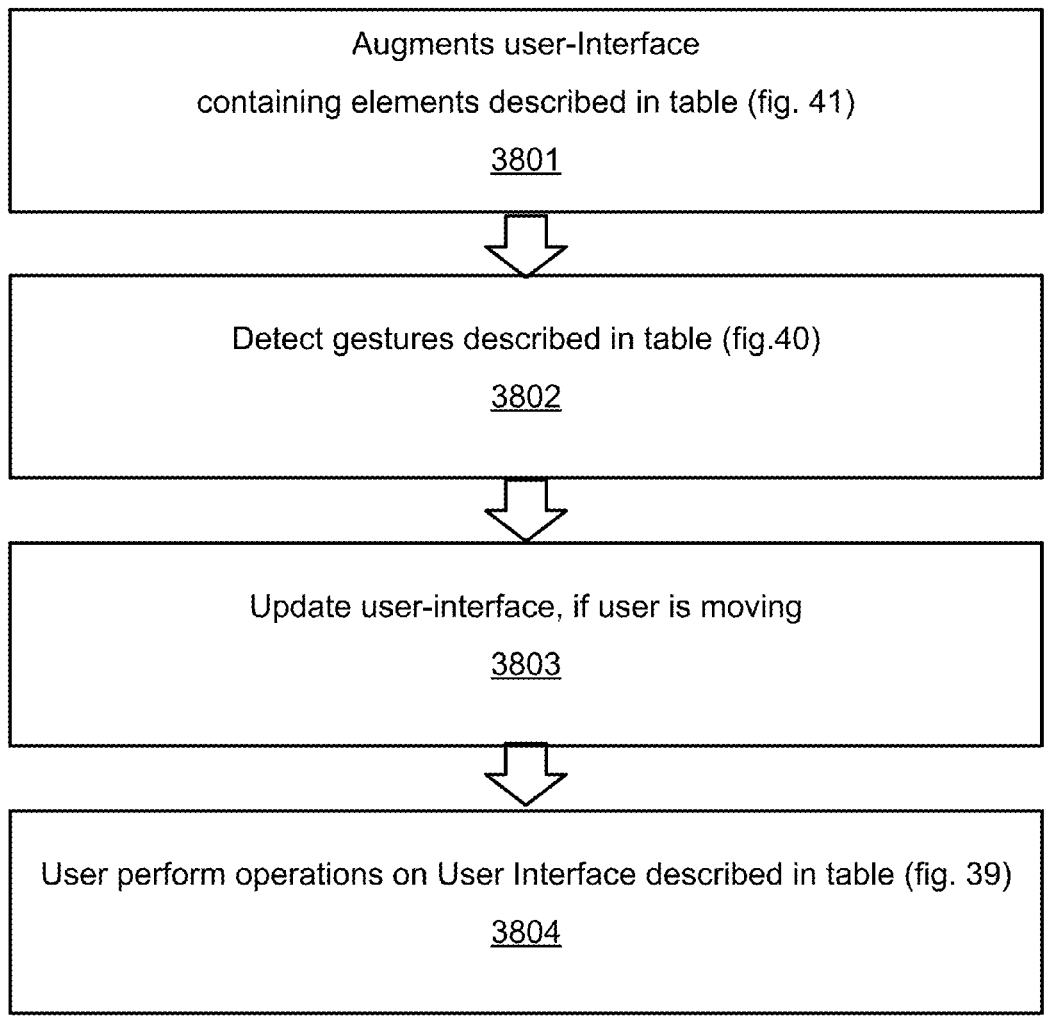
FIG. 38 is a flowchart showing the high-level functionality, algorithm, and methods of user interface system including object augmentation, gesture detection, and interaction methods or styles.
Figure 42:
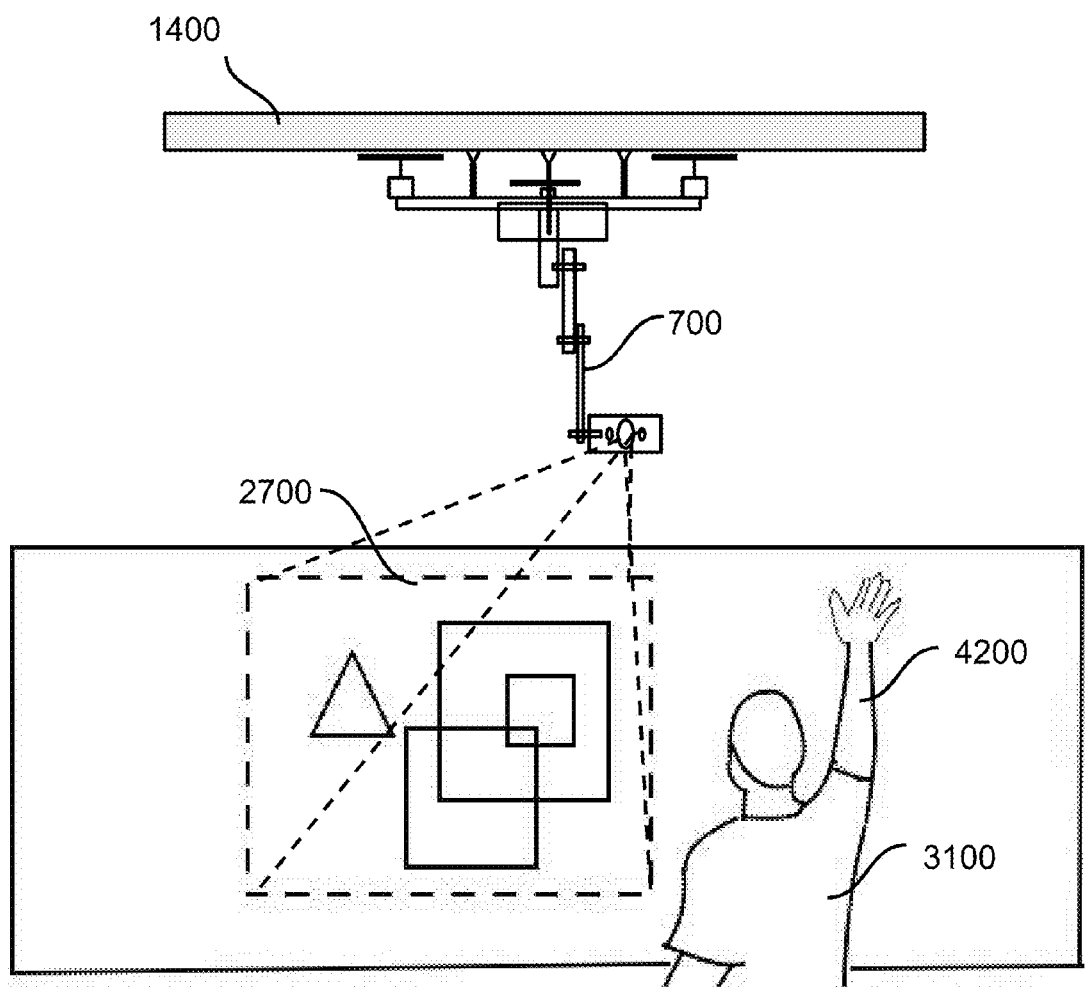
FIG. 42 shows a user making drawing on a projected user-interface using hand gesture in the air.
Figure 43:
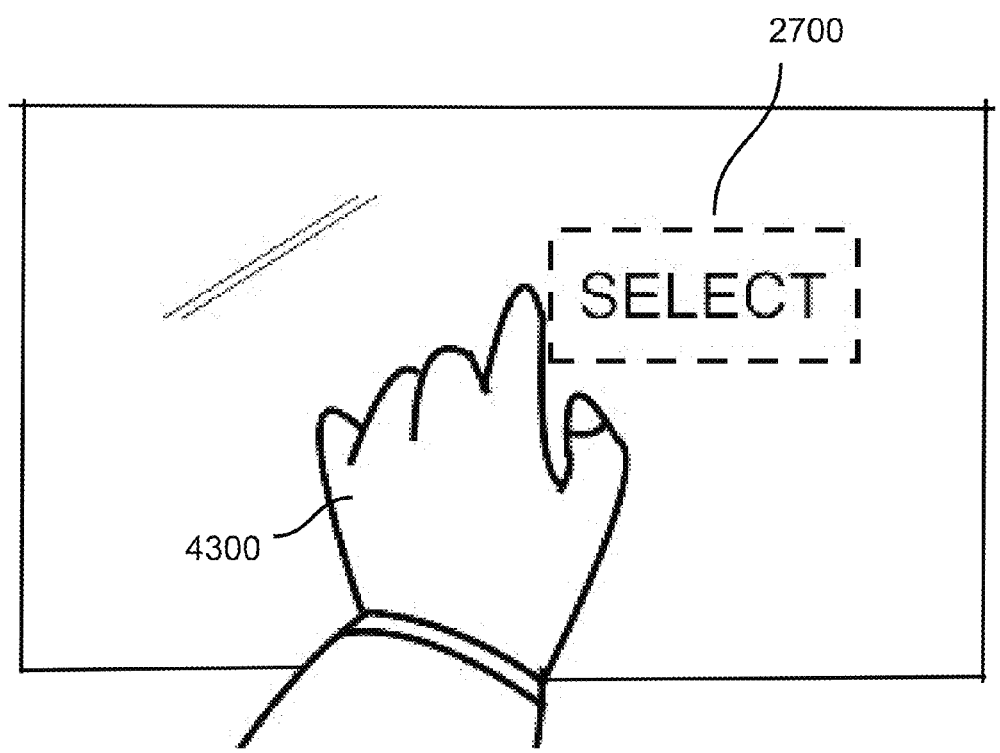
FIG. 43 shows a user performing select operation on a projected user interface.
Figure 44:
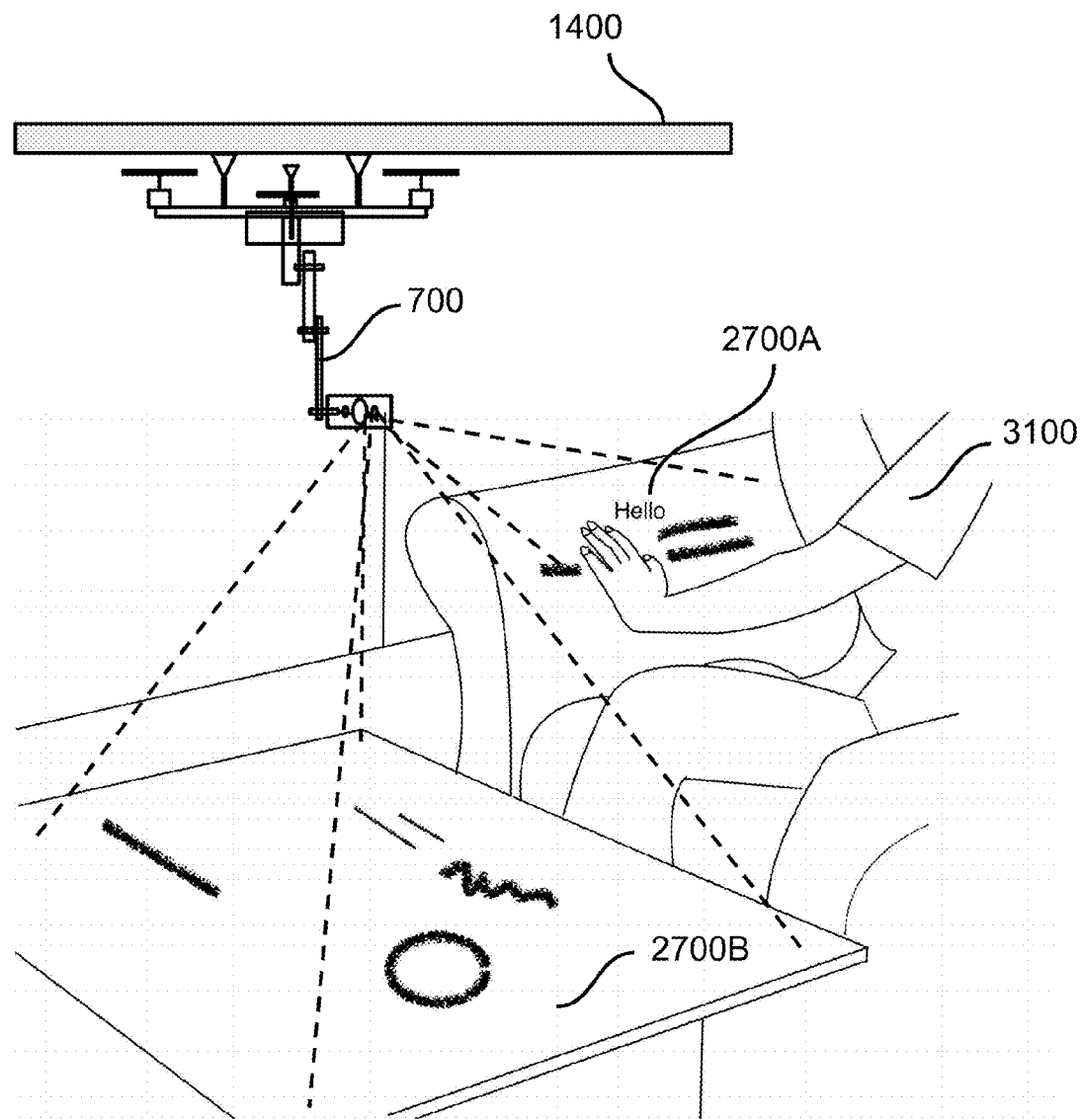
FIG. 44 shows a user performing drag and drop operation on a projected user interface.
Figure 45:
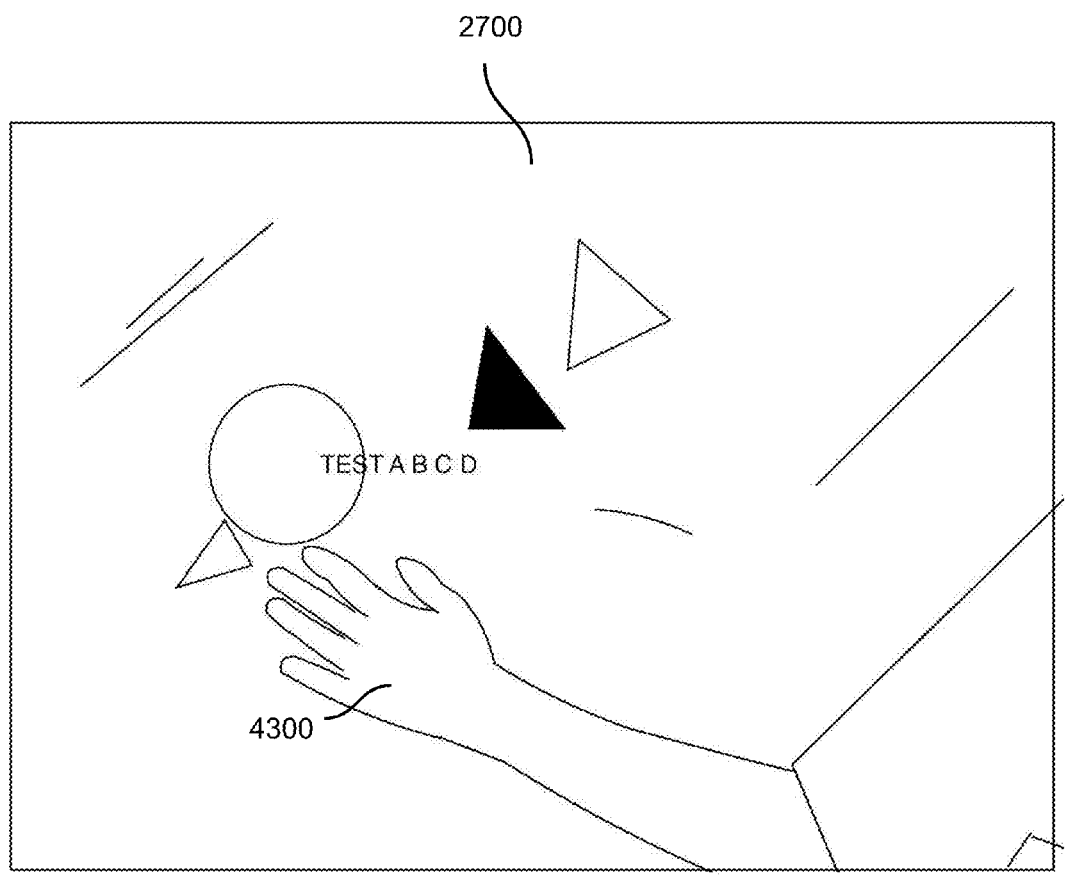
FIG. 45 shows a user performing touch and draw operations on a projected user interface.
Figure 46:
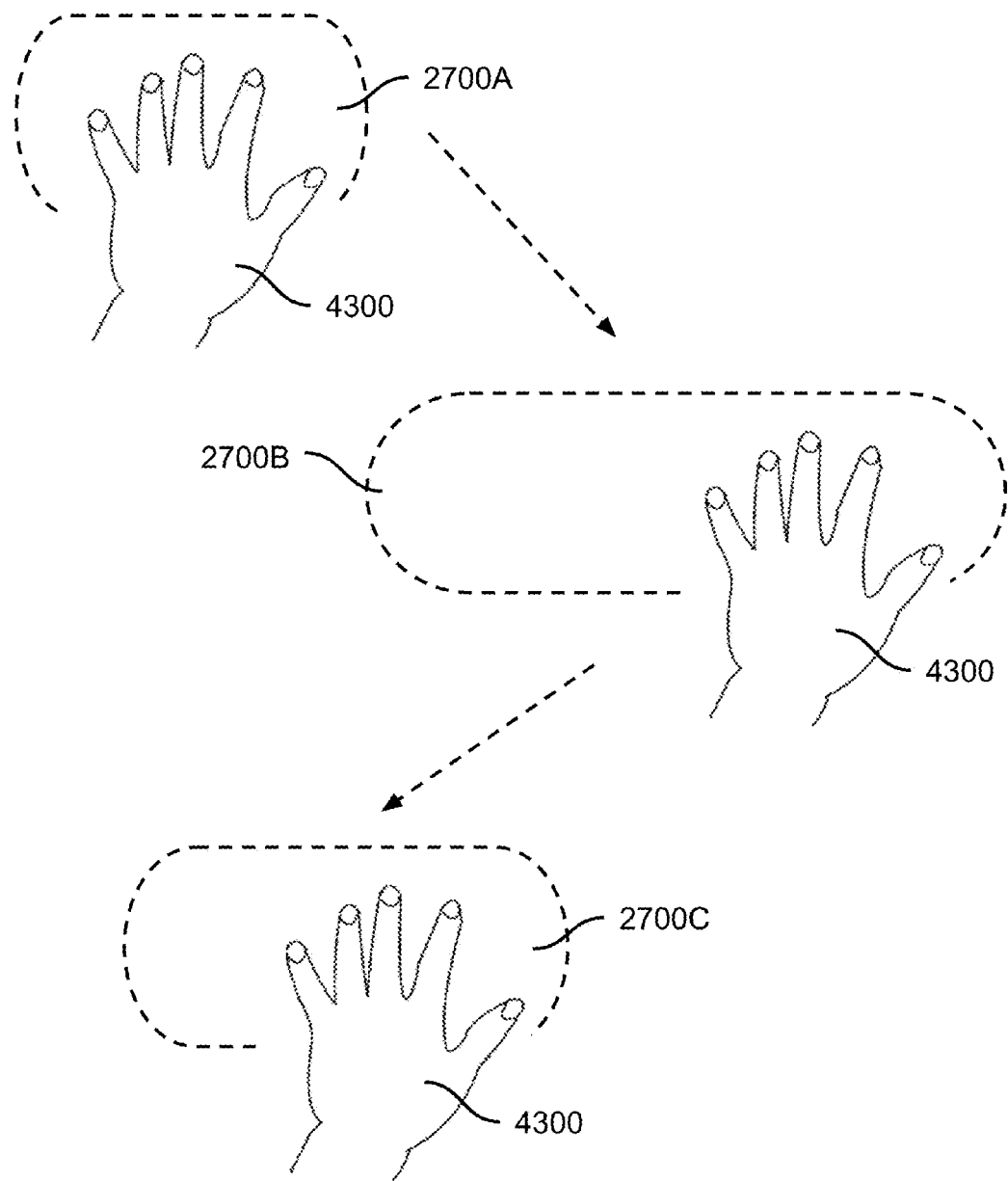
FIG. 46 shows a user performing drawing and erase operations on a projected user interface.
Figure 47:
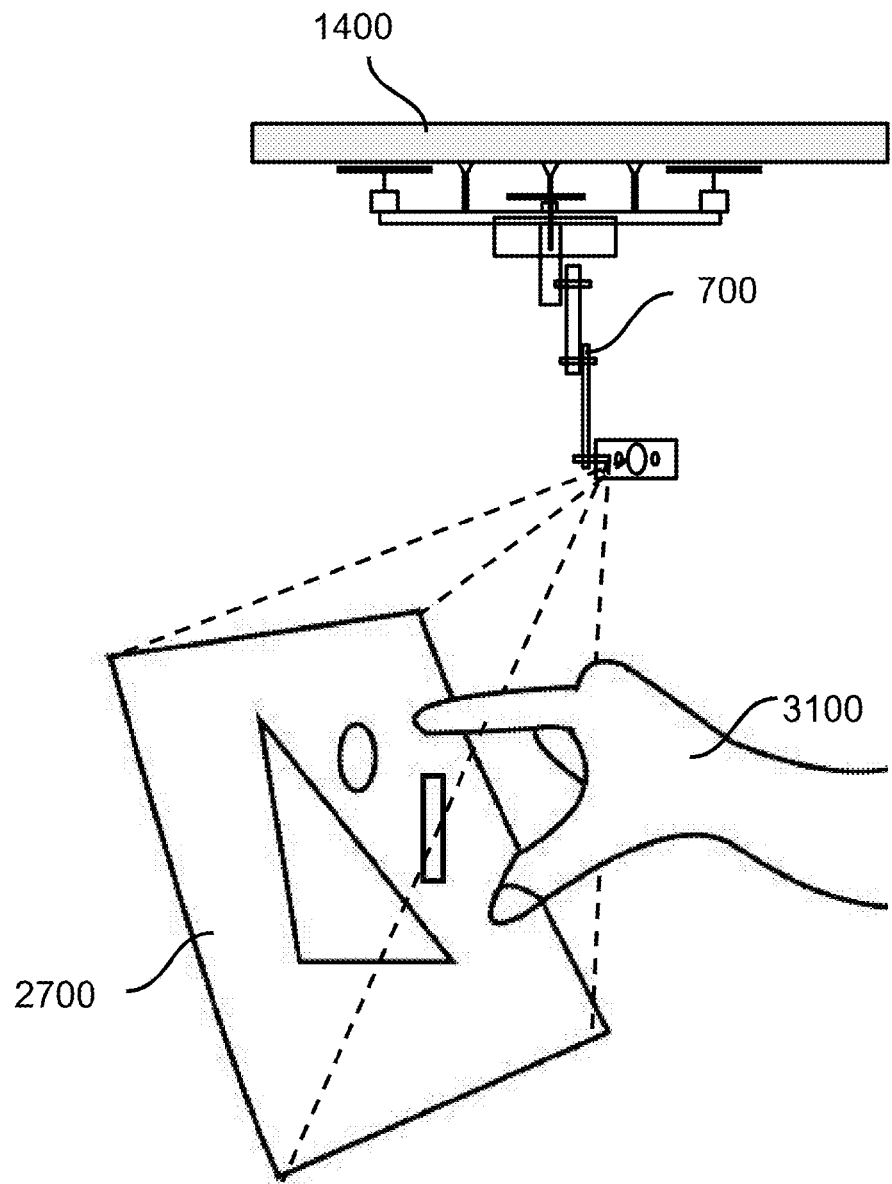
FIG. 47 shows a user performing zoom-in and zoom-out operations using multi-touch interaction.
Figure 48:
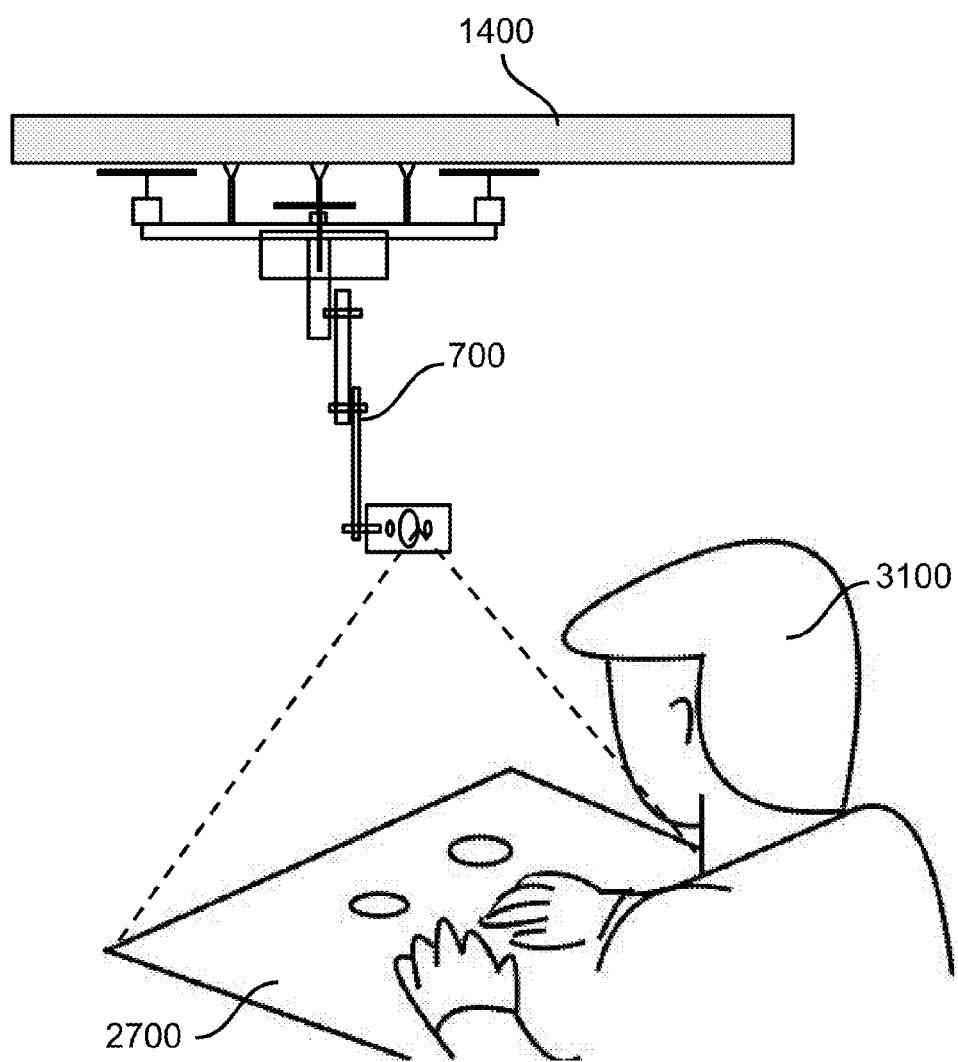
FIG. 48 shows a user performing multi-touch interactions such as typing.
Figure 49:
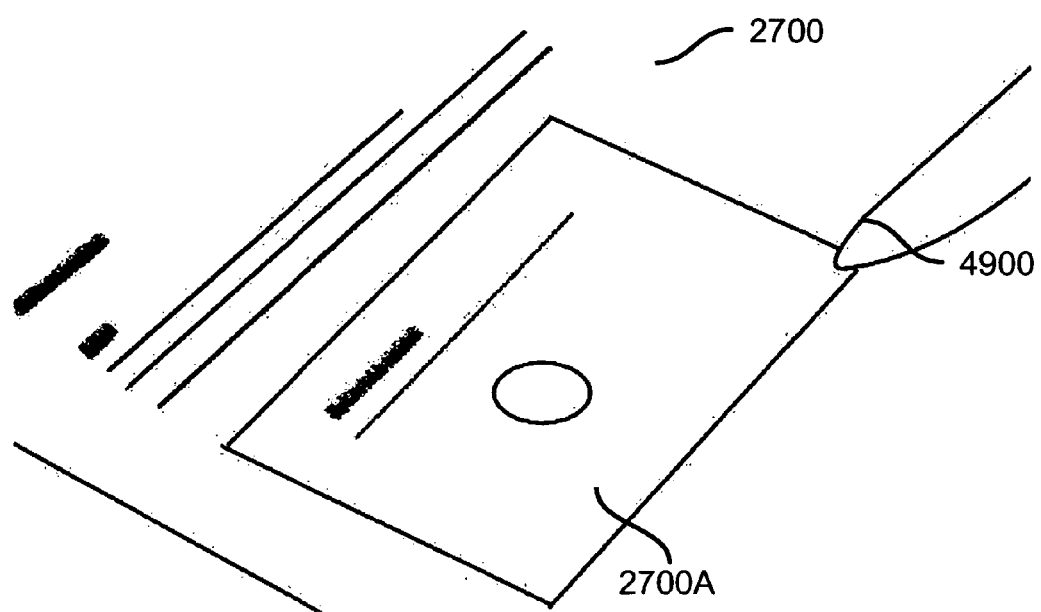
FIG. 49 shows a user performing select and copy operation.
Figure 54:
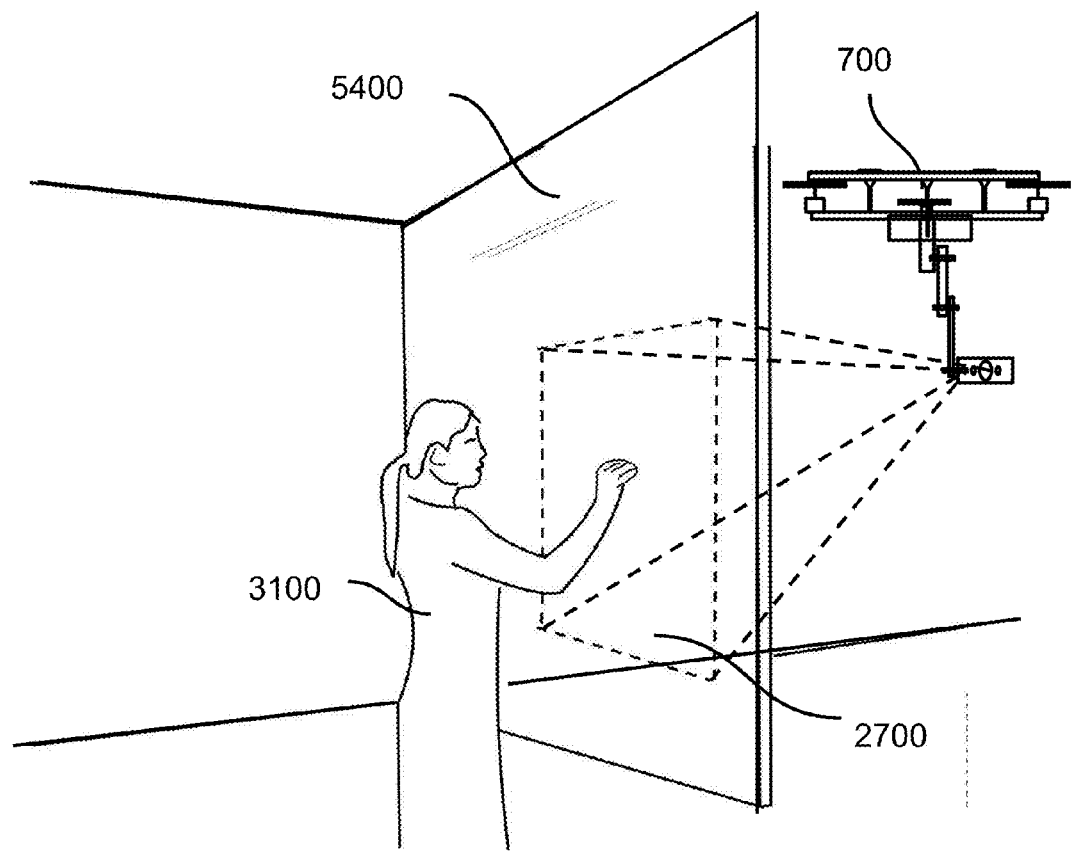
FIG. 54 shows a flying user interface device projecting user interface on the glass wall from behind in the direction of user's eyes, converting wall surface into a virtual interactive computing surface.
Figure 56:
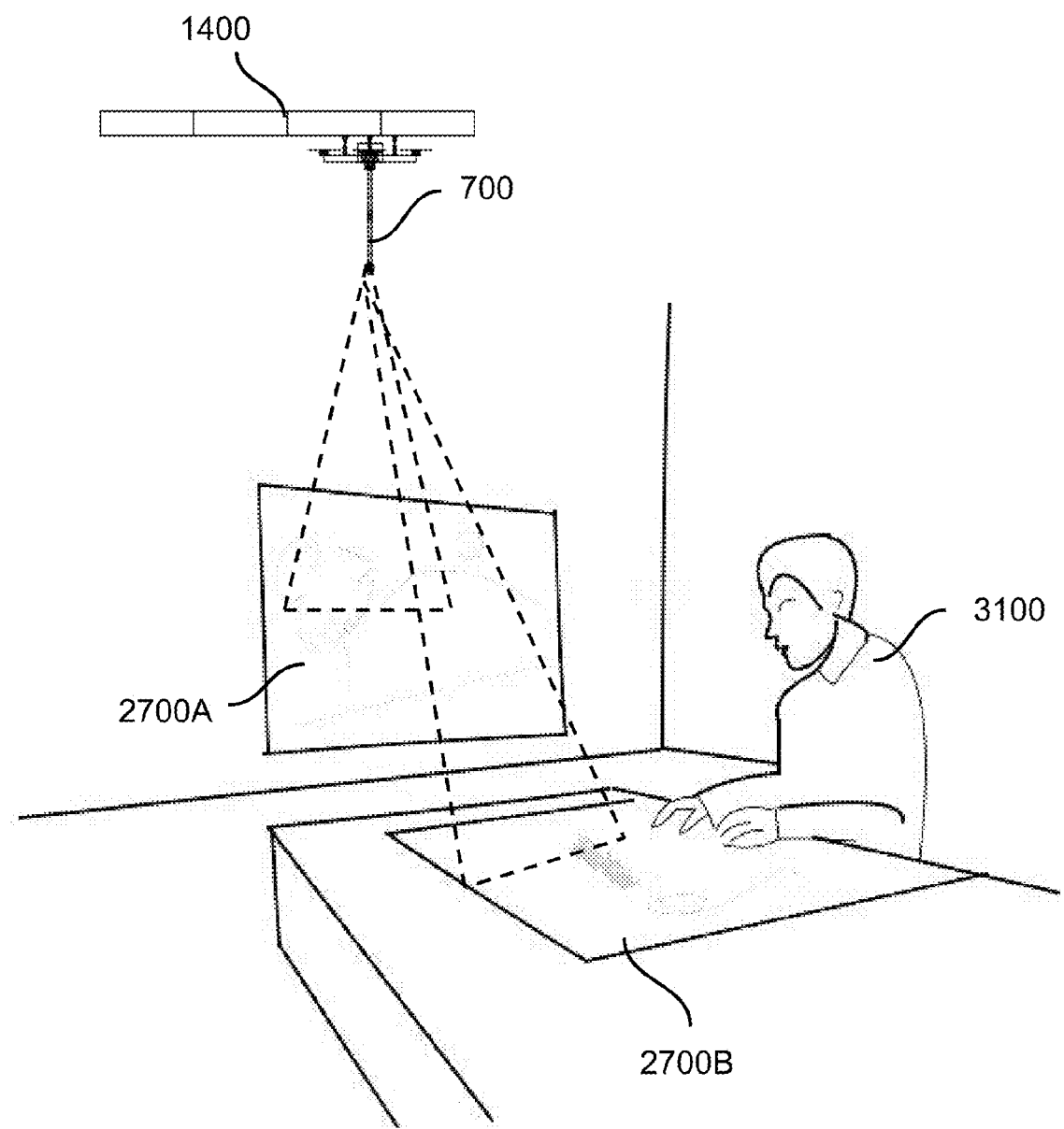
FIG. 56 shows a flying user interface device projecting user-interface on the wall and table, converting surfaces into a virtual interactive computing surface.
Figure 67:
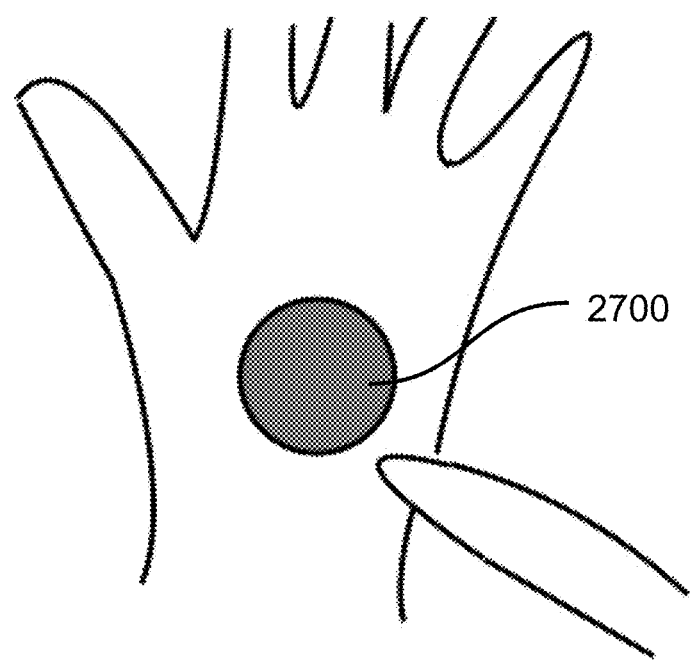
FIG. 67 shows how flying user interface devices can also augment information on body.

Flow chart given in FIG. 38 describes how users can interact with the user interface with touch, voice, or gesture. In step 3801, user interface containing elements such as window, menu, button, slider, dialogs, etc., is projected on the surface. Some of the user interface elements are listed in table in FIG. 41. In step 3802, device detects gestures such as hands up, body gesture, voice command, etc. Some of the gestures are listed in a table in FIG. 40. In step 3803, device update user interface if user is moving. In step 3804 user performs actions or operations such as select, drag, etc. on the projected user interface. Some of the operations or human-computer interaction methods are listed in table in FIG. 39. FIG. 68 lists some of the standard computer vision methods to recognize gestures. In addition device can use available state of the art computer vision algorithms. Some of them are listed in tables in FIGS. 69 and 68. Some of the examples of human interactions with device are:

1. Application in FIG. 54 shows how user can interact with user interface projected by the device on the wall. There are two main ways of setting projection. In the first arrangement, Device can set projection from top of the surface as shown in FIG. 47. In another style as shown in FIG. 54, user interface can be projected from behind of a transparent surface like a glass wall in the direction of user eyes. It may convert a wall surface into a virtual interactive computing surface.
2. Application in FIG. 56 shows how user 3100 can use device 700 to project user interface on multiple surfaces such as 2700A on a wall and 2700B on a table.
3. Applications in FIGS. 43 and 49 show how user is using a finger as a pointing input device like a mouse pointer. User can also use mid-air gesture using body part such as fingers, hands, etc.
4. Application in FIG. 47 shows how user 3100 is using two-finger and multi-touch interaction to zoom projected interface 2700 by device 700.
5. Application in FIG. 49 shows how user can select an augmented object or information by drawing a rectangular area 2700A using a finger 4900. Selected information 2700A can be saved, modified, copied, pasted, printed or even emailed, shared on social-media, services, or other applications.
6. Application in FIG. 43 shows how user can select options by touch or press interaction methods using hand 4300 on a projected surface 2700.
7. Application in FIG. 45 shows how user can interact with augmented objects 2700 using body parts such as hand 4300.
8. Application in FIG. 42 shows examples of gestures such as hands up 4200 understood by the device using machine vision algorithms. These algorithms first build a trained gesture database, and then they match user's gesture by computing similarity between input gesture and pre-stored gestures.
9. Application in FIG. 44 shows an example how user 3100 can select and drag an augmented virtual object 2700A from one place to another place 2700B in the physical space using device 700.
10. Application in FIG. 46 shows an example of drawing and erasing interaction on the walls or surface using hand gesture 4300 on a projected user interface 2700A-C.
11. Application in FIG. 48 shows an example of typing by user 3100 with the help of projected user interface 2700 and device 700.
12. Application in FIG. 42 shows how user 3100 is giving gesture command to device 700 by raising hand 4200 to execute projected user interface application 2700.
13. Application in FIG. 67 shows how user can augment and interact hand using projected interface 2700.

Figure 33:
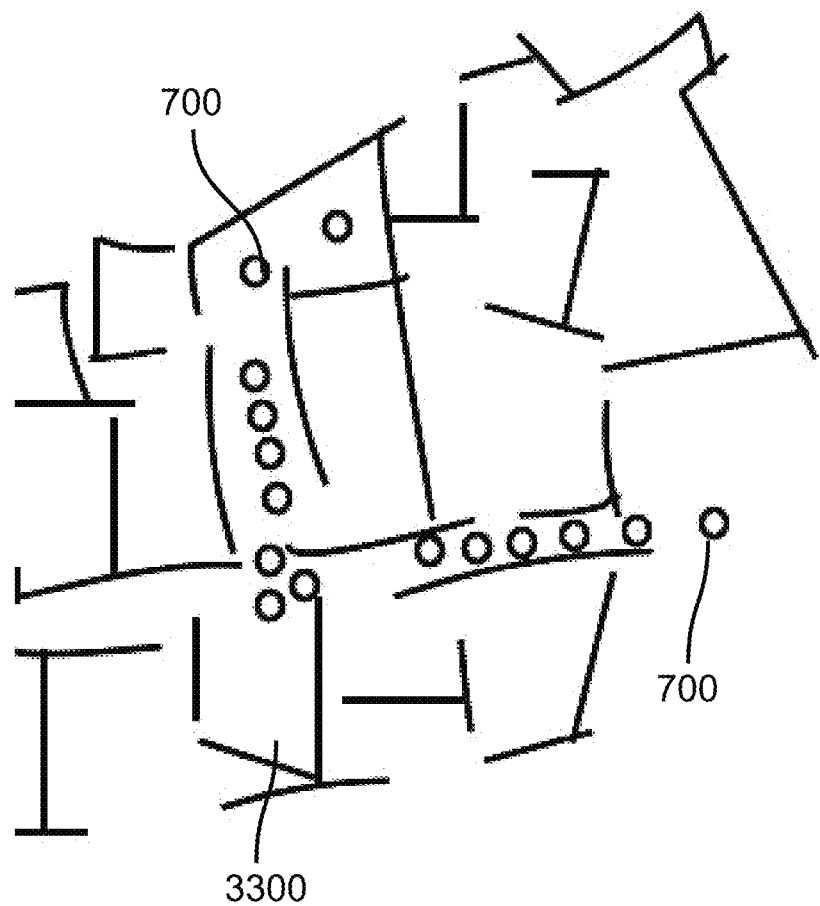
FIG. 33 shows a flying user interface device executing SLAM algorithm for creating a map of the environment.
Figure 34:
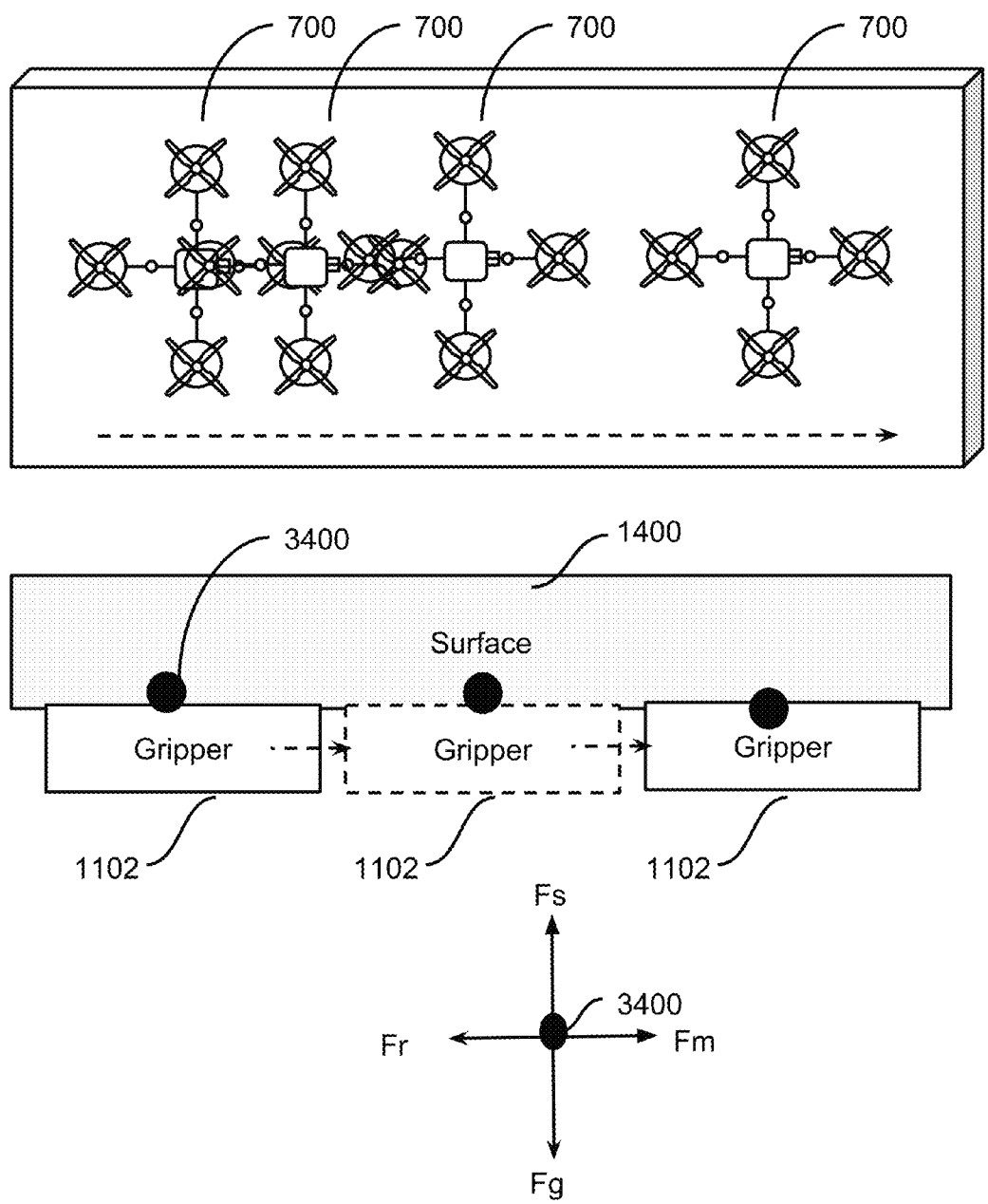
FIG. 34 shows walking or sliding mechanism using vacuum and flying motion.

Device may use its sensors such as cameras to build a map of environment or building 3300 using Simultaneous Localization and Mapping (SLAM) technology described in FIG. 33. After completion of mapping procedure, it can navigate from one place to another autonomously without additional processing and navigational efforts. Device 700 can simulate walk or slide on the surface 1400 using gripping and flying mechanism as shown in FIG. 34. Because all forces 3400 are balanced, flying motion generates motion along the surface. In other words, device can simulate slide on surface simultaneous projecting user interface.

Figure 32:
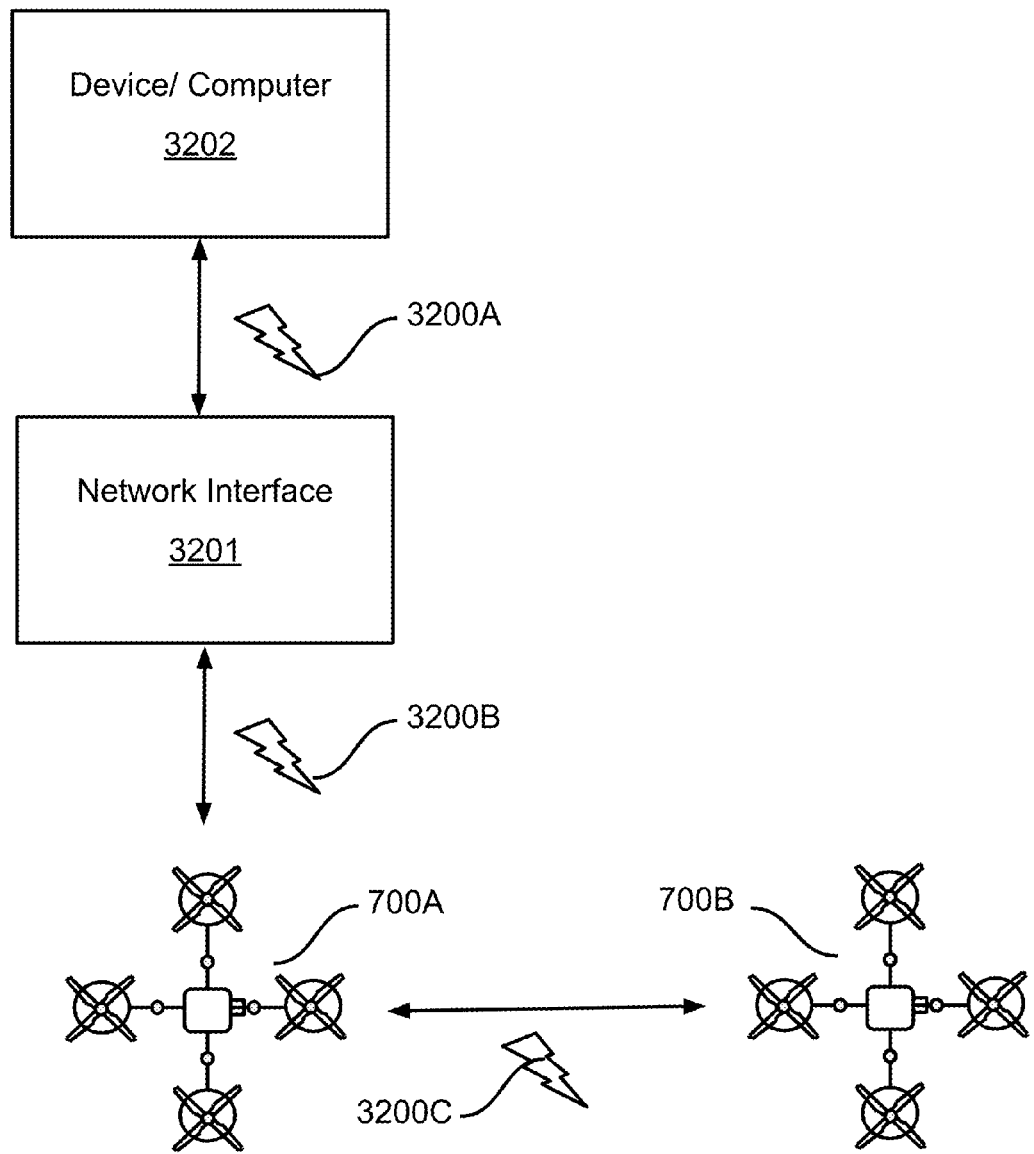
FIG. 32 shows a flying user interface device communicating with another computing device or flying interface device using a network interface.

Device may work with another similar device(s) to perform some complex task. For example in FIG. 32, device is communicating with another similar device 700B using a wireless network link 3200C.

Figure 50A:
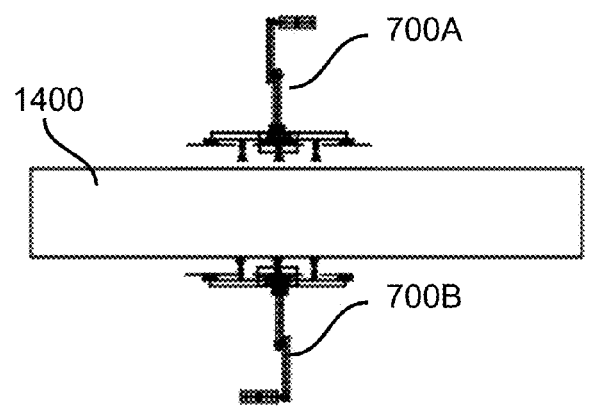
FIGS. 50A and 50B show two flying user interface devices creating a virtual window on a wall by exchanging and projecting camera images.
Figure 50B:
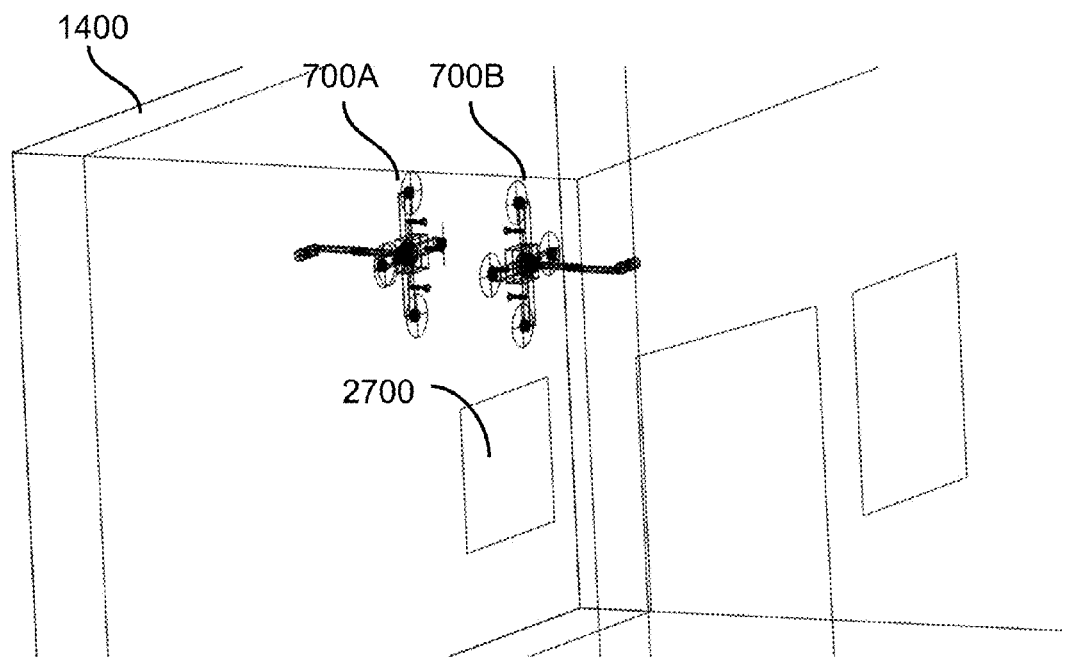
Figure 51:
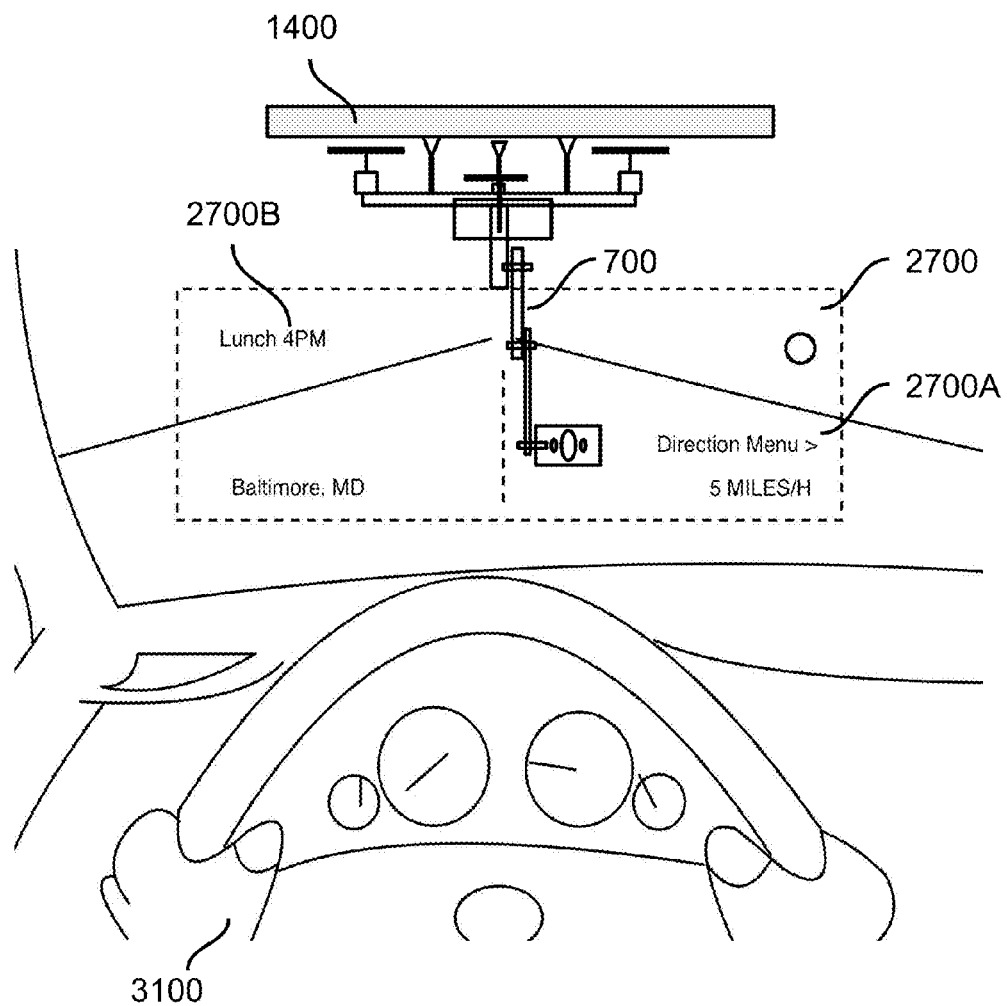
FIG. 51 shows a flying user interface device projecting user-interface in the car.
Figure 57:
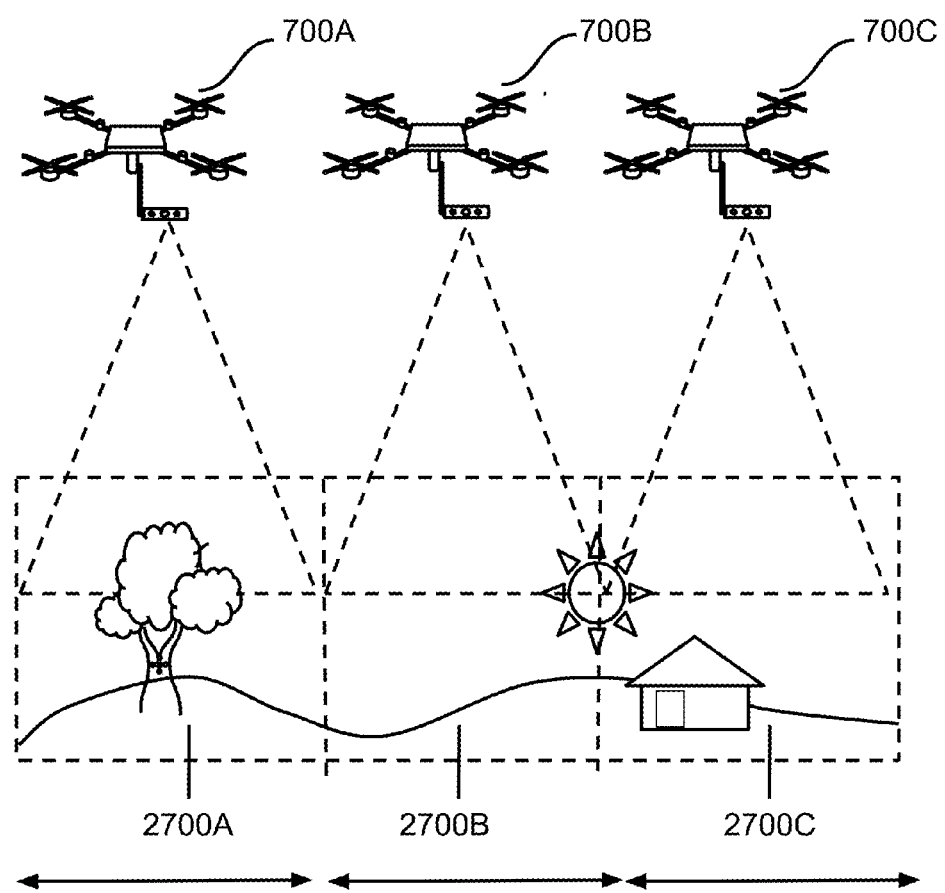
FIG. 57 shows flying user interface devices making a large display screen.
Figure 59:
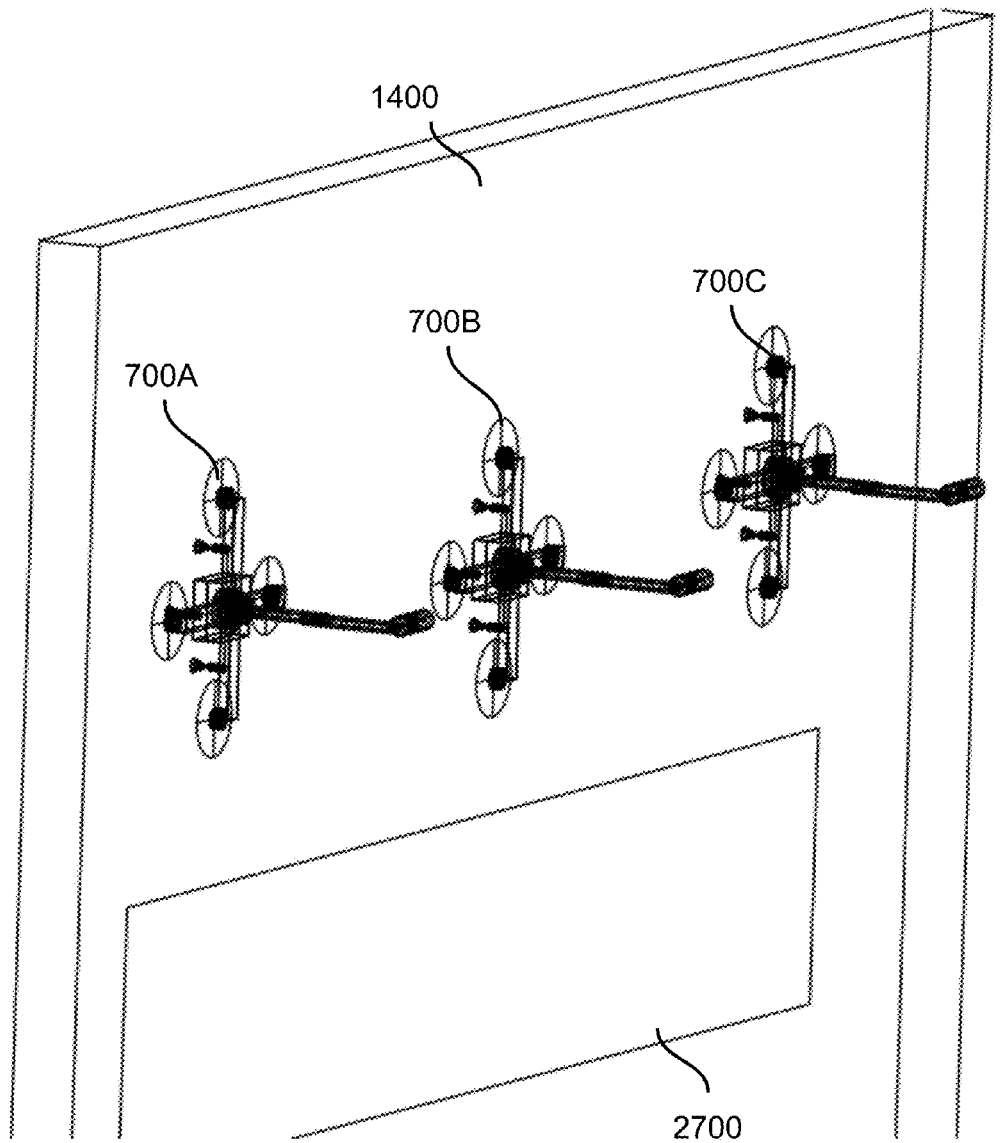
FIG. 59 shows flying user interface device projecting a large screen display on the wall.
Figure 60:
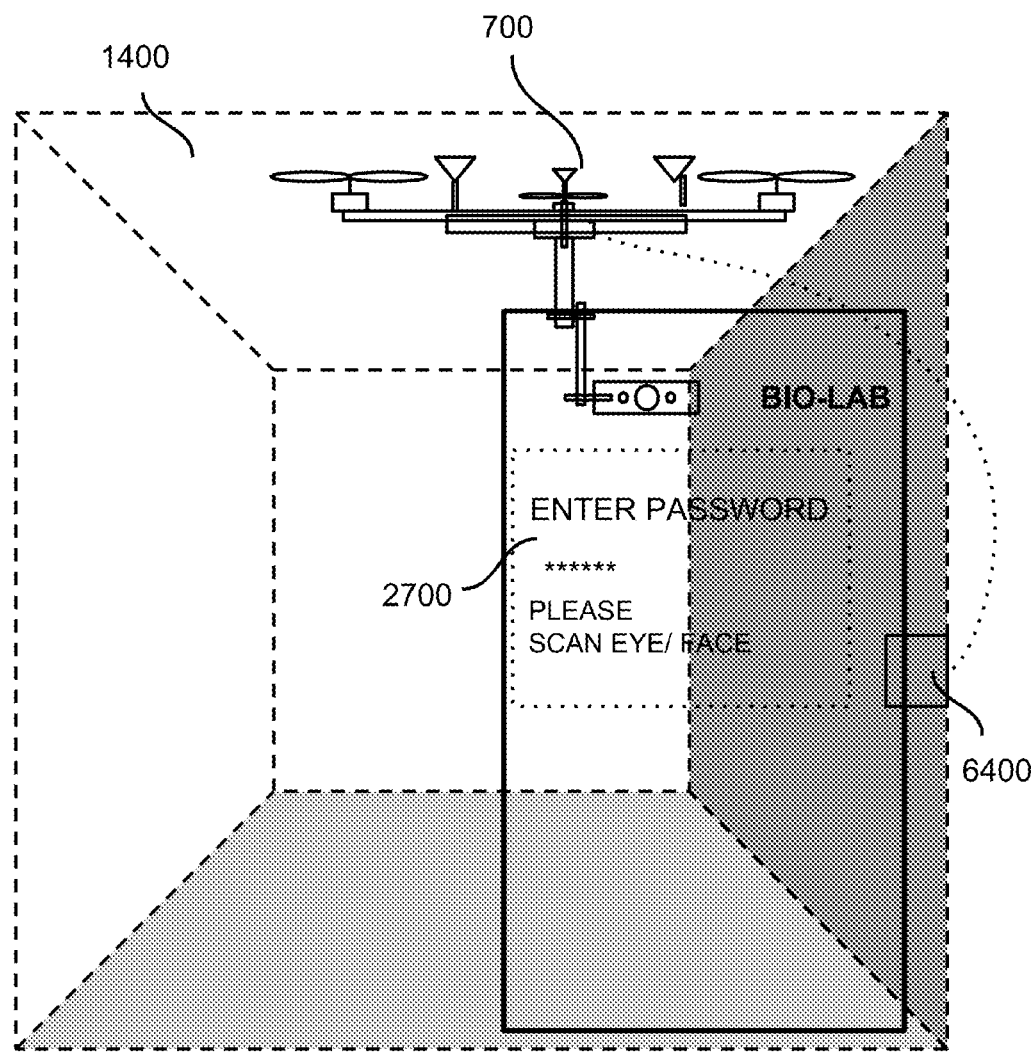
FIG. 60 shows flying user interface device projecting user interface for unlocking the glass door.
Figure 65:
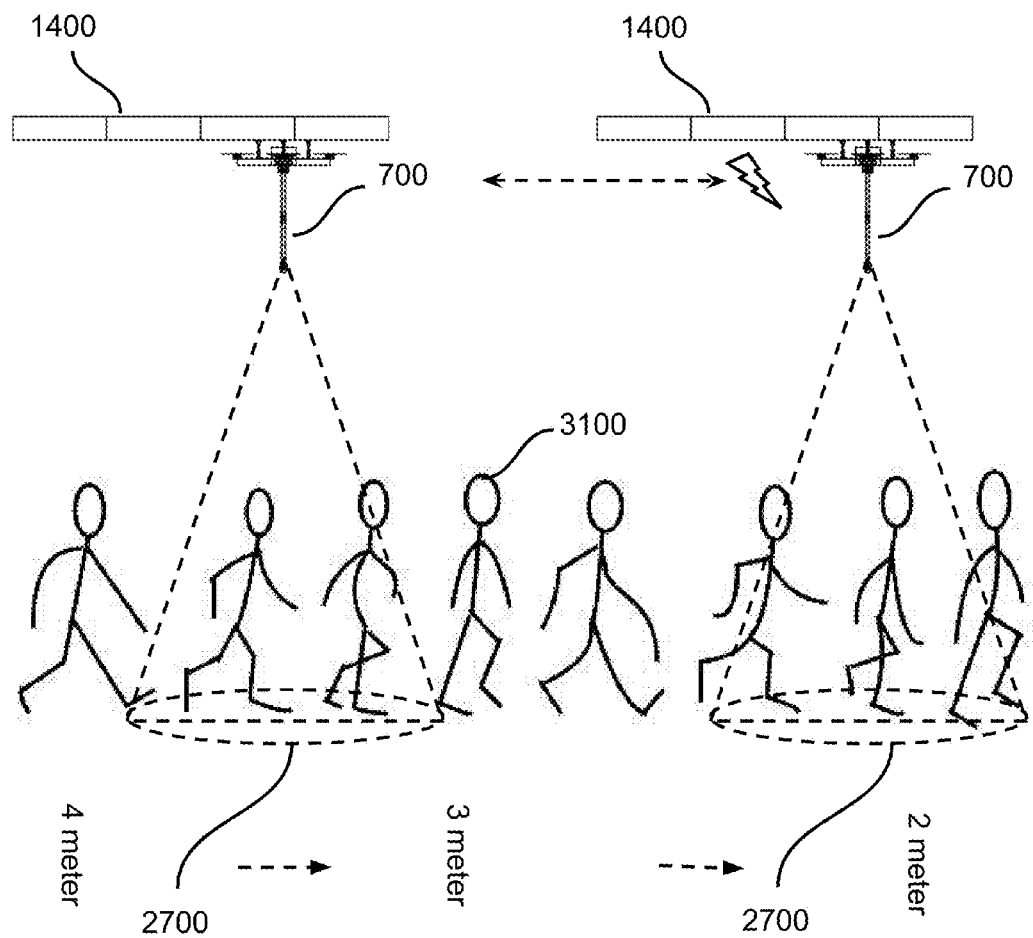
FIG. 65 shows how multiple flying user interface devices can work and synchronize together to project navigation information during the walking.

Device may link, communicate, and command to other devices of different type. For example it may connect to the TV or microwave, electronics to augment device specific information. For example in FIG. 32 device 700A is connecting with another device 3202 via network interface 3201 using wireless link 3200B. Network interface 3201 may have wireless or wired connectivity to the device 3201. Here are the examples of some applications of this utility:

1. For example in FIG. 50, two devices 700A-B are attached to the two opposite side of a wall surface 1400. They are exchanging and projecting camera images to create a virtual window 2700.
2. Application in FIGS. 57 and 59 also show a multi-device application where multiple devices 700A-C are stuck to the surface such as wall, and create a combined large display 2700 by stitching their individual projections 2700A-C. Image stitching can be done using state of the art or any standard computer vision algorithms.
3. Application in FIG. 65 shows another such application where multiple devices 700 can be used to assist a user 3100 using a projected navigational user interface 2700. It may be useful tool during the walking on the road or exploration inside a library, room, shopping mall, museums, etc.
4. Application in FIG. 51 shows that device 700 is accessing speed data from the speedometer and projecting the navigation interface 2700 along with other utility applications such as music players, internet, email, etc. inside the car. User can change song using touch screen interface, because device is directly connected to the car's audio system. In another example, user can see email or calendar 2700B on the screen during the driving.
5. In another example user can directly give a print command to the printer to print some augmented object or information such as documents, images, etc.
6. In another application, user can unlock the door 6400 using interface 2700 projected by flying user interface 700 through the glass door as shown in FIG. 60. User can also scan fingerprint or unlock door using face recognition, because device is already equipped with a camera to capture the images.

Figure 53:
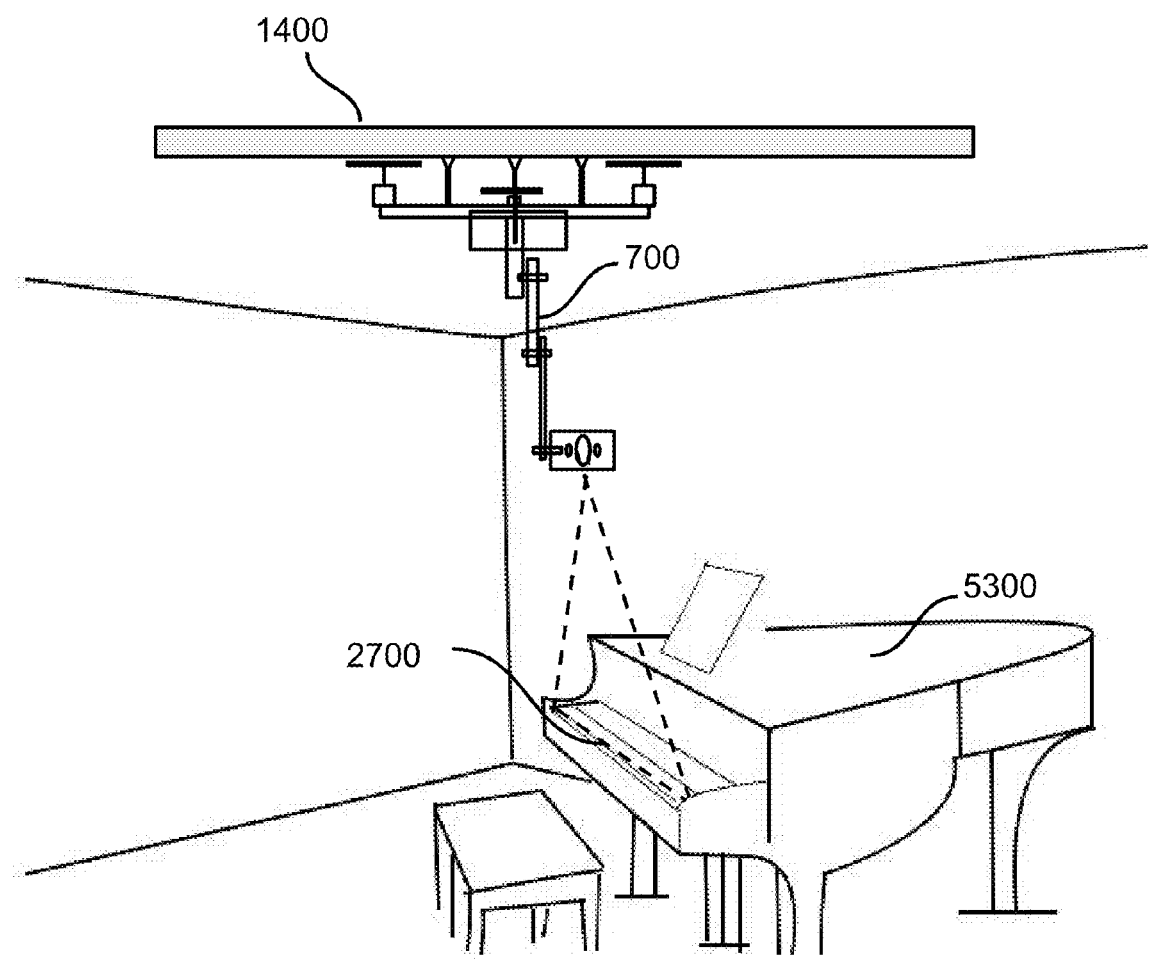
FIG. 53 shows a flying user interface device executing a piano learning application.
Figure 55:
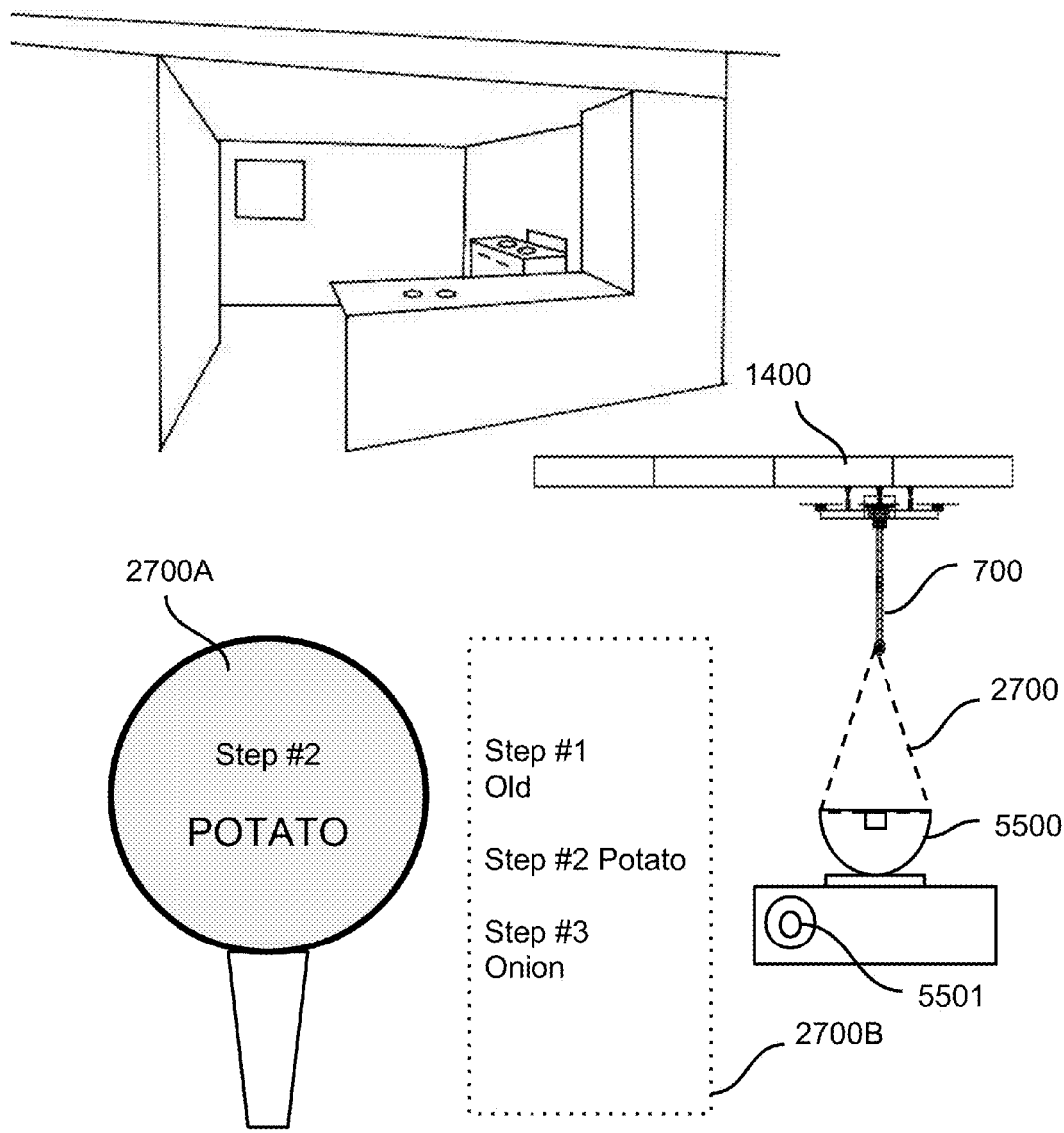
FIG. 55 shows a flying user interface device executing a cooking assistance or learning application in the kitchen.
Figure 62:
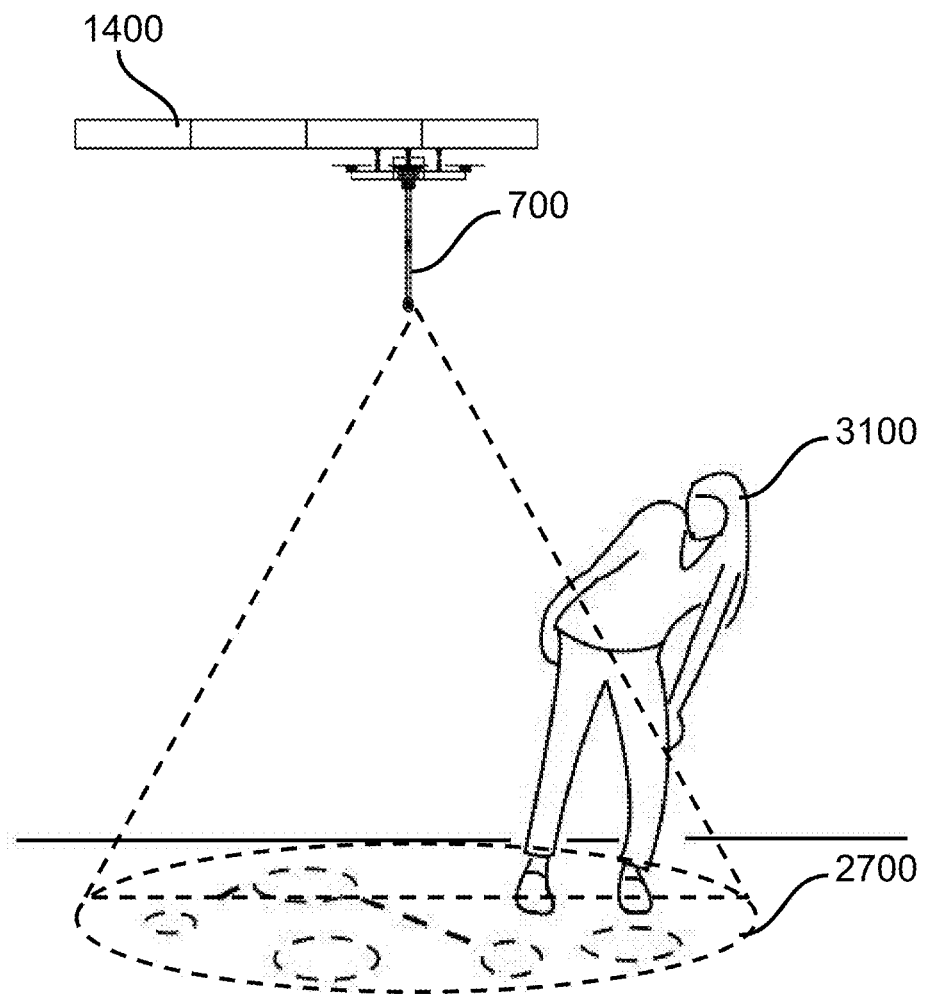
FIG. 62 shows flying user interface device executing dance-learning application.
Figure 63:
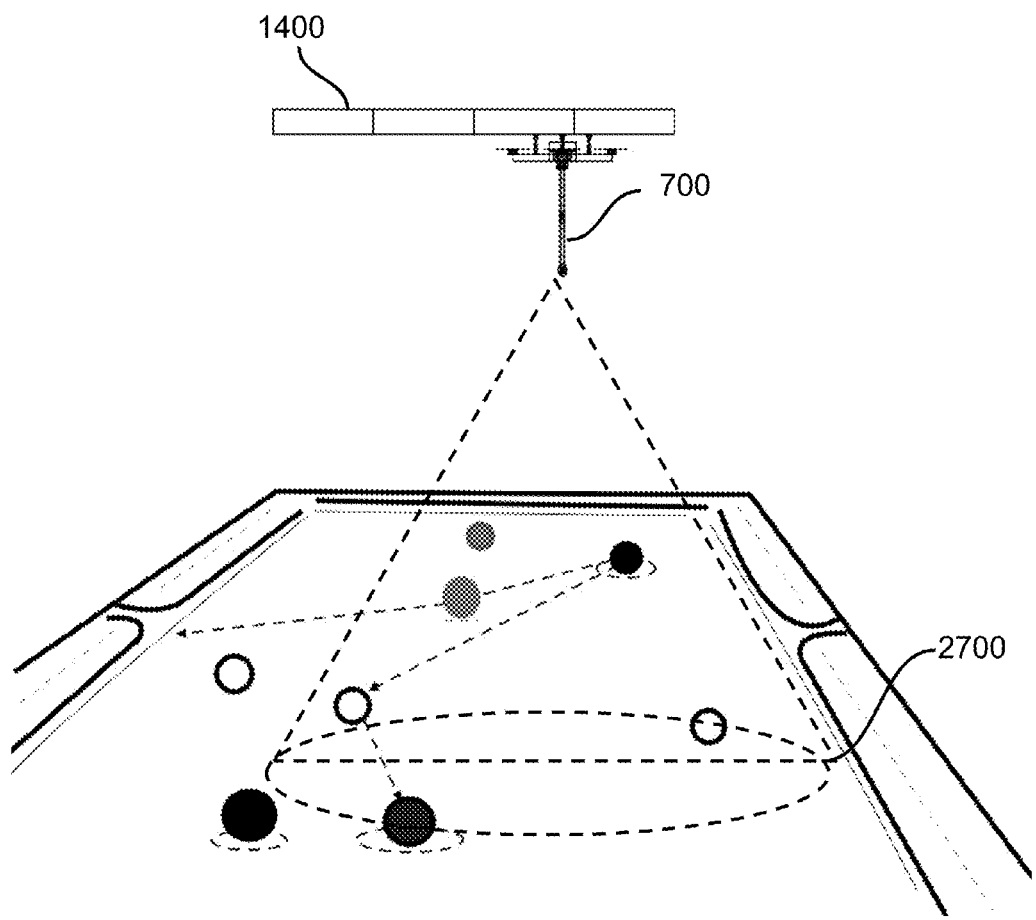
FIG. 63 shows flying user interface device executing game application such as pool table.

Because of its mobility, autonomous flying, computing power, sticking, and projection mechanism, it can support various types of application varying from simple applications to the complex applications such:

1. Device can be used to learn games. For instance user can see learning example or optimum direction and moves in pool table or billiards game as shown in FIG. 63.
2. User can learn new recipes using a cooking application 2700A-B as shown in FIG. 55. Device 700 can also regulate temperature by linking with stove using electronic knob controllers 5501. User can see projection on table or even inside the utensil 5500.
3. User can learn new song on a piano 5300 as shown in FIG. 53 using a projected music learning application 2700. Device 700 can also keep track current position in the music sheets or augment a virtual music sheet with tracked notes.
4. Device 700 can be used to learn complex dance moves or choreography, which involve hand, feet, and body movements as shown in FIG. 62. User 3100 can also save and share dance steps using the projected user interface 2700. Device can also change location during the dancing. For example it may slide on the ceiling to maintain the projected dance steps on the floor. It may also support multiple users.

Figure 52:
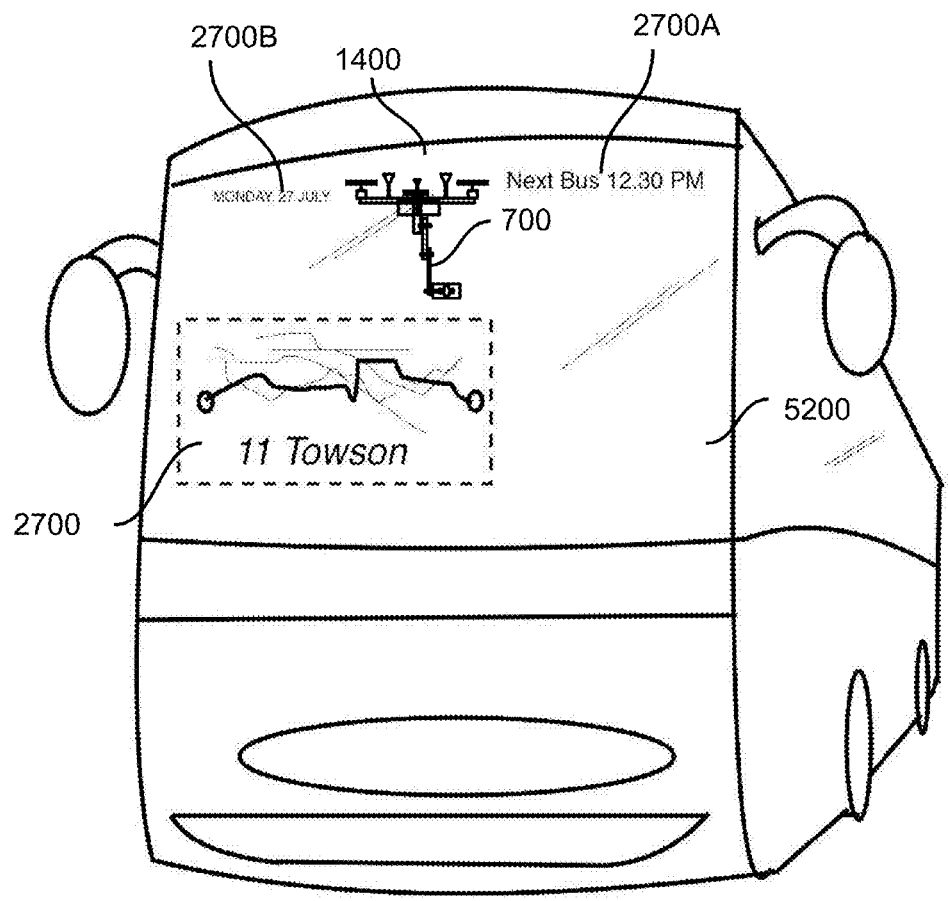
FIG. 52 shows a flying user interface device projecting user-interface in the bus such as public transportation.
Figure 61:
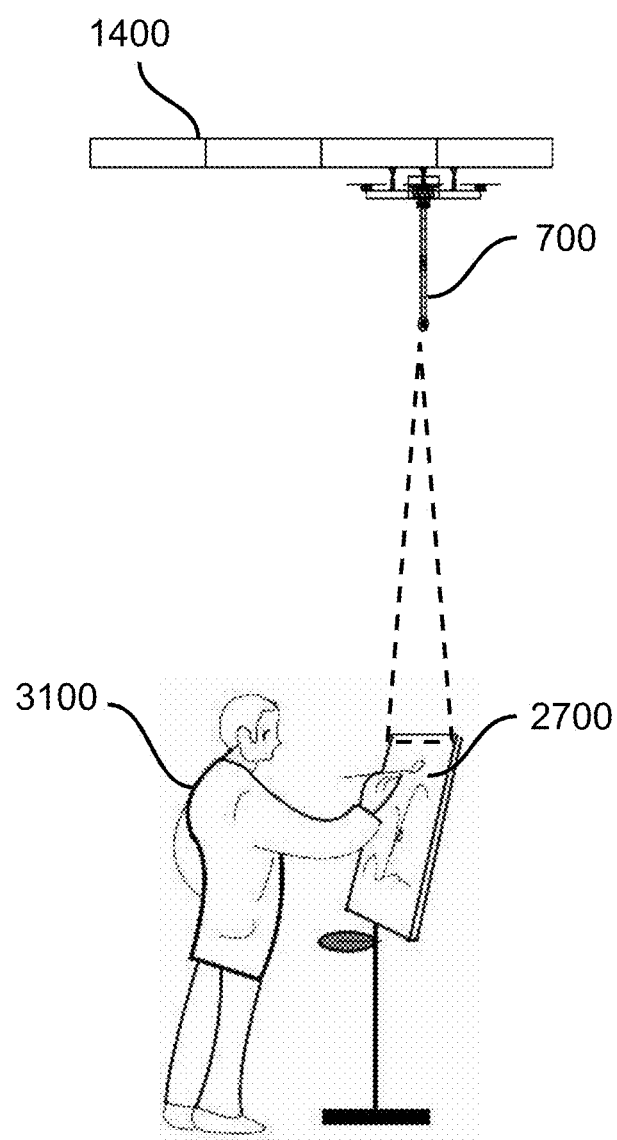
FIG. 61 shows flying user interface device executing painting application.
Figure 64:
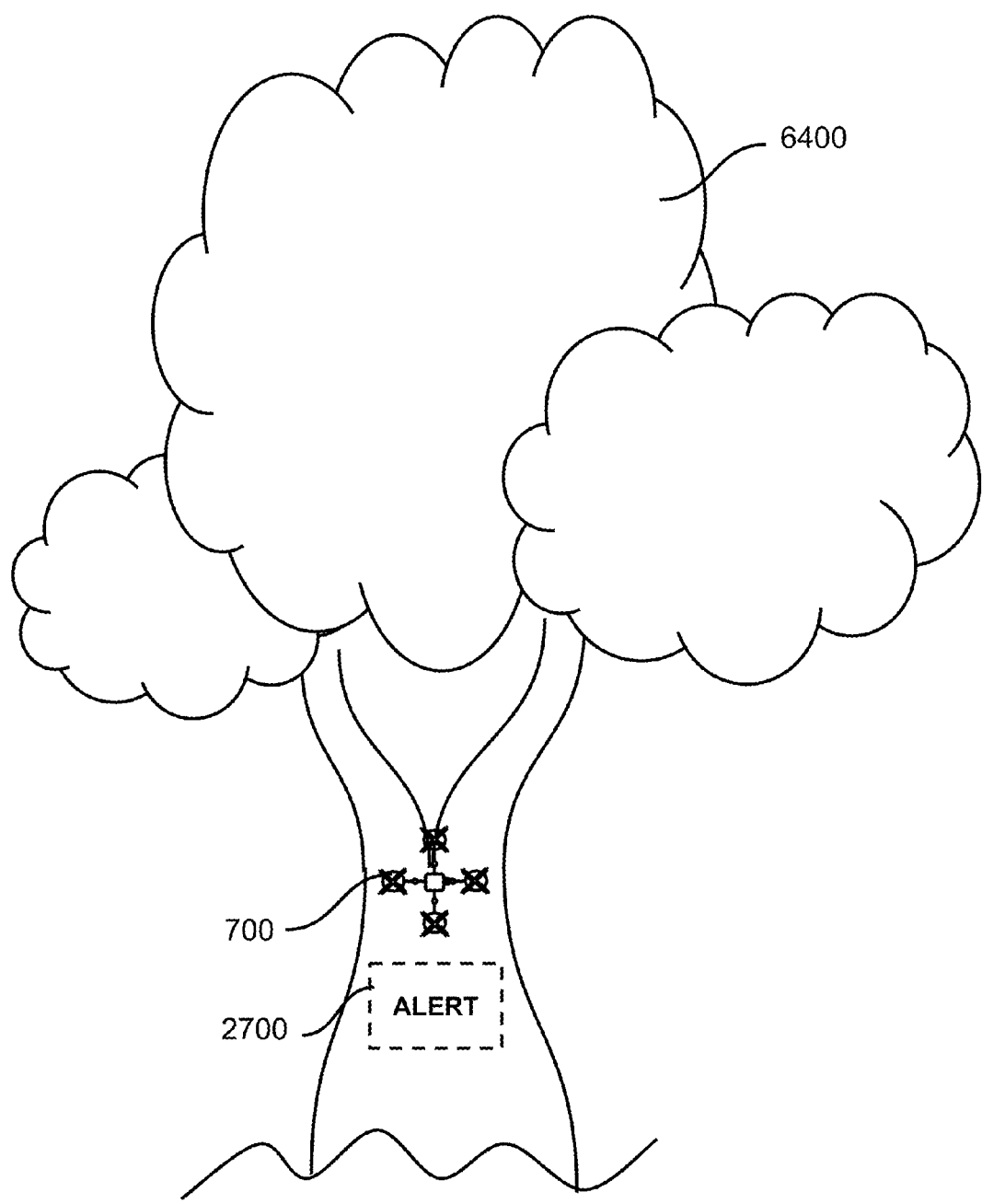
FIG. 64 shows flying user interface device projecting navigation information on a tree trunk.
Figure 66:
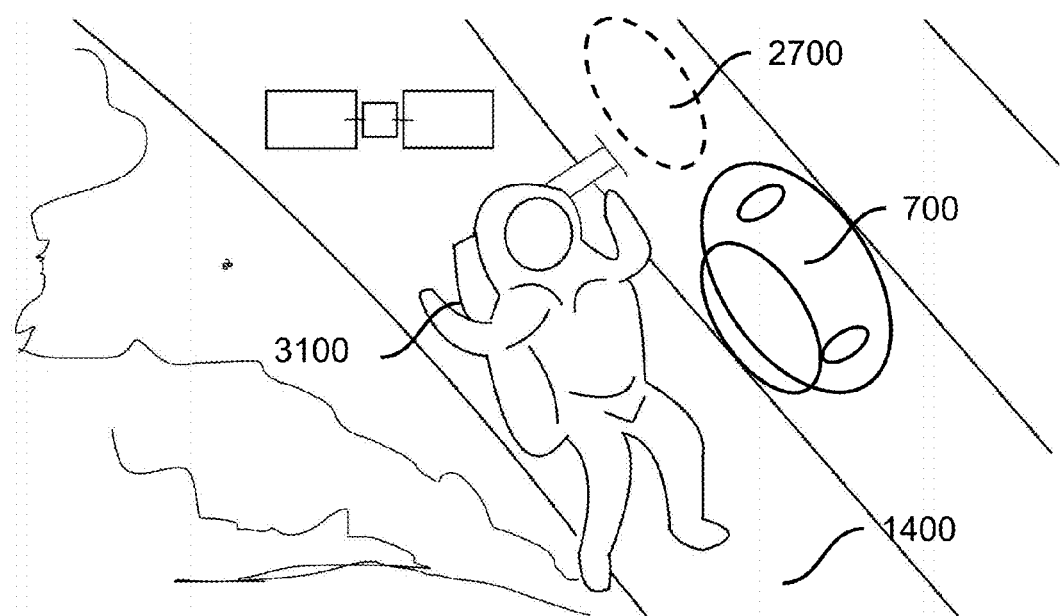
FIG. 66 shows how flying user interface devices can be used to provide assistance to astronauts in space environment with rocket powered flight system.

5. Device 700 can be used as outdoor advertisement on any surfaces such as trees 6400 trunk as shown in FIG. 64.
6. Device 700 can be used to assist and learn paintings as shown in FIG. 61 where user 3100 is using painting or drawing application 2700.
7. Device 700 can be used for both public display and vehicle navigation as shown in FIG. 52. In public transportation, passengers can even generate a stop request using other flying interface device(s). It may also display point of interests on glass window and assist passengers to explore the city.
8. Device 700 can also work in space as shown in FIG. 66 with the help of rocket powered flying propulsion system. During the spacewalk, astronauts can use device for assistance during the limited mobility situation.

The invention claimed is:

1. A flying apparatus comprising:
a flight system configured with a flight controller, sensors, at least one rotor, and an electronic speed controller to fly from a first location to a second location;
a sticking system having a grip controller and one or more of a vacuum gripper, a magnetic gripper, a hook and an electro-adhesive gripper each configured to attach the device to a surface at the second location;
a user interface system having a projector and at least one camera, is configured to augment and project images and information from the second location onto a nearby surface based on user input detected by the at least one camera and a user interface sensor; and
a computer system configured to control the flight system, the one or more grippers and the user interface system to execute human-computer interaction applications.

2. The apparatus of claim 1, further comprising a plurality of sensors or a hardware controller connected to the computer system.

3. The apparatus of claim 1, wherein the user interface system is attached to a robotic arm having up to six degrees of freedom.

4. The apparatus of claim 1, wherein the user interface further includes a pointing device configured to augment the information displayed in the projected image, based on user input.

5. The apparatus of claim 1, wherein the user interface device is configured to augment the information displayed in the projected image based on at least one of body gestures, hand gestures, face gestures and feet gestures, the gestures detected by the at least one camera or user interface sensor.

6. The apparatus of claim 1, wherein the user interface system is configured to detect gestures from a plurality of users.

7. The apparatus of claim 1, wherein the apparatus slides from the second location to a third location.

8. The apparatus of claim 1, wherein the flight system is configured to dynamically control position and orientation of the body by controlling rotor speed and direction using control algorithms.

9. The apparatus of claim 1, wherein the computer system is configured to autonomously recharge a power source by attaching to charging plate.

10. The apparatus of claim 1, wherein the computer system is configured to find and identify the system's owner and to stick to the back of the owner.

11. The apparatus of claim 1, wherein the computer system is configured to link, communicate and synchronize with other devices of the same design and type and to cooperate to form a large display, a virtual window or a user interface.

12. The apparatus of claim 1, wherein the computer system is configured to generate a map using simultaneous localization and mapping (SLAM).

13. The apparatus of claim 1, wherein the computer system further includes an application programming interface (API).

14. The apparatus of claim 1, further comprising one or more sensors configured to detect freefall, the one or more sensors comprising an accelerometer, a gyroscope, a barometer and a laser sensor; the computer system configured to autonomously fly and land the apparatus at another safe location in response to detection of freefall during a failure of the sticking system, the grip controller or at least one of the one or more grippers.

15. The apparatus of claim 1, wherein at least one of flight control or navigation is controlled in response to gestures detected by the at least one camera or sensors.

16. The apparatus of claim 1, wherein the sticking mechanism changes the type of gripper deployed for attachment based on the nature of the surface at the second location.

17. The apparatus of claim 1, wherein the projection surface is a floor or the projection surface is a wall adjacent to the attachment surface.

18. The apparatus of claim 1, wherein a plurality of mirrors or a lens are configured to change a projection direction of the projector.

19. The apparatus of claim 1, wherein the projector is a laser or holographic projector.

20. The apparatus of claim 1, wherein the flight system, grip controller, user interface system and computer system are implemented on a single integrated circuit (IC) powered by a single power source.

* * * * *